United States Patent
Miyazawa et al.

[11] Patent Number: 5,843,570
[45] Date of Patent: Dec. 1, 1998

[54] MAGNETO-OPTICAL RECORDING MEDIUM HAVING LARGE KERR ROTATIONAL ANGLE IN SHORT WAVELENGTH RANGE

[75] Inventors: Hiromu Miyazawa; Shoji Hoshina; Satoshi Shimokawato; Masaaki Ichikawa; Masaya Ishida; Takeo Kawase; Toshiaki Mikoshiba; Satoshi Nebashi; Tatsuya Shimoda, all of Suwa, Japan

[73] Assignee: Seiko Epson Corporation, Tokyo-to, Japan

[21] Appl. No.: 789,393

[22] Filed: Jan. 29, 1997

Related U.S. Application Data

[62] Division of Ser. No. 90,040, filed as PCT/JP92/01528 Nov. 20, 1992, Pat. No. 5,648,161.

[30] Foreign Application Priority Data

| Nov. 22, 1991 | [JP] | Japan | 3-307580 |
|---|---|---|---|
| Nov. 22, 1991 | [JP] | Japan | 3-307582 |
| Nov. 22, 1991 | [JP] | Japan | 3-307583 |
| Nov. 22, 1991 | [JP] | Japan | 3-307584 |
| Apr. 16, 1992 | [JP] | Japan | 4-96597 |

[51] Int. Cl.$^6$ ............................................. G11B 5/66
[52] U.S. Cl. .............. 428/332; 428/336; 428/694 ML; 428/694 DE; 428/694 MT; 428/694 RE; 428/694 MM; 428/694 EC; 428/900; 369/13
[58] Field of Search ................... 428/694 ML, 694 DE, 428/694 MT, 694 RE, 694 MM, 694 EC, 900, 336, 332; 369/13

[56] References Cited

U.S. PATENT DOCUMENTS

| 3,982,814 | 9/1976 | Kaiserwerth | 323/355 |
|---|---|---|---|
| 4,641,115 | 2/1987 | Bailey | 333/181 |
| 4,937,540 | 6/1990 | Carlson | 333/12 |
| 5,032,808 | 7/1991 | Reddy | 333/181 |
| 5,179,334 | 1/1993 | Reddick | 323/355 |

FOREIGN PATENT DOCUMENTS

| 258978 | 3/1988 | European Pat. Off. . |
|---|---|---|
| 0333467 | 9/1989 | European Pat. Off. . |
| 0391738 | 10/1990 | European Pat. Off. . |

(List continued on next page.)

OTHER PUBLICATIONS

Nawate, M. et al. "Perpendicular Magnetic . . . " IEEE Transactions on Magnetics, vol. 26 No. 5, Sep. 1990, NY pp. 1706–1708.

Guegunow et al. "Computation of optical . . . " J. Appl. Phys. 57(1) Apr. 15, 1985.

Primary Examiner—Leszek Kiliman
Attorney, Agent, or Firm—Ladas & Parry

[57] ABSTRACT

In a magneto-optical recording medium, a protective layer 14, a first magnetic layer 11 formed of a light rare earth element-heavy rare earth element-transition metal alloy, a second magnetic layer 12 formed of a light rare earth element-heavy rare earth element-transition metal alloy, a third magnetic layer 13 formed of a light rare earth element-heavy rare earth element-transition metal alloy, another protective layer 15, and a reflection layer 16 are laminated in sequence on a transparent substrate 10. The first, second and third magnetic layers are sandwiched so as to form a recording film 17. The compositions of the first and third magnetic layers are so selected as to provide a large Kerr rotational angle in a short wavelength range (400 to 700 nm), which is high in the ratio of light rare earth element. On the other hand, the composition of the second magnetic layer is so selected as to be prominent in the characteristics for forming a perpendicular magnetized film, which is high in the ratio of heavy rare earth element. The recording film 17 formed by sandwiching the first, second and third magnetic layers has a large Kerr rotational angle in a short wavelength range as a whole, and further provides a high coercivity. The recording film 17 is formed thin (400 angstrom or less) so that light can transmit sufficiently therethrough. Further, when the three layers of sandwich structure is combined with the reflection layer 16, a more larger Kerr rotational angle can be obtained.

9 Claims, 28 Drawing Sheets

FOREIGN PATENT DOCUMENTS

| | | |
|---|---|---|
| 0479474 | 4/1992 | European Pat. Off. . |
| 63-48636 | 3/1988 | Japan . |
| 63-237238 | 10/1988 | Japan . |
| 63-316340 | 12/1988 | Japan . |
| 63-317945 | 12/1988 | Japan . |
| 1124131 | 5/1989 | Japan . |
| 4192736 | 7/1992 | Japan . |
| 4310645 | 11/1992 | Japan . |

# MAGNETO-OPTICAL RECORDING MEDIUM HAVING LARGE KERR ROTATIONAL ANGLE IN SHORT WAVELENGTH RANGE

This is a divisional Ser. No. 08/090, 040 filed on Jul. 19, 1993 now U.S. Pat. No. 5,648,161 and PCT/JP92/01528 Nov. 20, 1992.

TECHNICAL FIELD

The present invention relates generally to a magneto-optical recording medium to and from which information signals are written and read by utilization of magneto-optical (Kerr) effect, and more specifically to the magneto-optical recording medium suitable for a high density recording with the use of a laser beam of short wavelength.

BACKGROUND ART

At present, recording media based upon the magneto-optical recording technique have widely been put into practical use. In the magneto-optical recording method, the magneto-optical effect of a thin film formed of a heavy rare earth element-transition metal alloy of perpendicular magnetic anisotropy is utilized for realization of practical rewritable recording media of a large capacity. The recording medium of this type is of portability, so that there exists such merit that recorded information can be kept secret or recorded information of large capacity can be moved easily.

With the advance of the development of multimedia for recording image data for instance, further increased memory capacitance is required more and more for the magneto-optical recording media. For satisfying this requirement, at present the higher density technique is now being researched on the basis of a laser beam of shorter wavelength (400 to 700 nm). One of the technical problems related to this technique is to obtain magnetic material which has a large Kerr rotational angle in as short a wavelength range as 400 to 700 nm. One of these materials is amorphous alloy which contains a light rare earth element (e.g., NdFeCo) and a transition metal. In the amorphous alloy, since the 4f electrons contribute to an increase in the magneto-optical effect, the Kerr rotational angle is large in the short wavelength range (J. Mag. Soc. Jpn. 11 Suppl. S1. 273 (1991)), so that this alloy is an effective candidate for the high density recording media.

In the NdFeCo, since the magnetization is large, there exists a problem in that it is difficult to form the perpendicular magnetized film required for the magneto-optical medium. To overcome this problem, recently there has been proposed such a method that a NdCo layer which has large Kerr rotational angle in a short wavelength range (not formed into a perpendicular magnetized film) is sandwiched between two TbFeCo layers (formed into perpendicular magnetized films) for providing mutual exchange coupling so that the three magnetic layers can function as a perpendicular magnetized film (Journal of Applied Physics Vol. 69 p4761, by Iiyori et al. of IBM Japan). Hereinafter, the structure such that a non-perpendicular magnetized layer is sandwiched between the two perpendicular magnetized layers as described above is referred to as sandwich structure.

In the prior art sandwich structure such that the NdCo layer is sandwiched between the two TbFeCo layers, however, since laser beam signals must be detected from the NdCo layer through the TbFeCo layer with an about 100 angstrom thickness, there exists a problem in that a sufficiently large Kerr rotational angle is not obtained in the case of a laser beam in the short wavelength range (400 to 700 nm).

On the other hand, in order to provide a large Kerr rotational angle in response to a laser beam, a reflection structure is so far well known. In this structure, a light reflection layer formed of material such as Al is formed in the recording medium, and a magnetic layer for producing a large Kerr rotational angle is formed on the surface of the light reflection layer. A laser beam outputted from an optical head is passed through the magnetic layer, reflected from the reflection layer, and again passed through the magnetic layer, before received by the optical head. In this method, since the laser beam is passed through the magnetic layers twice, it is possible to provide a large Kerr rotational angle to the laser beam. In the prior art sandwich structure as already described, however, since the magnetization of the middle non-perpendicular magnetized film must be stood in the vertical direction by the strong exchange coupling force applied from the perpendicular magnetized films provided on both the sides, the thickness of at least one side perpendicular magnetized film must be as thick as about 1000 angstrom. As a result, in the prior art sandwich structure, it is impossible to transmit a laser beam therethrough, and thereby it is impossible to combine the sandwich structure with the afore-mentioned reflection structure.

DISCLOSURE OF THE INVENTION

The first object of the present invention is to provide a magneto-optical recording medium by which a sufficiently large Kerr rotational angle can be obtained in a short laser wavelength range (400 to 700 nm).

The second object of the present invention is to enable the sandwich structure and the reflection structure to be combined with each other, in order to obtain a sufficiently large Kerr rotational angle in a short laser wavelength range (400 to 700 nm), by reducing the thicknesses of the respective layers on the basis of novel composition of the three magnetic layers of sandwich structure.

The third object of the present invention is to enable the two exchange coupled magnetic layers and the reflection structure to be combined with each other, in order to obtain a sufficiently large Kerr rotational angle in a short laser wavelength range (400 to 700 nm), by exchange coupling a thin single-layer perpendicular magnetized film with a non-perpendicular magnetized film of large Kerr rotational angle so as to stand the magnetization of the non-perpendicular magnetized film in the vertical direction.

According to the present invention, as the magnetic film material of the magneto-optical recording medium, light rare earth element-heavy rare earth element-transition metal alloys are used. Since the magnetic film formed of a light rare earth element-heavy rare earth element-transition metal alloy includes a light rare earth element (e.g., Nd or Pr or Sm), the Kerr rotational angle in the short wavelength range is relatively large, as compared with the magnetic film formed of an alloy such as TbFeCo including a heavy rare earth element (e.g., Dy or Tb or Gd) but not including the light rare earth element, as shown in FIG. 11 (in which the magnetic film is formed on a glass substrate and the Kerr rotational angle is measured on the substrate side). Further, in the magnetic film formed of the light rare earth element-heavy rare earth element-transition metal alloy, when the composition is selected appropriately, it is possible to obtain the magnetic film provided with characteristics as the perpendicular magnetized film, coercivity of about 10 kOe at room temperature, and Curie temperature between 150° and 200° C., with the result that the magnetic film is suitable also for use as the magneto-optical recording medium of single layer structure. In other words, the light rare earth element-heavy rare earth element-transition metal alloy of appropriate composition is excellent in the signal recording characteristics in thermo-magnetic writing and further the stability in recording domains.

In the present specification, the composition of the light rare earth element-heavy rare earth element-transition metal alloy is classified into a range (referred to as heavy rare earth major range, hereinafter) in which the content ratio of the heavy rare earth element is relatively large, and another range (referred to as light rare earth major range, hereinafter) in which the content ratio of the light rare earth element is relatively large. An example of the composition included within the heavy rare earth major range is Nd6 Dy23 Fe57 Co14 (at %). In the composition as described above, the characteristics as the perpendicular magnetized film is prominent and a relatively large coercivity can be obtained. In this composition, if the Nd and Co are increased and Dy and Fe are decreased, the composition enters the light rare earth major range. An example thereof is Nd25 Dy8 Fe35 Co32 (at %). In this composition, although the coercivity is as small as 0.8 kOe, a large Kerr rotational angle can be obtained in the short laser wavelength range. FIG. 12 shows the dependence of the wavelength upon the Kerr rotational angle in these two composition examples (the magnetic films are formed on a glass substrate and the Kerr rotational angles are measured from the substrate side).

According to the present invention, the magnetic film of the magneto-optical recording medium is a film (referred to as a multilayer film, hereinafter) formed by laminating a plurality of magnetic layers having respective compositions of both the heavy rare earth major range and the light rare earth major range. By adopting the above-mentioned multilayer film, it is possible to obtain the recording medium whose coercivity is as large as being equivalent to the composition of the heavy rare earth major range and whose Kerr rotational angle in the short laser wavelength range is as large as being equivalent to the composition of the light rare earth major range.

The multilayer film of the present invention can be adopted as the reproducing film for the magnetic induced super resolution reproducing medium and the direct overwrite medium utilizing the exchange-coupled two layer films, so that it is possible to provide recording medium of high performance.

Further, the recording medium of the present invention adopts the reflection structure formed by laminating the reflection layer on the above-mentioned multilayer film. Accordingly, it is possible to further enhance the Kerr rotational angle, thus providing a magneto-optical recording medium of higher performance index.

BEST MODES FOR EMBODYING THE INVENTION

The preferred embodiments of the present invention will be described hereinbelow. In the embodiments described below, the coercivity of the single magnetic layer indicates the value obtained by measuring the magnetic layer formed by laminating a single magnetic layer with a thickness of 200 angstrom and a AlSiN protective layer with a thickness of 800 angstrom on a polycarbonate substrate in sequence. Further, the Kerr rotational angle of the single magnetic layer indicates the value obtained by measuring, from the substrate side, the magnetic layer formed by laminating a single magnetic layer with a thickness of 1000 angstrom and a AlSiN protective layer with a thickness of 800 angstrom on a polycarbonate substrate in sequence. Further, the S/N ratio indicates the narrow band S/N ratio measured within the band width 30 kHz.

EMBODIMENT 1

(3-Layer Sandwich+Reflection Structure)

Figure 1:
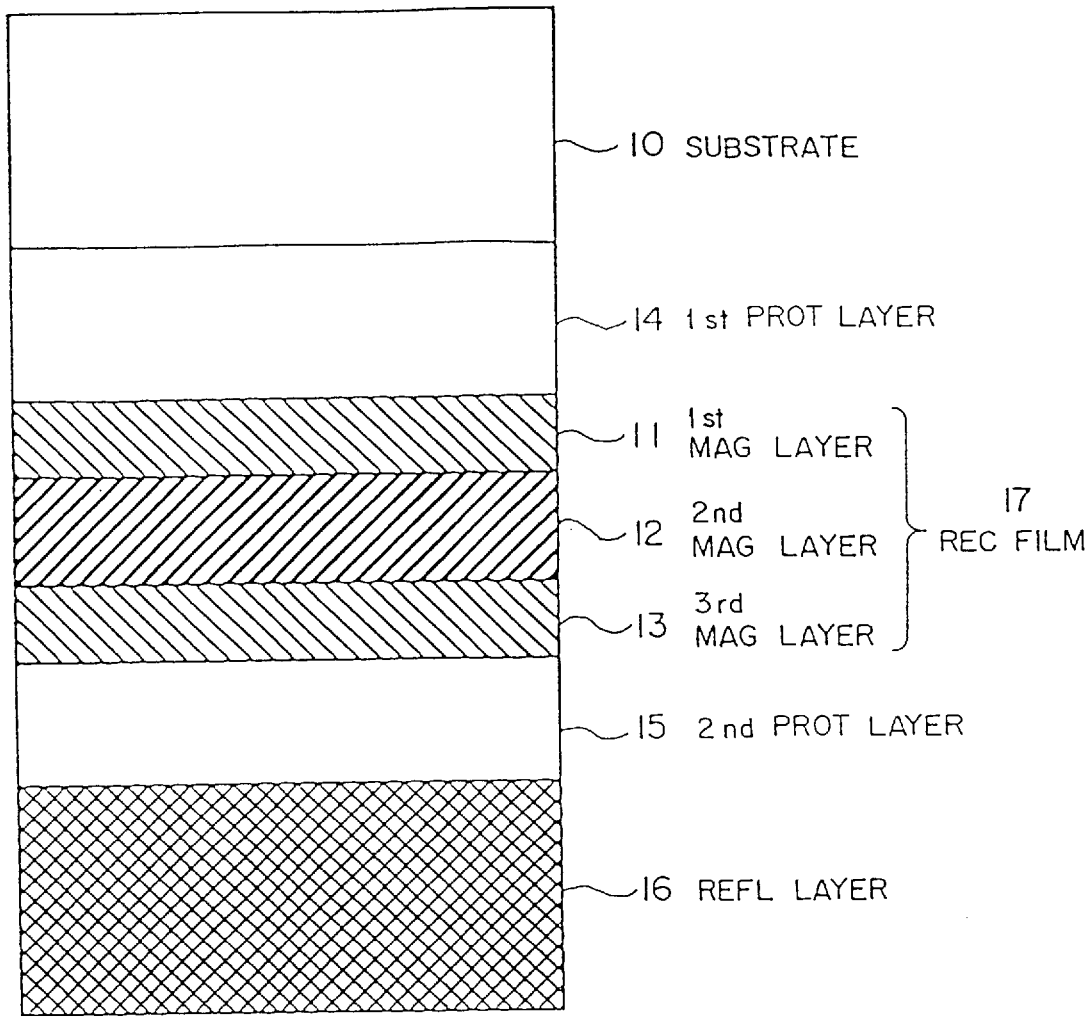
FIG. 1 is a side cross-sectional view showing an embodiment 1 of the present invention.

FIG. 1 is a side cross-sectional view showing the embodiment 1. A first protective layer 14 of 600 angstrom in thickness, a first magnetic layer 11 of 60 angstrom in thickness, a second magnetic layer 12 of 80 angstrom in thickness, a third magnetic layer 13 of 60 angstrom in thickness, a second protective layer 15 of 200 angstrom in thickness, and a reflection layer 16 of 600 angstrom in thickness are laminated on a polycarbonate substrate 10 in sequence by magnetron sputtering. The magnetic layers 11, 12 and 13 are amorphous.

The examples of the material of the respective layers are as follows: the material of the first and second protective layers 14 and 15 is AlSiN; that of the reflection layer 16 is Al; that of the first, second and third magnetic layers is a light rare earth element-heavy rare earth element-transition metal alloy such as NdDyFeCo, NdTbFeCo, NdTbDyFeCo, PrDyFeCo, PrTbFeCo or PrTbDyFeCo. Here, the composition of the second magnetic layer 12 is selected from the heavy rare earth major range. On the other hand, the composition of the first and third magnetic layers 11 and 13 are the same composition selected from the light rare earth major range. The examples of composition included in the heavy rare earth major range are listed in Table 6, and the examples of composition included in the light rare earth major range are listed in Tables 1 to 5. The above-mentioned first, second and third magnetic layers 11, 12 and 13 are exchange-coupled with respect to each other and constitutes a magnetic film 17 (referred to as a recording film, hereinafter) for recording information as a whole.

When the above-mentioned compositions are adopted for the magnetic layers 11, 12 and 13, the first and third magnetic layers 11 and 13 have preferable characteristics such that the Kerr rotational angle is sufficiently large in the short wavelength range. Further, the first and third magnetic layers 11 and 13 are weak (i.e., the coercivity is small) in the characteristics as the perpendicular magnetized film, as compared with the second magnetic layer 12. However, the first and third magnetic layers 11 and 13 are strong in the characteristics as the perpendicular magnetized film, as compared with the light rare earth element-transition metal alloy (e.g., NdCo) (including no heavy rare earth element) used as the magnetic layer having a large Kerr rotational angle in the prior art sandwich structure. On the other hand, the second magnetic layer 12 is provided with a square-shaped hysteresis loop, and therefore the coercivity is large. In other words, the second magnetic layer 12 is strong in the characteristics as the perpendicular magnetized film. In addition, the second magnetic layer 12 is small in the Kerr rotational angle in the short wavelength range, as compared with the first and third magnetic layers 11 and 13. However, the second magnetic layer 12 is large in the Kerr rotational angle, as compared with the heavy rare earth element-transition metal alloy (e.g., TbFeCo) (including no light rare earth element) used as the magnetic layer having a large coercivity in the prior art sandwich structure.

Owing to the characteristics of the respective magnetic layers as described above, it is possible to adopt an advantageous structure different from the prior art sandwich structure. In more detail, firstly, in the prior art sandwich structure, a magnetic layer of a large Kerr rotational angle is sandwiched between the two magnetic layers of a large coercivity. In the present invention, as shown in the embodiment 1, it is possible to adopt such a sandwich structure that a magnetic layer 12 of a large coercivity is sandwiched between the two magnetic layers 11 and 13 of a large Kerr rotational angle. As a result, it is possible to obtain a larger Kerr rotational angle in the short wavelength range, as compared with the prior art sandwich structure. Secondly, since the magnetic layers 11 and 13 having a large Kerr rotational angle, respectively have a large coercivity, as compared with those of the prior art sandwich structure, it is possible to extremely reduce the thickness of the magnetic layer 12 having a large coercivity, as compared with that of the prior art sandwich structure. Accordingly, the total film thickness of the recording film 17 can be reduced sufficiently thin so that a laser beam can be transmitted therethrough, thus allowing the adoption of reflection structure and thereby the Kerr rotational angle can be further increased.

The evaluation test results of the embodiment 1 shown in FIG. 1 will be described hereinbelow.

Figure 2:
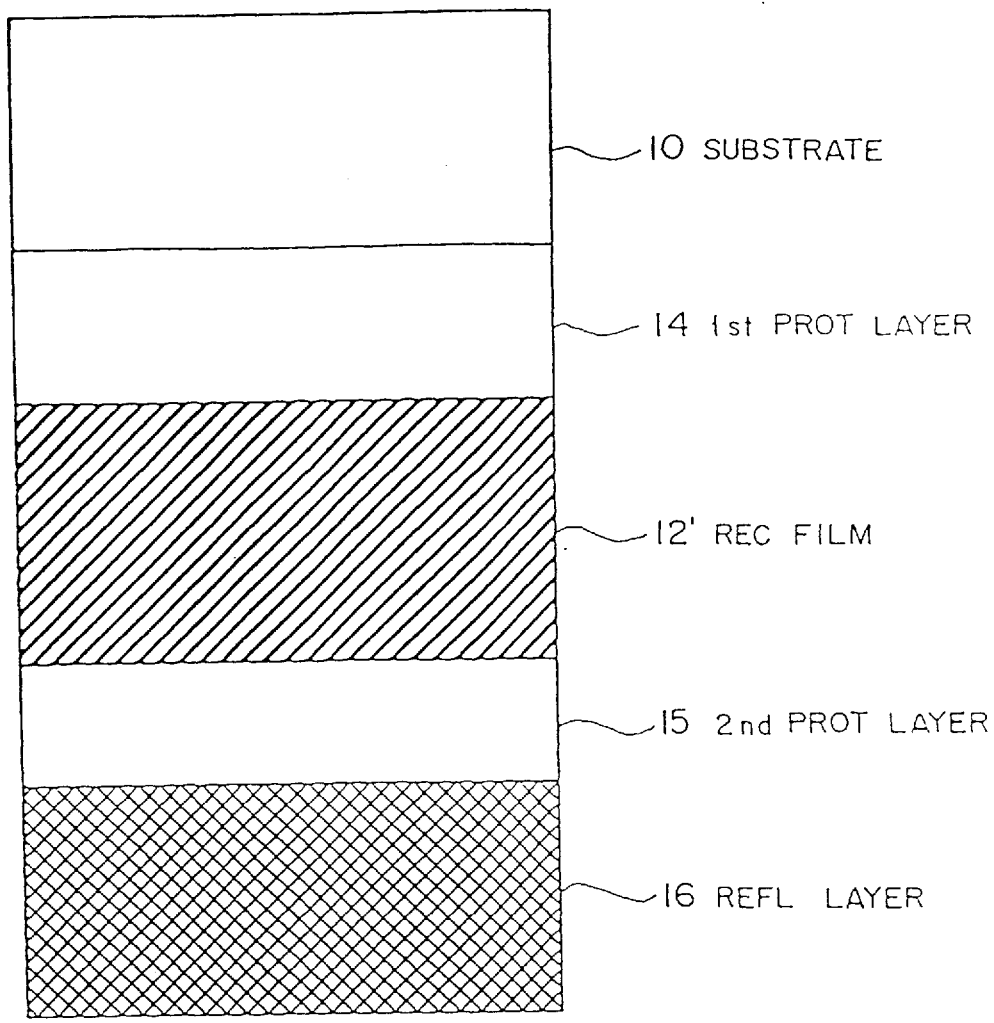
FIG. 2 is a side cross-sectional view showing a comparative example used for the evaluation test of the embodiment 1.

FIG. 2 is a side cross-sectional view showing a comparative example used for the evaluation test. A first protective layer 14 of 600 angstrom in thickness, a recording film 12' of single layer structure with a thickness of 200 angstrom, a second protective layer 15 of 200 angstrom in thickness, and a reflection layer 16 of 600 angstrom in thickness are laminated on a polycarbonate substrate 10 in sequence by magnetron sputtering. The material of the first and second protective layers 14 and 15 is AlSiN, and that of the reflection layer 16 is Al. The recording film 12' is of an alloy Nd6 Dy22 Fe52 Co20 (at %) of heavy rare earth major range composition. In the single layer of the recording film 12', the Kerr rotational angle is 0.25° and the coercivity is 10.5 kOe in laser wavelength of 500 nm.

With respect to the embodiment 1 shown in FIG. 1, the composition of the second magnetic layer 12 is the same as that (Nd6 Dy22 Fe52 Co20 (at %)) of the recording film 12' of the comparative example. Further, with respect to the first and second magnetic layers 11 and 13, 40 samples of different composition as listed in Tables 1, 2, 3, 4 and 5 were prepared. These samples are referred to as the example 1-1 to example 1-40 hereinafter. Further, in Tables 1 to 5, the Kerr rotational angles θs in the laser wavelength of 500 nm and the coercivities Hcs of the first and third magnetic layers of single layer structure are both listed for each composition of 40 examples.

TABLE 1

| SAMP No. 1st & 3rd MAG LAYER COMP (at %) | θs (degree) | Hcs (kOe) | θm (degree) | Hcm (kOe) |
|---|---|---|---|---|
| EXAMPLE 1-1 Nd15 Tb5 Fe45 Co35 | 0.37 | 0.3 | 1.14 | 4.0 |
| EXAMPLE 1-2 Nd15 Tb8 Fe42 Co35 | 0.33 | 0.4 | 1.09 | 5.2 |
| EXAMPLE 1-3 Nd15 Tb10 Fe40 Co35 | 0.32 | 0.6 | 1.02 | 5.8 |
| EXAMPLE 1-4 Nd23 Tb5 Fe34 Co38 | 0.39 | 0.4 | 1.19 | 5.0 |
| EXAMPLE 1-5 Nd23 Tb8 Fe31 Co38 | 0.36 | 0.6 | 1.23 | 6.2 |
| EXAMPLE 1-6 Nd23 Tb10 Fe29 Co38 | 0.35 | 0.8 | 1.09 | 6.5 |
| EXAMPLE 1-7 Nd30 Tb5 Fe25 Co40 | 0.38 | 0.3 | 1.15 | 3.9 |
| EXAMPLE 1-8 Nd30 Tb8 Fe22 Co40 | 0.33 | 0.4 | 1.15 | 4.8 |

TABLE 2

| SAMP No. 1st & 3rd MAG LAYER COMP (at %) | θs (degree) | Hcs (kOe) | θm (degree) | Hcm (kOe) |
|---|---|---|---|---|
| EXAMPLE 1-9 Nd30 TB10 Fe20 Co40 | 0.32 | 0.6 | 0.97 | 5.5 |
| EXAMPLE 1-10 Nd23 Dy8 Fe29 Co40 | 0.35 | 0.6 | 1.14 | 5.9 |
| EXAMPLE 1-11 Nd23 Tb5 Dy3 Fe29 Co40 | 0.35 | 0.7 | 1.21 | 6.2 |
| EXAMPLE 1-12 Pr15 Tb5 Fe40 Co40 | 0.36 | 0.3 | 1.05 | 4.3 |
| EXAMPLE 1-13 Pr23 Tb8 Fe29 Co40 | 0.36 | 0.7 | 1.09 | 5.7 |

TABLE 2-continued

| SAMP No. 1st & 3rd MAG LAYER COMP (at %) | θs (degree) | Hcs (kOe) | θm (degree) | Hcm (kOe) |
|---|---|---|---|---|
| EXAMPLE 1-14 Pr30 Tb8 Fe30 Co30 | 0.32 | 0.4 | 1.07 | 4.9 |
| EXAMPLE 1-15 Pr23 Tb5 Dy3 Fe29 Co40 | 0.35 | 0.6 | 1.15 | 5.5 |
| EXAMPLE 1-16 Pr23 Dy8 Fe29 Co40 | 0.35 | 0.4 | 1.13 | 5.7 |

TABLE 3

| SAMP No. 1st & 3rd MAG LAYER COMP (at %) | θs (degree) | Hcs (kOe) | θm (degree) | Hcm (kOe) |
|---|---|---|---|---|
| EXAMPLE 1-17 Nd10 Tb3 Fe47 Co40 | 0.26 | 0.2 | 1.02 | 3.0 |
| EXAMPLE 1-18 Nd15 Tb3 Fe42 Co40 | 0.37 | 0.2 | 1.22 | 3.5 |
| EXAMPLE 1-19 Nd23 Tb5 Fe34 Co40 | 0.39 | 0.2 | 1.20 | 4.0 |
| EXAMPLE 1-20 Nd30 Tb3 Fe27 Co40 | 0.39 | 0.2 | 1.22 | 2.9 |
| EXAMPLE 1-21 Nd35 Tb3 Fe22 Co40 | 0.38 | 0.2 | 0.88 | 2.3 |
| EXAMPLE 1-22 Nd35 Tb10 Fe15 Co40 | 0.28 | 0.4 | 1.75 | 4.8 |
| EXAMPLE 1-23 Nd35 Tb15 Fe10 Co40 | 0.26 | 0.8 | 0.72 | 5.5 |
| EXAMPLE 1-24 Nd30 Tb15 Fe15 Co40 | 0.28 | 1.0 | 0.73 | 7.2 |

TABLE 4

| SAMP No. 1st & 3rd MAG LAYER COMP (at %) | θs (degree) | Hcs (kOe) | θm (degree) | Hcm (kOe) |
|---|---|---|---|---|
| EXAMPLE 1-25 Nd23 Tb15 Fe22 Co40 | 0.29 | 1.2 | 0.85 | 7.9 |
| EXAMPLE 1-26 Nd15 Tb15 Fe30 Co40 | 0.27 | 1.0 | 0.83 | 6.9 |
| EXAMPLE 1-27 Nd10 Tb15 Fe35 Co40 | 0.26 | 0.8 | 0.78 | 5.8 |
| EXAMPLE 1-28 Nd10 Tb10 Fe40 Co40 | 0.29 | 0.4 | 0.88 | 4.1 |
| *EXAMPLE 1-29 Nd10 Tb1 Fe49 Co40 | 0.22 | 0.05 | 0.96 | *0.8 |
| *EXAMPLE 1-30 Nd23 Tb1 Fe36 Co40 | 0.40 | 0.05 | 1.20 | *1.0 |
| *EXAMPLE 1-31 Nd35 Tb1 Fe24 Co40 | 0.37 | 0.05 | 0.78 | *0.7 |
| *EXAMPLE 1-32 Nd37 Tb3 Fe20 Co40 | 0.30 | 0.1 | 0.75 | *1.0 |

In Table 4 above, the asterisk * indicates the example which satifies the following conditions: θm < 0.6° or Hcm < 2.0 kOe

TABLE 5

| SAMP No. 1st & 3rd MAG LAYER COMP (at %) | θs (degree) | Hcs (kOe) | θm (degree) | Hcm (kOe) |
|---|---|---|---|---|
| *EXAMPLE 1-33 Nd37 Tb10 Fe13 Co40 | 0.20 | 0.3 | *0.52 | 2.4 |
| *EXAMPLE 1-34 Nd37 Tb15 Fe8 Co40 | 0.18 | 0.5 | *0.57 | 4.0 |
| *EXAMPLE 1-35 Nd35 Tb17 Fe8 Co40 | 0.12 | 1.1 | *0.53 | 6.5 |
| *EXAMPLE 1-36 | 0.22 | 1.5 | *0.58 | 9.4 |

TABLE 5-continued

| SAMP No. 1st & 3rd MAG LAYER COMP (at %) | θs (degree) | Hcs (kOe) | θm (degree) | Hcm (kOe) |
|---|---|---|---|---|
| Nd23 Tb17 Fe20 Co40 | | | | |
| *EXAMPLE 1-37 | 0.18 | 1.1 | *0.59 | 6.8 |
| Nd10 Tb17 Fe43 Co40 | | | | |
| *EXAMPLE 1-38 | 0.18 | 0.6 | *0.52 | 3.9 |
| Nd5 Tb15 Fe40 Co40 | | | | |
| *EXAMPLE 1-39 | 0.20 | 0.3 | *0.56 | 1.2 |
| Nd5 Tb10 Fe45 Co40 | | | | |
| *EXAMPLE 1-40 | 0.22 | 0.1 | 0.76 | *0.5 |
| Nd5 Tb3 Fe52 Co40 | | | | |

In Table 5 above, the asterisk * indicates the example which satisfies the following conditions: θm < 0.6° or Hcm < 2.0 kOe In Tables 1 to 5, the Kerr rotational angle θm in the laser wavelength of 500 nm measured from the substrate side and the coercivity Hcm are both listed for each composition of the 40 examples. On the other hand, with respect to the comparative example shown in FIG. 2, the Kerr rotational angle θm in the laser wavelength of 500 nm measured from the substrate side is 0.60° and the coercivity Hcm is 11.8 kOe.

Tables 1 to 5 indicate the following test results: In the examples 1-1 to 1-28, the Kerr rotational angle is larger than that of the comparative example, and in addition the coercivity is 2 kOe or more. Here, the coercivity of 2 kOe is the minimum coercivity value required to stably maintain the magnetization switching domains for holding recording information. In other words, if the coercivity of the magnetization switching domains is less than 2 kOe, the domains are unstable, so that the S/N ratio in the reproduced signal is 45 dB or less, thus degrading the reliability as the information recording medium. Accordingly, when the composition as in the examples 1-1 to 1-28 is adopted as the first and third magnetic layers 11 and 13 respectively, it is possible to provide a magneto-optical recording medium high in the S/N ratio in the short wavelength range and stable in the magnetic recording domains. In general, when the first and third magnetic layers 11 and 13 are formed of the light rare earth element-heavy rare earth element-transition metal alloy (where the light rare earth element is Nd or Pr), it is preferable to satisfy the following conditions:

10≦x≦35 (at %) and

1≦y≦15 (at %)

where x (at %) denotes the composition ratio of the light rare earth element; and y (at %) denotes the composition ratio of the heavy rare earth element.

The other evaluation test results with respect to the embodiment 1 shown in FIG. 1 will be described hereinbelow.

In this test, the composition of the first and third magnetic layers 11 and 13 was fixed to Nd25 Tb7 Fe33 Co35 (at %), and 8 examples of the composition of the second magnetic layer 12 were prepared as listed in Table 6. Here, the prepared examples are referred to as the embodiments 1-41 to 1-48. In Table 6, the Kerr rotational angle θs in the wavelength 500 nm and the coercivity Hcs of the second magnetic layers of single layer structure are both listed for each composition of 8 examples. Further, in the above-mentioned composition of the first and third magnetic layers 11 and 13 of single layer structure, the Kerr rotational angle is 0.34° in the wavelength of 500 nm and the coercivity is 0.8 kOe.

TABLE 6

| SAMP No. 2nd MAG LAYER COMP (at %) | θs (degree) | Hcs (kOe) | θm (degree) | Hcm (kOe) |
|---|---|---|---|---|
| EXAMPLE 1-41 | 0.24 | 10.8 | 1.15 | 5.8 |
| Nd8 Tb21 Fe53 Co18 | | | | |
| EXAMPLE 1-42 | 0.23 | 9.7 | 1.18 | 6.0 |
| Nd8 Dy16 Tb5 Fe53 Co18 | | | | |
| EXAMPLE 1-43 | 0.24 | 11.4 | 1.16 | 7.1 |
| Nd8 Tb16 Dy5 Fe53 Co18 | | | | |
| EXAMPLE 1-44 | 0.25 | 10.4 | 1.19 | 6.8 |
| Nd8 Dy22 Fe53 Co19 | | | | |
| EXAMPLE 1-45 | 0.25 | 8.2 | 1.15 | 5.6 |
| Pr8 Dy16 Tb5 Fe53 Co18 | | | | |
| EXAMPLE 1-46 | 0.24 | 8.5 | 1.18 | 6.0 |
| Pr8 Tb16 Dy5 Fe53 Co18 | | | | |
| EXAMPLE 1-47 | 0.19 | 12.3 | 0.75 | 8.3 |
| Tb22 Fe73 Co5 | | | | |
| EXAMPLE 1-48 | 0.18 | 11.5 | 0.77 | 9.0 |
| Tb22 Fe67 Co6 Cr5 | | | | |

In Table 6, the Kerr rotational angle θm in the laser wavelength of 500 nm measured on the substrate side and the coercivity Hcm are both listed for composition of the examples 1-41 to 1-48. Table 6 indicates the following test results: In the examples 1-41 to 1-48, the Kerr rotational angle is larger than that of the comparative example, and in addition the coercivity is 2 kOe or more. Therefore, in these examples, it is possible to provide the magneto-optical recording medium high in the S/N ratio in the short wavelength range and stable in the recording magnetic domains. In addition, Table 6 indicates that it is preferable that the composition includes light rare earth element Nd or Pr (examples 1-41 to 1-46), because a larger Kerr rotational angle can be obtained, in comparison with the composition including only heavy rare earth element Tb as the rare earth elements (examples 1-47 and 1-48).

In general, with respect to the layer thickness ratios of the three magnetic layers 11, 12 and 13, the enhancement of the Kerr rotational angle of the whole recording film 17 increases with increasing layer thickness ratio of the layers (i.e., first and third magnetic layers 11 and 13) having a large Kerr rotational angle, and the coercivity of the whole recording film 17 increases with increasing layer thickness ratio of the layer (i.e., second magnetic layer 12) having a large coercivity. Therefore, the optimum layer thickness ratios are selected so that the enhancement of the kerr rotational angle and the coercivity of the whole recording film 17 can be determined to an appropriate value, respectively.

The film thickness of the recording film 17 is preferably 400 angstrom or less. This is because if the recording film 17 is as thin as this extent, the light can be transmitted therethrough sufficiently, so that it is possible to utilize the advantage of adopting the reflection structure.

The test with respect to the film thickness of the recording film 17 is made as follows: A first protective layer 14 of 600 angstrom in thickness, a first magnetic layer 11 of 60 angstrom in thickness, a second magnetic layer 12 of x angstrom in thickness, a third magnetic layer 13 of 60 angstrom in thickness, a second protective layer 15 of 200 angstrom in thickness, and a reflection layer 16 of 600 angstrom in thickness are laminated on a polycarbonate substrate 10 in sequence. Examples of the second magnetic layers of x (80, 180, 230, 260 and 310, respectively) angstrom are prepared. The Kerr rotational angles θm of these examples are measured from the substrate side. Further, the compositions of the respective layers of the respective samples are the same as with the case of the embodiment 1-1. The film thicknesses of these samples are 200, 300, 350, 380 and 430 angstrom, respectively, and the Kerr rotational angles θm in the wavelength 500 nm obtained when measured from the sample substrate side are 1.14, 1.05, 0.86, 0.79 and 0.63, respectively. Further, the coercivity Hcm of these samples are 4.0, 4.8, 5.4, 5.7 and 5.9 kOe, respectively.

Further, in the embodiment 1, it is also possible to obtain the same effect as described above, when the composition of the first magnetic layer 11 is not necessarily the same as that of the third magnetic layer 13.

In the embodiment 1, the Curie temperatures of the first and third magnetic layers 11 and 13 are both 200° C. or higher.

EMBODIMENT 2

(2-Layer Sandwich+Reflection Structure)

Figure 3:
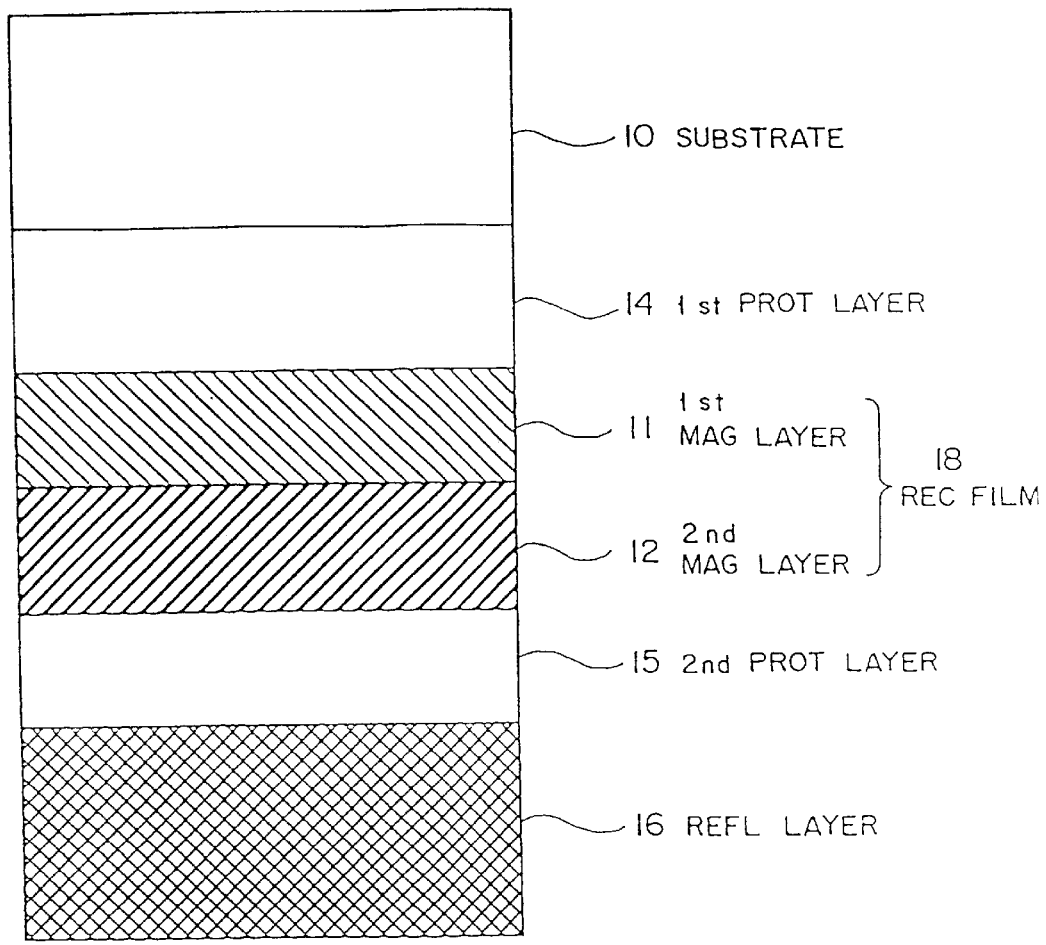
FIG. 3 is a side cross-sectional view showing an embodiment 2 of the present invention.

FIG. 3 is a side cross-sectional view showing the embodiment 2. The feature of this embodiment is that the recording film is formed by two magnetic layers of sandwiched structure and further the reflection structure is incorporated. That is, a first protective layer 14 of 600 angstrom in thickness, a first magnetic layer 11 of 80 angstrom in thickness, a second magnetic layer 12 of 120 angstrom in thickness, a second protective layer 15 of 200 angstrom in thickness, and a reflection layer 16 of 600 angstrom in thickness are laminated on a polycarbonate substrate 10 in sequence by magnetron sputtering. The material of the first and second protective layers 14 and 15 is AlSiN; and that of the reflection layer 16 is Al. Further, the material of the first and second magnetic layers 11 and 12 is a light rare earth element-heavy rare earth element-transition metal alloy in the same way as in the embodiment 1. The first magnetic layer 11 includes a composition of the light rare earth major range, and the second magnetic layer 12 includes a composition of the heavy rare earth major range. Further, the first and second magnetic layers 11 and 12 are exchange coupled to each other to constitute the recording layer 18.

The evaluation test results of the embodiment 2 shown in FIG. 3 will be described hereinbelow.

FIG. 2 is a side cross-sectional view showing a comparative example used for the evaluation test. A first protective layer 14 of 600 angstrom in thickness, a recording film 12' of single layer structure with a thickness of 200 angstrom, a second protective layer 15 of 200 angstrom in thickness, and a reflection layer 16 of 600 angstrom in thickness are laminated on a polycarbonate substrate 10 in sequence by magnetron sputtering. The material of the protective layers 14 and 15 is AlSiN, and that of the reflection layer 16 is Al. The recording film 12' is of an alloy Nd6 Dy22 Fe52 Co20 (at %) of heavy rare earth major range composition. In the single layer of the recording film 12', the Kerr rotational angle in the laser wavelength of 500 nm is 0.25° and the coercivity is 10.5 kOe.

With respect to the embodiment 2 as shown in FIG. 3, the composition of the second magnetic layer 12 is the same as that Nd6 Dy22 Fe52 Co20 (at %) of the recording film 12' of the comparative example. Further, with respect to the first magnetic layer 11, 40 samples of different composition as listed in Tables 7, 8, 9, 10 and 11 were prepared. These samples are referred to as the example 1-1 to example 2-40 hereinafter. Further, in Tables 7 to 11, the Kerr rotational angle θs in the laser wavelength of 500 nm and the coercivity Hcs of the second magnetic layer of single layer structure are both listed for each composition of 40 examples.

TABLE 7

| SAMP No. 2nd MAG LAYER COMP (at %) | θs (degree) | Hcs (kOe) | θm (degree) | Hcm (kO) |
|---|---|---|---|---|
| EXAMPLE 2-1 Nd15 Tb5 Fe45 Co35 | 0.37 | 0.3 | 1.05 | 4.2 |
| EXAMPLE 2-2 Nd15 Tb8 Fe42 Co35 | 0.33 | 0.4 | 1.00 | 5.3 |
| EXAMPLE 2-3 Nd15 Tb10 Fe40 Co35 | 0.32 | 0.6 | 0.90 | 6.0 |
| EXAMPLE 2-4 Nd23 Tb5 Fe34 Co38 | 0.39 | 0.4 | 1.10 | 4.6 |
| EXAMPLE 2-5 Nd23 Tb8 Fe31 Co38 | 0.36 | 0.6 | 1.15 | 6.1 |
| EXAMPLE 2-6 Nd23 Tb10 Fe29 Co38 | 0.35 | 0.8 | 1.00 | 6.4 |
| EXAMPLE 2-7 Nd30 Tb5 Fe25 Co40 | 0.38 | 0.3 | 1.05 | 4.1 |
| EXAMPLE 2-8 Nd30 Tb8 Fe22 Co40 | 0.33 | 0.4 | 1.00 | 4.9 |

TABLE 8

| SAMP No. 1st MAG LAYER COMP (at %) | θs (degree) | Hcs (kOe) | θm (degree) | Hcm (kOe) |
|---|---|---|---|---|
| EXAMPLE 2-9 Nd30 Tb10 Fe20 Co40 | 0.32 | 0.6 | 0.88 | 5.5 |
| EXAMPLE 2-10 Nd23 Dy8 Fe29 Co40 | 0.35 | 0.6 | 1.05 | 5.9 |
| EXAMPLE 2-11 Nd23 Tb5 Dy3 Fe29 Co40 | 0.35 | 0.7 | 1.11 | 6.2 |
| EXAMPLE 2-12 Pr15 Tb5 Fe40 Co40 | 0.36 | 0.3 | 0.95 | 4.3 |
| EXAMPLE 2-13 Pr23 Tb8 Fe29 Co40 | 0.36 | 0.7 | 1.00 | 5.7 |
| EXAMPLE 2-14 Pr30 Tb8 Fe30 Co30 | 0.32 | 0.4 | 0.98 | 4.9 |
| EXAMPLE 2-15 Pr23 Tb5 Dy3 Fe29 Co40 | 0.35 | 0.6 | 1.06 | 5.5 |
| EXAMPLE 2-16 Pr23 Dy8 Fe29 Co40 | 0.35 | 0.4 | 1.04 | 5.7 |

TABLE 9

| SAMP No. 1st MAG LAYER COMP (at %) | θs (degree) | Hcs (kOe) | θm (degree) | Hcm (kOe) |
|---|---|---|---|---|
| EXAMPLE 2-17 Nd10 Tb3 Fe47 Co40 | 0.26 | 0.2 | 0.90 | 2.9 |
| EXAMPLE 2-18 Nd15 Tb3 Fe42 Co40 | 0.37 | 0.2 | 1.10 | 3.3 |
| EXAMPLE 2-19 Nd23 Tb3 Fe34 Co40 | 0.39 | 0.2 | 1.15 | 3.3 |
| EXAMPLE 2-20 Nd30 Tb3 Fe27 Co40 | 0.39 | 0.2 | 1.10 | 3.1 |
| EXAMPLE 2-21 Nd35 Tb3 Fe22 Co40 | 0.38 | 0.2 | 0.80 | 2.4 |
| EXAMPLE 2-22 Nd35 Tb10 Fe15 Co40 | 0.28 | 0.4 | 0.70 | 4.0 |
| EXAMPLE 2-23 Nd35 Tb15 Fe10 Co40 | 0.26 | 0.8 | 0.68 | 5.2 |
| EXAMPLE 2-24 Nd30 Tb15 Fe15 Co40 | 0.28 | 1.0 | 0.70 | 7.8 |

TABLE 10

| SAMP No. 1st MAG LAYER COMP (at %) | θs (degree) | Hcs (kOe) | θm (degree) | Hcm (kOe) |
|---|---|---|---|---|
| EXAMPLE 2-25<br>Nd23 Tb15 Fe22 Co40 | 0.29 | 1.2 | 0.75 | 8.6 |
| EXAMPLE 2-26<br>Nd15 Tb15 Fe30 Co40 | 0.27 | 1.0 | 0.72 | 7.3 |
| EXAMPLE 2-27<br>Nd10 Tb15 Fe35 Co40 | 0.26 | 0.8 | 0.69 | 5.6 |
| EXAMPLE 2-28<br>Nd10 Tb10 Fe40 Co40 | 0.29 | 0.4 | 0.80 | 4.0 |
| *EXAMPLE 2-29<br>Nd10 Tb1 Fe49 Co40 | 0.22 | 0.05 | 0.90 | *0.6 |
| *EXAMPLE 2-30<br>Nd23 Tb1 Fe36 Co40 | 0.40 | 0.05 | 1.20 | *1.0 |
| *EXAMPLE 2-31<br>Nd35 Tb1 Fe24 Co40 | 0.37 | 0.05 | 0.68 | *0.8 |
| *EXAMPLE 2-32<br>Nd37 Tb3 Fe20 Co40 | 0.30 | 0.1 | 0.65 | *1.1 |

In Table 10 above, the asterisk * indicates the example which satisfies the following conditions: θm < 0.6° or Hcm < 2.0 kOe

TABLE 11

| SAMP No. 1st MAG LAYER COMP (at %) | θs (degree) | Hcs (kOe) | θm (degree) | Hcm (kOe) |
|---|---|---|---|---|
| *EXAMPLE 2-33<br>Nd37 Tb10 Fe13 Co40 | 0.20 | 0.3 | *0.49 | 2.5 |
| *EXAMPLE 2-34<br>Nd37 Tb15 Fe8 Co40 | 0.18 | 0.5 | *0.55 | 3.9 |
| *EXAMPLE 2-35<br>Nd35 Tb17 Fe8 Co40 | 0.12 | 1.1 | *0.50 | 6.4 |
| *EXAMPLE 2-36<br>Nd23 Tb17 Fe20 Co40 | 0.22 | 1.5 | *0.55 | 9.9 |
| *EXAMPLE 2-37<br>Nd10 Tb17 Fe43 Co40 | 0.18 | 1.1 | *0.50 | 7.0 |
| *EXAMPLE 2-38<br>Nd5 Tb15 Fe40 Co40 | 0.18 | 0.6 | *0.49 | 4.1 |
| *EXAMPLE 2-39<br>Nd5 Tb10 Fe45 Co40 | 0.20 | 0.3 | *0.55 | 1.5 |
| *EXAMPLE 2-40<br>Nd5 Tb3 Fe52 Co40 | 0.22 | 0.1 | 0.75 | *0.4 |

In Table 11 above, the asterisk * indicates the example which satisfies the following conditions: θm < 0.6° or Hcm < 2.0 kOe In Tables 7 to 11, the Kerr rotational angle θm in the laser wavelength of 500 nm measured from the substrate side and the coercivity Hcm are both listed for each composition of the 40 examples 2-1 to 2-40. On the other hand, with respect to the comparative example shown in FIG. 2, the Kerr rotational angle θm obtained when measured from the substrate side in the laser wavelength of 500 nm is 0.60° and the coercivity Hcm is 11.8 kOe.

Tables 7 to 11 indicate the following test results: In the examples 2-1 to 2-28, the Kerr rotational angle is larger than that of the comparative example, and in addition the coercivity is 2 kOe or more. Accordingly, it is possible to provide a magneto-optical recording medium high in the S/N ratio in the short wavelength range and stable in the magnetic recording domains. In general, when the first magnetic layer 11 is formed of the light rare earth element-heavy rare earth element-transition metal alloy (where the light rare earth element is Nd or Pr), it is preferable to satisfy the following conditions:

$10 \leq x \leq 35$ (at %) and
$1 \leq y \leq 15$ (at %)

where x (at %) denotes the composition ratio of the light rare earth element; and y (at %) denotes the composition ratio of the heavy rare earth element.

The other evaluation test results with respect to the embodiment 2 shown will be described hereinbelow.

In this test, the composition of the first magnetic layer 11 was fixed to Nd25 Tb7 Fe33 Co35 (at %), and 8 examples of the composition (the same as in Table 6) of the second magnetic layer 12 were prepared as listed in Table 12. Here, the prepared examples are referred to as the examples 2-41 to 2-48. In Table 12, the Kerr rotational angle θs in the wavelength 500 nm and the coercivity Hcs of the second magnetic layers of single layer structure are both listed for each composition of 8 examples. Further, in the composition of the first magnetic layer 11 of single layer structure, the Kerr rotational angle in the wavelength of 500 mm is 0.34° and the coercivity is 0.8 kOe.

TABLE 12

| SAMP No. 2nd MAG LAYER COMP (at %) | θs (degree) | Hcs (kOe) | θm (degree) | Hcm (kOe) |
|---|---|---|---|---|
| EXAMPLE 2-41<br>Nd8 Tb21 Fe53 Co18 | 0.24 | 10.8 | 1.06 | 6.1 |
| EXAMPLE 2-42<br>Nd8 Dy16 Tb5 Fe53 Co18 | 0.23 | 9.7 | 1.12 | 5.9 |
| EXAMPLE 2-43<br>Nd8 Dy16 Tb5 Fe53 Co18 | 0.42 | 11.4 | 1.09 | 7.0 |
| EXAMPLE 2-44<br>Nd8 Dy22 Fe53 Co19 | 0.25 | 10.4 | 1.06 | 6.8 |
| EXAMPLE 2-45<br>Pr8 Dy16 Tb5 Fe53 Co18 | 0.52 | 8.2 | 1.10 | 5.7 |
| EXAMPLE 2-46<br>Pr8 Tb16 Dy5 Fe53 Co18 | 0.24 | 8.5 | 1.12 | 5.8 |
| EXAMPLE 2-47<br>Tb22 Fe73 Co5 | 0.19 | 12.3 | 0.69 | 8.3 |
| EXAMPLE 2-48<br>Tb22 Fe67 Co6 Cr5 | 0.18 | 11.5 | 0.71 | 8.4 |

In Table 12, the Kerr rotational angle θm measured from the substrate side in the laser wavelength of 500 nm and the coercivity Hcm are both listed for composition of the examples 2-41 to 2-48. Table 12 indicates the following test results: In the examples 2-41 to 2-48, the Kerr rotational angle is larger than that of the comparative example, and in addition the coercivity is 2 kOe or more. Therefore, in these examples 2-41 to 2-48, it is possible to provide the magneto-optical recording medium high in the S/N ratio in the short wavelength range and stable in the recording magnetic domains. In addition, Table 12 indicates that it is possible to obtain a larger Kerr rotational angle when the second magnetic layer 12 is a perpendicular magnetized film including the light rare earth element such as Nd or Pr, as compared with the perpendicular magnetized film including the heavy rare earth element such as Tb as the rare earth element.

The film thickness ratio of the first and second magnetic layers 11 and 12 is so selected that the enhancement of the Kerr rotational angle and the coercivity of the whole recording film 18 can be determined as an appropriate value, respectively.

The film thickness of the recording film 18 is preferably 400 angstrom or less to utilize the advantage of the reflection structure. With respect to this point, the inventors performed the following experiments: A protective layer 14 of 600 angstrom in thickness, a first magnetic layer 11 of 60 angstrom in thickness, a second magnetic layer 12 of x angstrom in thickness, a second protective layer 15 of 200 angstrom in thickness, and a reflection layer 16 of 600 angstrom in thickness are laminated on a polycarbonate substrate 10 in sequence. Examples of the second magnetic layers of x (120, 220, 270, 300 and 350, respectively)

angstrom are prepared. The Kerr rotational angles θm of these examples are measured. Further, the compositions of the respective layers of the respective samples are the same as with the case of the example 1-1. The film thicknesses of the recording films are 200, 300, 350, 380 and 430 angstrom, respectively, and the Kerr rotational angles θm in the wavelength 500 nm obtained when measured from the sample substrate side are 1.05, 0.93, 0.81, 0.72 and 0.61, respectively. Further, the coercivity Hcm of these samples are 4.2, 5.2, 5.6, 5.9 and 6.1 kOe, respectively. In the embodiment 2, the Curie temperatures of the first magnetic layer 11 is 200° C. or higher.

Further, the recording film 18 of two layer sandwich structure in the embodiment 2 can be also utilized as the reproducing film (the magnetic film located the nearest to the laser pickup) as the recording medium for overwriting (exchange coupled with another magnetic film) or the reproducing film as the magnetic induced super resolution recording medium.

EMBODIMENT 3

(Magnetic Induced Super Resolution)

In this embodiment 3, the recording film 18 of two layer sandwich structure in the embodiment 2 is utilized as the reproducing film for the magnetic induced super resolution recording medium.

Figure 4:
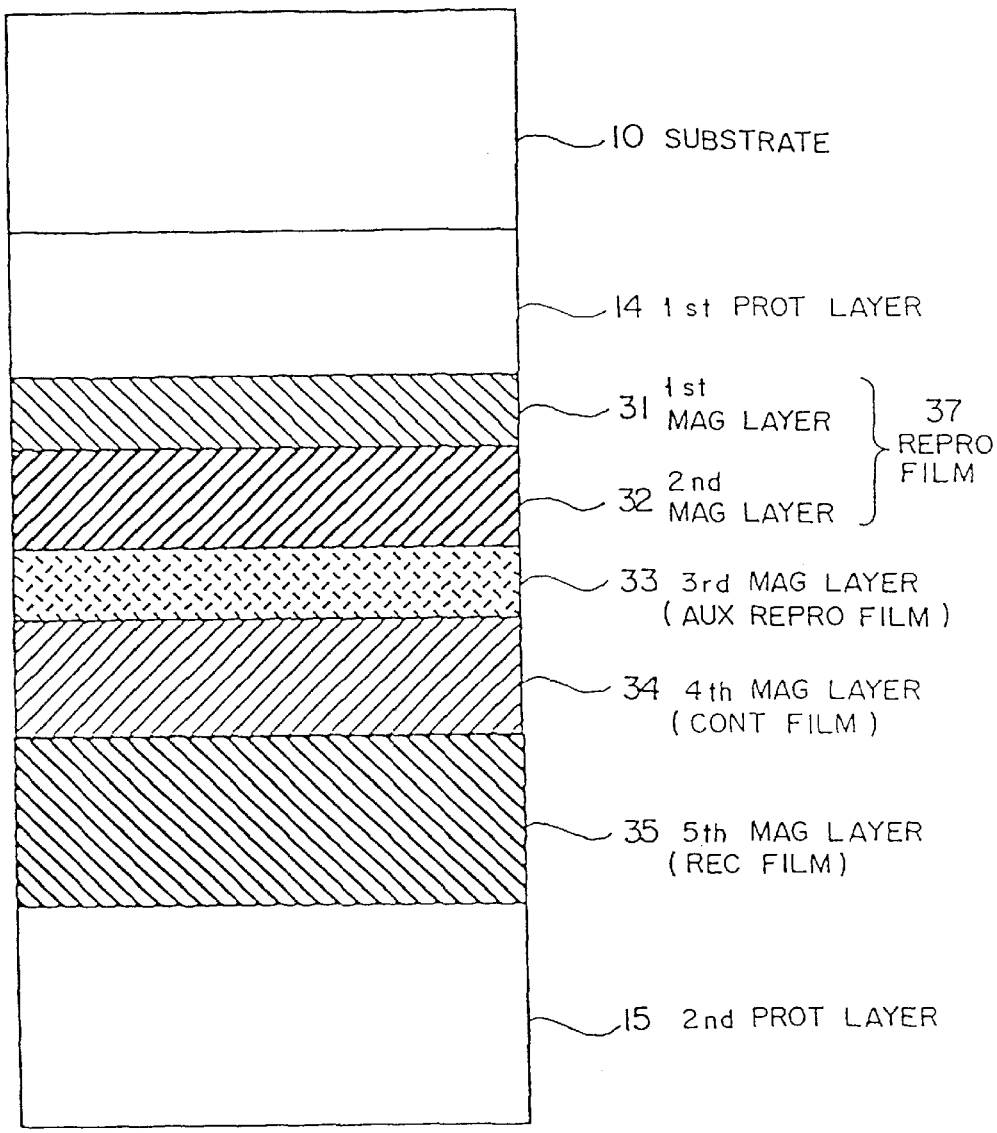
FIG. 4 is a side cross-sectional view showing an embodiment 3.

FIG. 4 is a side cross-sectional view showing the embodiment 3. A first protective layer 14 of 600 angstrom in thickness, a first magnetic layer 31 of 150 angstrom in thickness, a second magnetic layer 32 of 350 angstrom in thickness, a third magnetic layer 33 of 100 angstrom in thickness, a fourth magnetic layer 34 of 200 angstrom in thickness, a fifth magnetic layer 35 of 500 angstrom in thickness, and a second protective layer 15 of 800 angstrom in thickness are laminated on a polycarbonate substrate 10 in sequence by magnetron sputtering. The material of the first and second protective layers 14 and 15 is AlSiN. The first and second magnetic layers 31 and 32 constitute a reproducing film 17 for the magnetic induced super resolution medium of this embodiment. Further, the material of the first and second magnetic layers 31 and 32 is a light rare earth element-heavy rare earth element-transition metal alloy including composition of both the light rare earth major range and heavy rare earth major range, respectively in the same way as in the first and second magnetic layers 11 and 12 of the embodiment 2 as shown in FIG. 3. The third magnetic layer 33 functions as an auxiliary reproducing film for controlling transcription process. The fourth magnetic layer 34 functions as a control film for controlling the interface wall. The fifth magnetic layer 35 functions as a recording film for storing recorded information.

The evaluation test results of the embodiment 3 shown in FIG. 4 will be described hereinbelow.

Table 13 lists the compositions of the magnetic layers 31 to 35 of a sample related to the embodiment 3 used for this test and the physical properties of the magnetic layers of single structure having the same composition. These samples are referred to as an example 3-1.

TABLE 13

| RESP MAG LAYER COMP (at %) | θs (degree) | Hcs (kOe) | Tc (°C.) | |
|---|---|---|---|---|
| MAG LAYER 31<br>Nd23 Tb8 Fe31 Co38 | 0.35 | 0.6 | 280 | TM |
| MAG LAYER 32<br>Nd6 Dy16 Tb3 Fe65 Co10 | 0.24 | 2.1 | 240 | TM |
| MAG LAYER 33<br>Nd6 Dy22 Fe66 Co7 | — | 9.8 | 145 | TM |
| MAG LAYER 34<br>Nd6 Gd21 Fe66 Co7 | — | 0.4 | 250 | TM |
| MAG LAYER 35<br>Dy15 Tb10 Fe47 Co28 | — | 12.0 | 240 | RE |

TM: Transition metal rich
RE: Rare earth element rich

Figure 5:
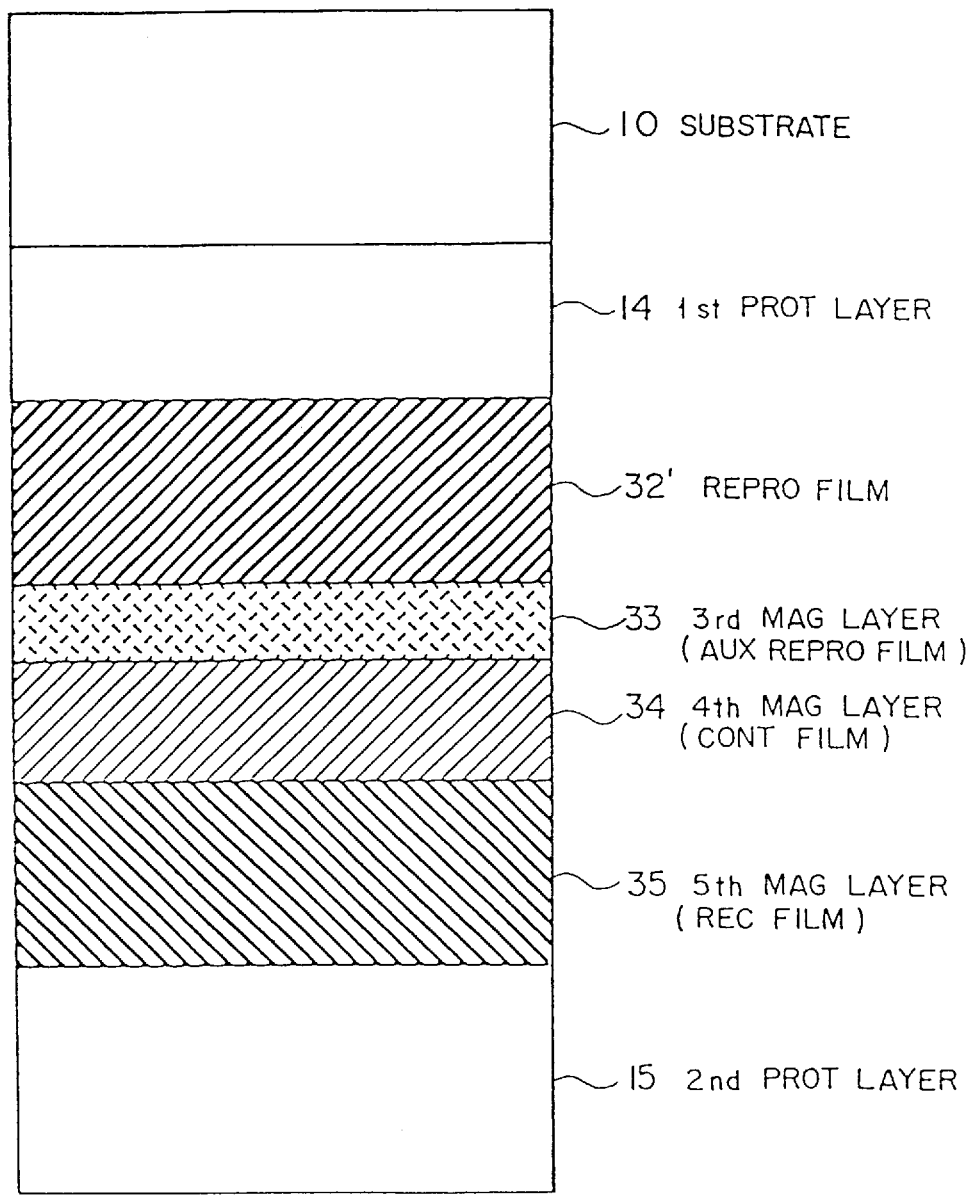
FIG. 5 is a side cross-sectional view showing a comparative example used for the evaluation test of the embodiments 2 and 3.

FIG. 5 is a side cross-sectional view showing a comparative example used for this evaluation test. A first protective layer 14, a reproducing film 32', a third magnetic film (auxiliary reproducing film) 33, a fourth magnetic layer (control film) 34, a fifth magnetic layer (recording film) 35, and a second protective layer 15 are laminated on a transparent substrate 10 in sequence by magnetron sputtering. The film thickness and the material of the layers are the same as those of the embodiment 3, except the reproducing film 32'. With respect to the reproducing film 32', the film thickness is 500 angstrom in the same way as that of the reproducing film 37 of the example 3-1, and the composition is the same as with the case of the second magnetic layer 32.

The Kerr rotational angle of the example 3-1 is 0.670, and that of the comparative example is 0.45° both in the wavelength of 500 nm when measured from the substrate side. This indicates that the example 3-1 is more advantageous in the recording and reproducing characteristics than the comparative example.

Further, the example 3-1 and the comparative example were tested with respect to the recording and reproducing operation in accordance with the following specification: The laser beam is a SHG light beam of 532 nm generated by a semiconductor exited Nd-YAG laser and obtained through a KTiOPO4 element. The diameter of the laser spot is 0.8 μm. A 45 degree differential detection method is adopted, and a PIN photodiode is used as an optical detector. Information signals of 7.0 MHz are written in the example 3-1 and the comparative example at a linear speed of 5.7 m/sec. The initialization magnetizing field is 3.0 kOe, which is opposite to the recording magnetizing field in the direction. Under the above-mentioned specifications, the signals are reproduced in accordance with the magnetic induced super resolution method. The pit error during the signal reproduction is $1.2 \times 10^{-4}$ in the example 3-1 and $2.1 \times 10^{-1}$ in the comparative example, which clearly indicates that the example 3-1 is superior to the comparative example. This is because the Kerr rotational angle of the reproducing film 32' of the comparative example is not sufficiently large in the short wavelength range.

Further, with respect to the above embodiment 3, the same test was made by preparing the sample in which the material Nd of the first and second layers 31 and 32 of the example 3-1 was replaced with Pr. The example is referred to as an example 3-2. Table 14 lists the compositions of the respective layers and the physical properties of the layers of single layer including the same composition.

TABLE 14

| RESP MAG LAYER COMP (at %) | θs (degree) | Hcs (kOe) | Tc (°C.) | |
|---|---|---|---|---|
| MAG LAYER 31 Pr23 Tb8 Fe31 Co38 | 0.34 | 0.7 | 265 | TM |
| MAG LAYER 32 Pr6 Dy16 Tb3 Fe65 Co10 | 0.23 | 1.8 | 235 | TM |
| MAG LAYER 33 Nd6 Dy22 Fe66 Co7 | | 2.1 | 140 | TM |
| MAG LAYER 34 Pr6 Gd21 Fe66 Co7 | | 0.5 | 240 | TM |
| MAG LAYER 35 Dy15 Tb10 Fe47 Co28 | | 12.0 | 240 | RE |

TM: Transition metal rich
RE: Rare earth element rich

In the example 3-2, the Kerr rotational angle θm is 0.66° in the wavelength of 500 nm when measured from the substrate side. Further, the bit error rate during the reproduction in accordance with the magnetic induced super resolution method under the above-mentioned specification is $1.8 \times 10^{-4}$. The above-mentioned results indicate that the example 3-2 is also advantageous in comparison with the comparative example.

With respect to the composition of the first magnetic layer 31 of the embodiment 3, in general, the following relationship is preferable from the standpoint of recording and reproducing characteristics:

$10 \leq x \leq 35$ (at %) and
$1 \leq y \leq 15$ (at %)

where x (at %) denotes the composition ratio of the light rare earth element; and y (at %) denotes the composition ratio of the heavy rare earth element.

Further, another example formed by the respective layers having the same compositions (Table 13) as the example 3-1 but different thickness from the example 3-1 was prepared. This example is referred to as example 3-3. In this example 3-3, the thickness of the respective layer is 700 angstrom in the first protective layer 14; 100 angstrom in the first magnetic layer 31; 200 angstrom in the second magnetic layer 32; 150 angstrom in the third magnetic layer 33; 500 angstrom in the fourth magnetic layer 34; and 800 angstrom in the second protective layer 15. As the results of the reproducing test in accordance with the magnetic induced super resolution method under the above-mentioned specifications, the bit error rate is $2.0 \times 10^{-4}$. The above-mentioned results indicate that the example 3-3 is also advantageous in comparison with the comparative example.

EMBODIMENT 4

TABLE 15

| SAMP No. 2nd MAG LAYER COMP (at %) | θs (degree) | Hcs (kOe) | θm (degree) | Hcm (kOe) |
|---|---|---|---|---|
| EXAMPLE 4-1 Nd15 Tb5 Fe45 Co35 | 0.37 | 0.3 | 0.96 | 5.7 |
| EXAMPLE 4-2 Nd15 Tb8 Fe42 Co35 | 0.33 | 0.4 | 0.95 | 7.2 |
| EXAMPLE 4-3 Nd15 Tb10 Fe40 Co35 | 0.32 | 0.6 | 0.86 | 8.3 |
| EXAMPLE 4-4 Nd23 Tb5 Fe34 Co38 | 0.39 | 0.4 | 1.02 | 6.2 |
| EXAMPLE 4-5 Nd23 Tb8 Fe31 Co38 | 0.36 | 0.6 | 1.00 | 8.4 |
| EXAMPLE 4-6 Nd23 Tb10 Fe29 Co38 | 0.35 | 0.8 | 0.95 | 9.8 |
| EXAMPLE 4-7 Nd30 Tb5 Fe25 Co40 | 0.38 | 0.3 | 0.98 | 5.6 |
| EXAMPLE 4-8 Nd30 Tb8 Fe22 Co40 | 0.33 | 0.4 | 0.95 | 7.0 |

TABLE 16

| SAMP No. 2nd MAG LAYER COMP (at %) | θs (degree) | Hcs (kOe) | θm (degree) | Hcm (kOe) |
|---|---|---|---|---|
| EXAMPLE 4-9 Nd30 Tb10 Fe20 Co40 | 0.32 | 0.6 | 0.81 | 8.5 |
| EXAMPLE 4-10 Nd23 Dy8 Fe29 Co40 | 0.35 | 0.6 | 0.96 | 7.5 |
| EXAMPLE 4-11 Nd23 Tb5 Dy3 Fe29 Co40 | 0.35 | 0.7 | 0.98 | 7.9 |
| EXAMPLE 4-12 Pr15 Tb5 Fe40 Co40 | 0.36 | 0.3 | 0.89 | 6.8 |
| EXAMPLE 4-13 Pr23 Tb8 Fe29 Co40 | 0.36 | 0.7 | 0.92 | 6.9 |
| EXAMPLE 4-14 Pr30 Tb8 Fe30 Co30 | 0.32 | 0.4 | 0.88 | 5.9 |
| EXAMPLE 4-15 Pr23 Tb5 Dy3 Fe29 Co40 | 0.35 | 0.6 | 0.95 | 6.3 |
| EXAMPLE 4-16 Pr23 Dy8 Fe29 Co40 | 0.35 | 0.4 | 0.94 | 5.7 |

TABLE 17

| SAMP No. 2nd MAG LAYER COMP (at %) | θs (degree) | Hcs (kOe) | θm (degree) | Hcm (kOe) |
|---|---|---|---|---|
| EXAMPLE 4-17 Nd10 Tb3 Fe47 Co40 | 0.26 | 0.2 | 0.81 | 2.9 |
| EXAMPLE 4-18 Nd15 Tb3 Fe42 Co40 | 0.37 | 0.2 | 1.02 | 3.5 |
| EXAMPLE 4-19 Nd23 Tb5 Fe34 Co40 | 0.39 | 0.2 | 1.02 | 3.9 |
| EXAMPLE 4-20 Nd30 Tb3 Fe27 Co40 | 0.39 | 0.2 | 1.02 | 3.4 |
| EXAMPLE 4-21 Nd35 Tb3 Fe22 Co40 | 0.38 | 0.2 | 0.76 | 2.9 |
| EXAMPLE 4-22 Nd35 Tb10 Fe15 Co40 | 0.28 | 0.4 | 0.66 | 5.3 |
| EXAMPLE 4-23 Nd35 Tb15 Fe10 Co40 | 0.26 | 0.8 | 0.61 | 7.4 |
| EXAMPLE 4-24 Nd30 Tb15 Fe15 Co40 | 0.28 | 1.0 | 0.68 | 9.3 |

TABLE 18

| SAMP No. 2nd MAG LAYER COMP (at %) | θs (degree) | Hcs (kOe) | θm (degree) | Hcm (kOe) |
|---|---|---|---|---|
| EXAMPLE 4-25 Nd23 Tb15 Fe22 Co40 | 0.29 | 1.2 | 0.71 | 11.5 |
| EXAMPLE 4-26 Nd15 Tb15 Fe30 Co40 | 0.27 | 1.0 | 0.69 | 9.4 |
| EXAMPLE 4-27 Nd10 Tb15 Fe35 Co40 | 0.26 | 0.8 | 0.69 | 7.9 |
| EXAMPLE 4-28 Nd10 Tb10 Fe40 Co40 | 0.29 | 0.4 | 0.78 | 6.8 |
| *EXAMPLE 4-29 Nd10 Tb1 Fe49 Co40 | 0.22 | 0.05 | 0.86 | *0.6 |

TABLE 18-continued

| SAMP No. 2nd MAG LAYER COMP (at %) | θs (degree) | Hcs (kOe) | θm (degree) | Hcm (kOe) |
|---|---|---|---|---|
| *EXAMPLE 4-30 Nd23 Tb1 Fe36 Co40 | 0.40 | 0.05 | 1.00 | *1.3 |
| *EXAMPLE 4-31 Nd35 Tb1 Fe24 Co40 | 0.37 | 0.05 | 0.66 | *0.7 |
| *EXAMPLE 4-32 *Nd37 Tb3 Fe20 Co40 | 0.30 | 0.1 | 0.65 | *0.9 |

In Table 18 above, the asterisk * indicates the example which satisfies the following conditions: θm < 0.6° or HCM < 2.0 kOe

TABLE 19

| SAMP No. 2nd MAG LAYER COMP (at %) | θs (degree) | Hcs (kOe) | θm (degree) | Hcm (kOe) |
|---|---|---|---|---|
| *EXAMPLE 4-33 Nd37 Tb10 Fe13 Co40 | 0.20 | 0.3 | *0.45 | 2.3 |
| *EXAMPLE 4-34 Nd37 Tb15 Fe8 Co40 | 0.18 | 0.5 | *0.51 | 3.9 |
| *EXAMPLE 4-35 Nd35 Tb17 Fe8 Co40 | 0.12 | 1.1 | *0.48 | 8.1 |
| *EXAMPLE 4-36 Nd23 Tb17 Fe20 Co40 | 0.22 | 1.5 | *0.52 | 12.3 |
| EXAMPLE 4-37 Nd10 Tb17 Fe43 Co40 | 0.18 | 1.1 | *0.49 | 9.0 |
| *EXAMPLE 4-38 Nd5 Tb15 Fe40 Co40 | 0.18 | 0.6 | *0.46 | 8.1 |
| *EXAMPLE 4-39 Nd5 Tb10 Fe45 Co40 | 0.20 | 0.3 | *0.50 | 4.9 |
| *EXAMPLE 4-40 Nd5 Tb3 Fe52 Co40 | 0.22 | 0.1 | 0.71 | *0.5 |

In Table 19 above, the asterisk * indicates the example which satisifies the following conditions: θm < 0.6° or Hcm < 2.0 kOe

EMBODIMENT 4

(3-Layer Sandwich+Reflection Structure)

Figure 6:
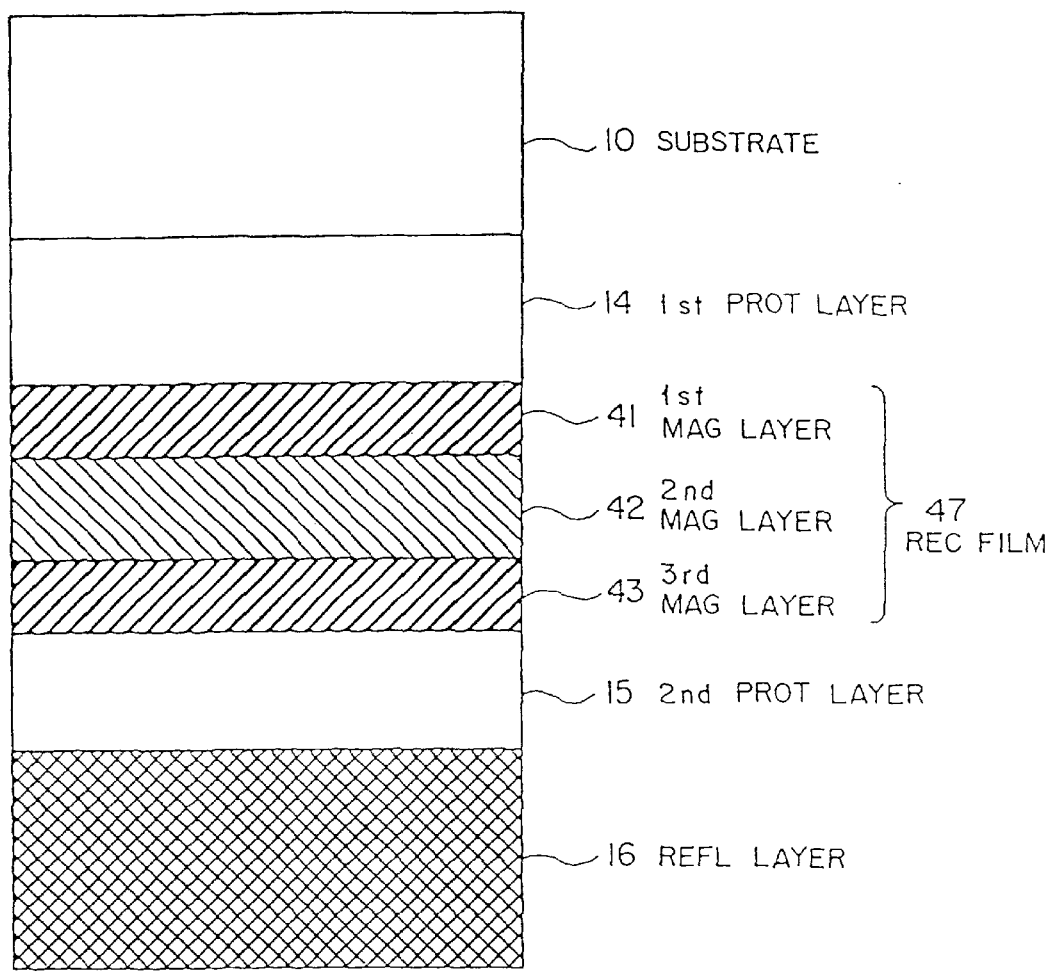
FIG. 6 is a side cross-sectional view showing an embodiment 4.

FIG. 6 is a side cross-sectional view showing the embodiment 4. A first protective layer 14 of 600 angstrom in thickness, a first magnetic layer 41 of 60 angstrom in thickness, a second magnetic layer 42 of 80 angstrom in thickness, a third magnetic layer 43 of 60 angstrom in thickness, a second protective layer 15 of 200 angstrom in thickness, and a reflection layer 16 of 600 angstrom in thickness are laminated on a polycarbonate substrate 10 in sequence by magnetron sputtering. The material of the first and second protective layers 14 and 15 is AlSiN; and that of the reflection layer 16 is Ag of 200 angstrom thickness and A196 Ti4 (at %) of 400 angstrom thickness both laminated in this sequence. Further, the material of the first and third magnetic layers 41 and 43 is a light rare earth element-heavy rare earth element-transition metal alloy of hte heary rare earth major range composition. The second magnetic layer 42 is a light rare earth element-heavy rare earth element-transition metal alloy of the light rare earth major range composition.

The evaluation test results of the embodiment 4 will be described hereinbelow.

Figure 7:
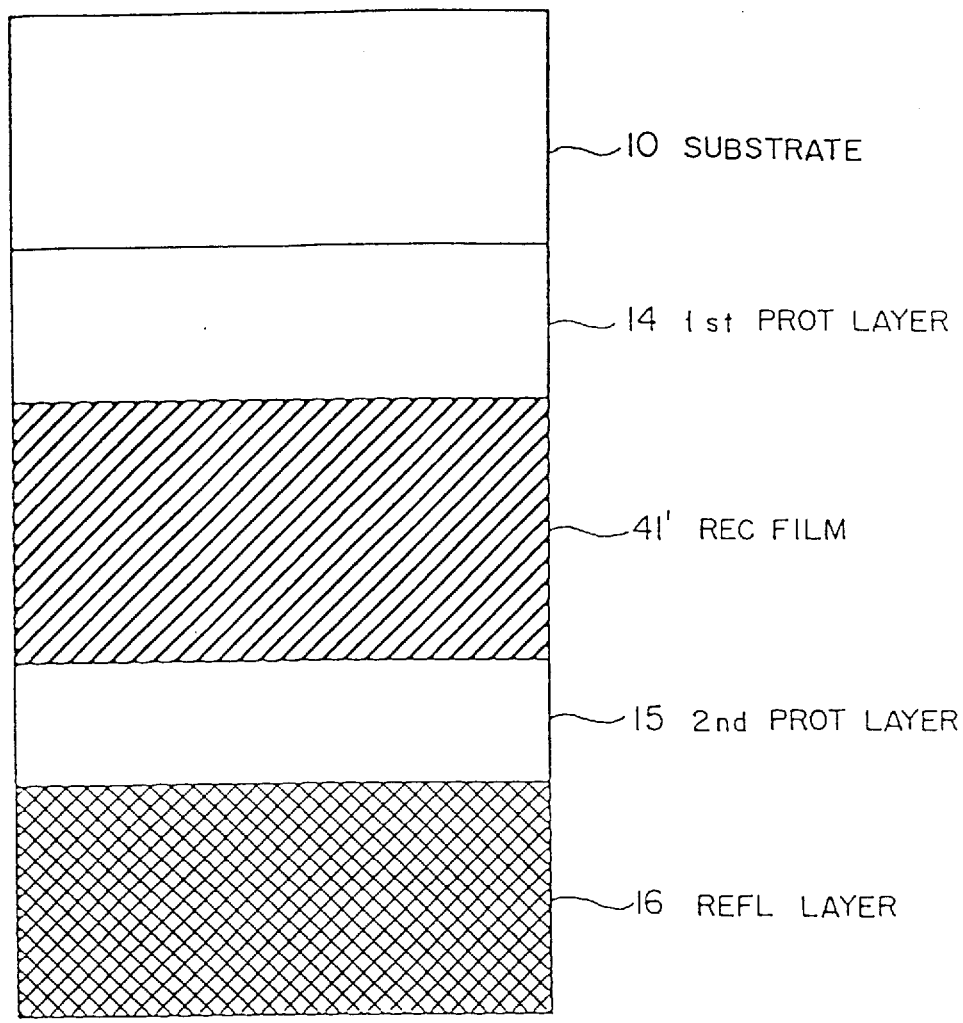
FIG. 7 is a side cross-sectional view showing a comparative example used for the evaluation test of the embodiment 4.

FIG. 7 is a side cross-sectional view showing a comparative example used for the evaluation test. A first protective layer 14 of 600 angstrom in thickness, a recording film 41' of single layer structure with a thickness of 200 angstrom, a second protective layer 15 of 200 angstrom in thickness, and a reflection layer 16 of 600 angstrom in thickness are lamianted on a polycarbonate substrate 10 in sequence by magnetron sputtering. The material of the protective layers 14 and 15 is ALSiN, and that of the reflection layer 16 is Ag of 200 angstrom thickness and A196 Ti4 (at %) both laminted in this sequence. Furhter, the reflection factors of Ag and AlTi are 98% and 90%, respectively. Further, the material of the recording film 41' is an alloy of Nd6 Dy22 Fe52 Co22 (at %) of heavy rare earth major range composition. In the single layer of the recording film 41', the Kerr rotational angle in the laser wavelength of 500 nm is 0.25° and the coercivity is 10.5 kOe.

In the evaluation test of the embodiment 4, the material of the first and third magnetic layers 41 and 43 is the same as that Nd6 Dy22 Fe52 Co20 (at %) of the heavy rare earth major range composition in the recording film 41' of the comparative example. Further, with respect to the second magnetic layer 42, 40 samples of different composition as listed in Tables 15, 16, 17, 18 and 19 were prepared. These samples are referred to as the example 4-1 to example 4-40 hereinafter. The materials of the protective layers 14 and 15 and the reflective layer 16 of these examples are the same as those of the comparative example. Further, in Tables 15 to 19, the Kerr rotational angle θs in the laser wavelength of 500 nm and the coercivity Hcs of the magnetic layers of single layer structure are both listed for each composition of 40 examples.

In Tables 15 to 19, the Kerr rotational angle θm measured from the substrate side in the laser wavelength of 500 nm and the coercivity Hcm are both listed for each composition of the examples 4-1 to 4-40. On the other hand, with respect to the comparative example, the Kerr rotational angle θm when measured from the substrate side in the laser wavelength of 500 nm is 0.60° and the coercivity Hcm is 11.8 kOe Tables 15 to 19 indicate that in the examples 4-1 to 4-28, the Kerr rotational angle is larger than that of the comparative example, and in addition the coercivity is 2 kOe or more, so that the S/N ratio is high in the short wavelength range and it is possible to provide a magneto-optical recording medium stable in the magnetic recording domains. In general, when the second magnetic layer 42 is formed of the light rare earth element-heavy rare earth element-transition metal alloy (where the light rare earth element is Nd or Pr), it is preferable to satisfy the following conditions:

$10 \leq x \leq 35$ (at %) and
$1 \leq y \leq 15$ (at %)

where x (at %) denotes the composition ratio of the light rare earth element; and y (at %) denotes the composition ratio of the heavy rare earth element.

The other evaluation test results will be described hereinbelow.

In this test related to the embodiment 4, the composition of the second magnetic layer 42 was fixed to Nd25 Tb7 Fe33 Co35 (at %), and 8 examples having the first and third magnetic layers 41 and 43 of different composition respectively were prepared as listed in Table 20. Here, the prepared examples are referred to as the embodiments 4-41 to 4-48. In Table 20, the Kerr rotational angle θs in the wavelength 500 nm and the coercivity Hcs of the respective first and third magnetic layers of single layer structure are both listed for each composition of the above-mentioned 8 examples. Further, in the second magnetic layer 42 of single layer structure, the Kerr rotational angle is 0.34° in the wavelength 500 nm and the coercivity is 0.8 kOe.

TABLE 20

| SAMP NO. 3rd MAG LAYER COMP (at %) | θs (degree) | Hcs (kOe) | θm (degree) | Hcm (kOe) |
|---|---|---|---|---|
| EXAMPLE 4-41<br>Nd8 Tb21 Fe53 Co18 | 0.24 | 10.8 | 1.00 | 8.3 |
| EXAMPLE 4-42<br>Nd8 Dy16 Tb5 Fe53 Co18 | 0.23 | 9.7 | 1.05 | 7.9 |
| EXAMPLE 4-43<br>Nd8 Tb16 Dy5 Fe53 Co18 | 0.24 | 11.4 | 0.98 | 7.8 |
| EXAMPLE 4-44<br>Nd8 Dy22 Fe53 Co19 | 0.25 | 10.4 | 0.96 | 8.2 |
| EXAMPLE 4-45<br>Pr8 Dy16 Tb5 Fe53 Co18 | 0.25 | 8.2 | 1.02 | 8.3 |
| EXAMPLE 4-46<br>Pr8 Tb16 Dy5 Fe53 Co18 | 0.24 | 8.5 | 1.03 | 8.0 |
| EXAMPLE 4-47<br>Tb22 Fe73 Co5 | 0.19 | 12.3 | 0.66 | 10.5 |
| EXAMPLE 4-48<br>Tb22 Fe67 Co6 Cr5 | 0.18 | 11.5 | 0.65 | 11.0 |

In Table 20, the Kerr rotational angle θm measured from the substrate side in the laser wavelength of 500 nm and the coercivity Hcm are both listed for each composition of the respective examples. Table 20 indicates that in the examples 4-41 to 4-48, the Kerr rotational angle is larger than that of the comparative example, and in addition the coercivity is 2 kOe or more, so that the S/N ratio is high in the short wavelength range. Therefore, in these examples, it is possible to provide the magneto-optical recording medium stable in the recording magnetic domains. In addition, Table 20 indicates that it is possible to obtain a larger Kerr rotational angle when the first and third magnetic layers 41 and 43 are of perpendicular magnetized film including only light rare earth element such as Nd or Pr, as compared with when the magnetic layers 41 and 43 are of perpendicular magnetized film including only heavy rare earth element such as Tb as the rare earth element.

Further, in the embodiment as shown in FIG. 6, it is possible to obtain the same effects as described above, even if the first and third magnetic layers 41 and 43 are not necessarily the same in composition with respect to each other. The test results which can verify the above fact will be described hereinbelow.

Table 21 lists the composition examples of the first and third magnetic layers 41 and 43 adopted in this test, which are referred to as composition 1 to composition 4. Further, in Table 21, the Kerr rotational angle in the wavelength of 500 nm and the coercivity of the magnetic layers of single layer structure are shown for each composition example. In these composition examples, the composition 1 is a composition example provided with the condition that the transition metal (TM) is rich (the composition in which the sublattice magnetization of the transition metal is prominent at room temperature) and further away from the compensation composition (the composition in which the sublattice magnetization of the transition metal is in balance with that of the rare earth metal). The composition 2 is a composition example provided with the condition that the transition metal (TM) is rich and further near the compensation composition. The composition 3 is a composition example provided with the condition that the rare earth metal (RE) is rich (the composition in which the sublattice magnetization of the rare earth metal is prominentat at room temperature) and further near the compensation composition. The composition 4 is a composition example provided with the condition that the composition includes only the heavy rare earth element (e.g., Tb) as the rare earth metal (referred to as heavy rare earth base composition, hereinafter) and further TM is rich.

TABLE 21

| COMP (at %) | θs (degree) | Hcs (kOe) | Tc (°C.) | |
|---|---|---|---|---|
| COMP 1<br>Nd6 Dy16 Tb3 Fe60 Co15 | 0.25 | 4.0 | 180 | TM |
| COMP 2<br>Nd6 Dy16 Tb6 Fe56 Co16 | 0.23 | 10.5 | 170 | TM |
| COMP 3<br>Nd6 Dy16 Tb8 Fe54 Co16 | 0.20 | 11.4 | 160 | RE |
| COMP 4<br>Tb22 Fe73 Co5 | 0.18 | 12.3 | 180 | TM |

TM: Transition metal rich
RE: Rare earth element rich

Table 22 lists the composition combinations of the first and third magnetic layers 41 and 43 of the samples used for this test. These samples are referred to as examples 4-49 to 4-54.

TABLE 22

| | 1st MAG LAYER 41/<br>3rd MAG LAYER 43 | θm (degree) | Hcr (kOe) |
|---|---|---|---|
| EXAMPLE 4-49 | COMP 1/COMP 1 | 1.16 | 2.1 |
| EXAMPLE 4-50 | COMP 1/COMP 2 | 1.10 | 4.9 |
| EXAMPLE 4-51 | COMP 2/COMP 2 | 1.04 | 7.5 |
| EXAMPLE 4-52 | COMP 2/COMP 3 | 0.81 | 10.1 |
| EXAMPLE 4-53 | COMP 1/COMP 3 | 0.91 | 8.6 |
| EXAMPLE 4-54 | COMP 1/COMP 4 | 0.75 | 12.4 |

Table 22 lists the Kerr rotational angle θm in the wavelength 500 nm and the extinction field Hcr measured for the examples 4-49 to 4-54, respectively. Here, the extinction field Hcr is one index indicating the stability of the recording domain as defined below. That is, a recording domain with a radius of 0.25 μm is formed in a recording layer 47 in accordance with the optical modulation recording method, and thereafter an external magnetic field is increasingly applied to the recording layer 47 in the direction opposite to the magnetization direction of the first magnetic layer 41. In this case, an intensity of the external field increased until the recording domain is extinguished is defined as the extinction field Hcr.

As understood by Tables 21 and 22, in the combinations (examples 4-52 and 4-53) such that the first magnetic layer 41 is of TM rich composition and the third magnetic layer 43 is of RE rich composition, the Kerr rotational angle is the largest and therefore the extinction field is the highest, so that it is possible to provide stable recording domains. This is because since the TM rich composition and the RE rich composition are opposite to each other with respect to the apparent magnetization direction, it may be due to the fact that the energy at the whole recording domains of the recording film 47 is low and therefore stable, as compared with the combination of only TM rich compositions or only RE rich compositions. In addition, since the Kerr rotational angle of the TM rich composition is larger than that of the RE rich composition (in particular, the Kerr rotational angle increases as the composition goes away from the compensation composition), the enhancement of the Kerr rotational angle can be considered as being large when the first magnetic layer 41 located near the optical head side is formed of TM rich composition, as compared with the case where the third magnetic layer 43 located on the side of the reflection layer 16 is formed of TM rich composition.

Figure 8:
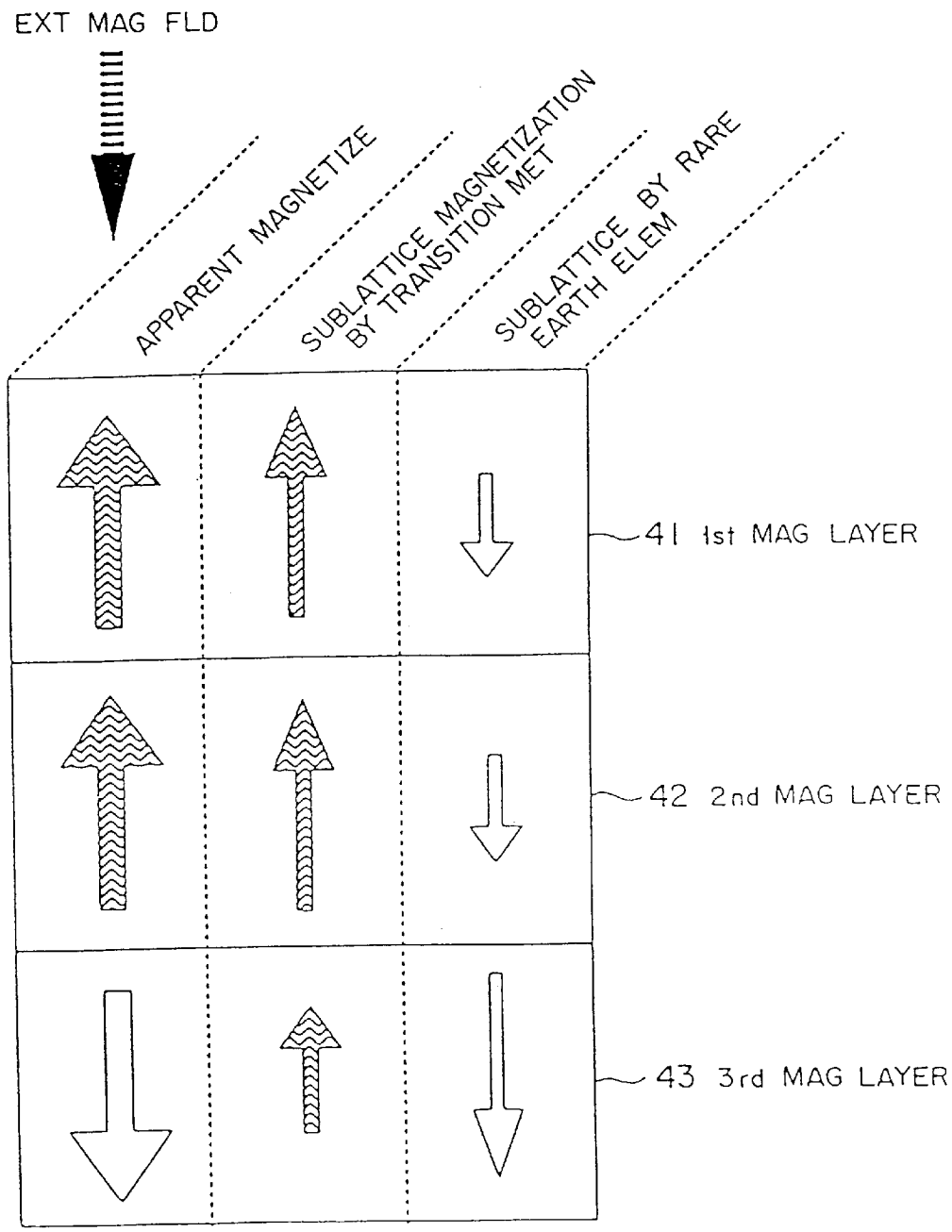
FIG. 8 is an illustration for assistance in explaining the magnetization directions of the recording domains formed in the magnetic layers.

FIG. 8 shows the magnetization states of the recording domains in the recording film 47 of the above-mentioned desirable examples 4-52 and 4-53, which are classified according to the apparent magnetization and the sublattice magnetization. FIG. 8 indicates that the apparent magnetization direction of the third magnetic layer 43 formed of the RE rich composition is the same as the external magnetic field, so that the component for expanding the recording domain is included in the force applied to the side surface wall of the recording domain.

In addition, Tables 21 and 22 indicate the following facts: in the example 4-50, since the first and third magnetic layers 41 and 43 are both of TM rich composition (the Kerr rotational angle is large in the short wavelength range, as compared with the RE rich composition) and further the first magnetic layer 41 is away from the compensation composition, the Kerr rotational angle is large in the short wavelength. In addition, since the third magnetic layer 43 is of composition near the compensation composition, the coercivity is high. Under these conditions, however, in the example 4-50, the Kerr rotational angle in short wavelength is large and in addition the extinction magnetic field is also large, so that it is possible to provide recording medium whose recording domains are relatively stable. Further, as with the case of the example 4-54, when the first magnetic layer 41 is formed of a light rare earth element-heavy rare earth element-transition metal alloy of TM rich composition and further the third magnetic layer 43 is formed of a heavy rare earth element base alloy such as TbFeCo having a small Kerr rotational angle but a large coercivity, it is possible to increase the coercivity of the recording film 47 as a whole.

The film thickness ratios of the magnetic layers 41, 42 and 43 are selected so that the enhancement of the Kerr rotational angle and the coercivity of the whole recording film 47 can be determined as an appropriate value, respectively.

The film thickness of the recording film 47 is preferably 400 angstrom or less in order to utilize the advantage of the reflection structure. The test with respect to the film thickness of the recording film 47 was made as follows: A first protective layer 14 of 600 angstrom in thickness, a first magnetic layer 41 of 60 angstrom in thickness, a second magnetic layer 42 of 80 angstrom in thickness, a third magnetic layer 43 of x angstrom in thickness, a second protective layer 15 of 200 angstrom in thickness, and a reflection layer 16 of 600 angstrom in thickness are laminated on a polycarbonate substrate 10 in sequence. Examples having the third magnetic layers of x (60, 160, 220, 240 and 290, respectively) angstrom are prepared. The Kerr rotational angles θm of these examples are measured from the substrate side. Further, the composition of the respective layers of the respective samples are the same as with the case of the embodiment 1-1. The film thicknesses of these samples are 200, 300, 350, 380 and 430 angstrom, respectively, and the Kerr rotational angles θm in the wavelength 500 nm obtained when measured from the sample substrate side are 0.96, 0.90, 0.81, 0.69 and 0.61, respectively. Further, the coercivity Hcm of these samples are 5.7, 6.5, 6.9, 7.2 and 7.3 kOe, respectively.

In the embodiment 4 as shown in FIG. 6, the Curie temperatures of the second magnetic layer 42 are 200° C. or higher.

The reason why the reflection layer 16 is formed by two layers of Ag and AlTi in the embodiment 4 as shown in FIG. 6 is as follows: since Ag is high in reflection factor in short wavelength, it is possible to increase the reflection factor of the whole medium, and further the performance index is increased. Further, since AlTi high in corrosion resistance and stable in reliability is laminated on the Ag layer of high reflection factor for realizing a composite material, it is possible to provide a reflection layer high in both reflection factor and reliability. Further, in this composite structure, it is possible to obtain the same effect as above, even if more economical Al (reflection factor: 92%) is used instead of Ag.

EMBODIMENT 5

(Overwrite)

Figure 9:
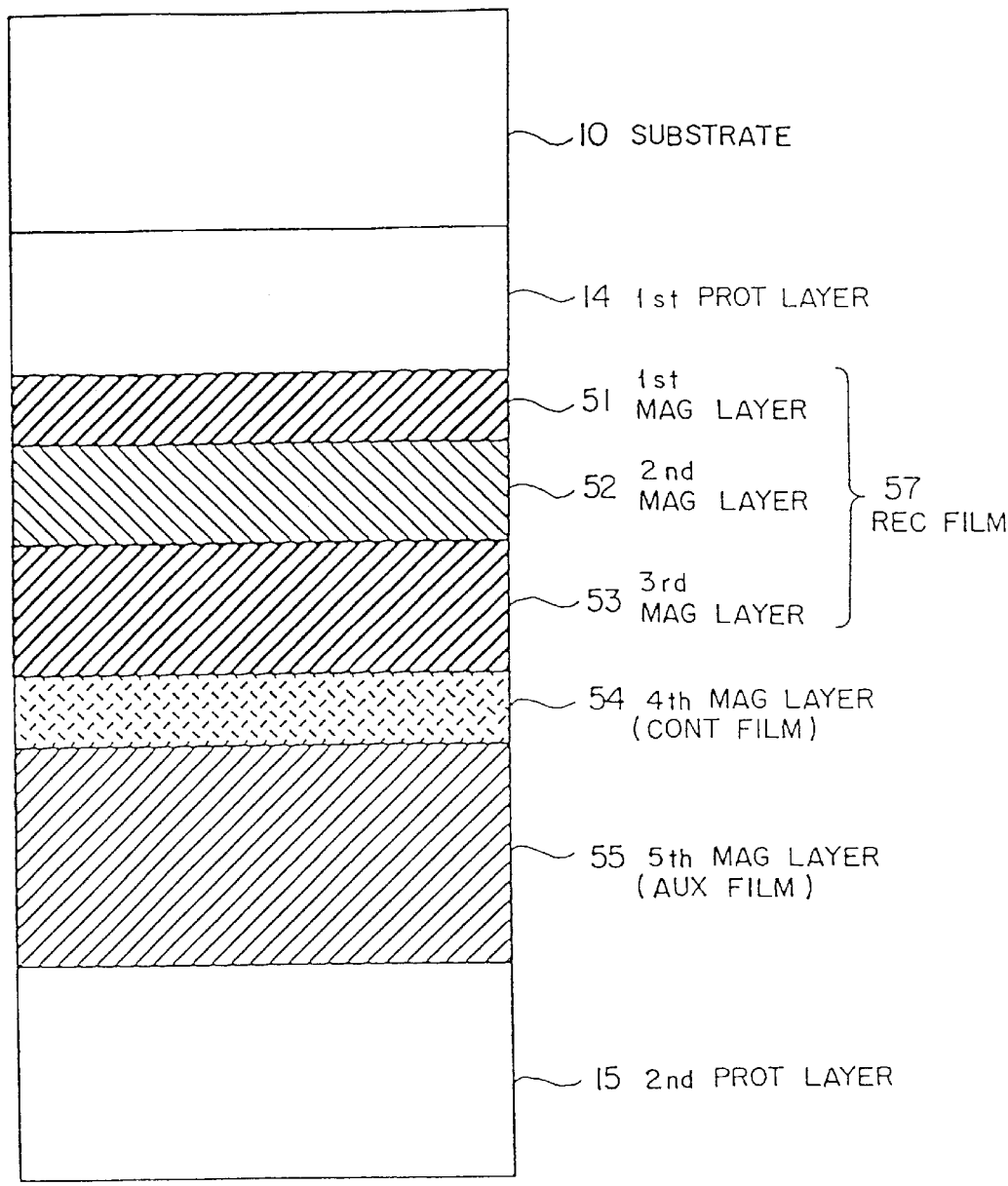
FIG. 9 is a side cross-sectional view showing an embodiment 5.

In this embodiment 5, a recording film 47 of the sandwich structure as shown in FIG. 6 is applied to the recording film of optical modulation overwrite type medium using an exchange coupled multilayer film. FIG. 9 is a cross-sectional view showing this embodiment 5. In FIG. 9, a first protective layer 14 of 600 angstrom thickness, a first magnetic layer 51 of 80 angstrom thickness, a second magnetic layer 52 of 100 angstrom thickness, a third magnetic layer 53 of 300 angstrom thickness, a fourth magnetic layer 54 of 150 angstrom thickness, a fifth magnetic layer 55 of 700 angstrom thickness, and a second protective layer 15 of 800 angstrom thickness are laminated in sequence on a transparent substrate 10 by magnetron sputtering. The protective layers 14 and 15 are formed of AlSiN. The first, second and third magnetic layers 51, 52 and 53 constitute a recording film 57, the respective compositions of which are the same as those of the first, second and third magnetic layers of the example 4 shown in FIG. 6. The fourth magnetic layer 54 functions as a control film for controlling the interface wall energy. The fifth magnetic layer 55 functions as an auxiliary layer for holding the initialized magnetization information.

Figure 10:
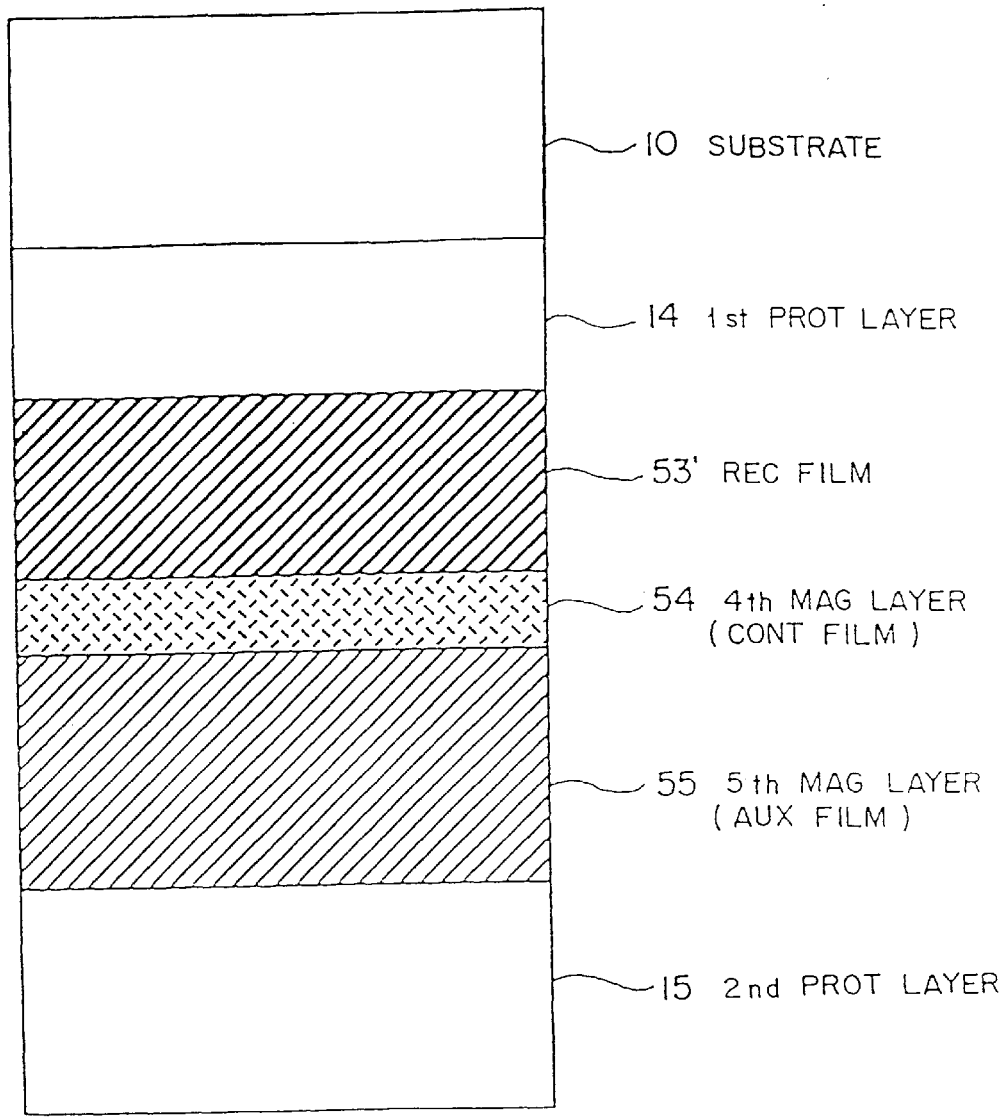
FIG. 10 is a side cross-sectional view showing a comparative example used for the evaluation test of the embodiment 5.
Figure 11:
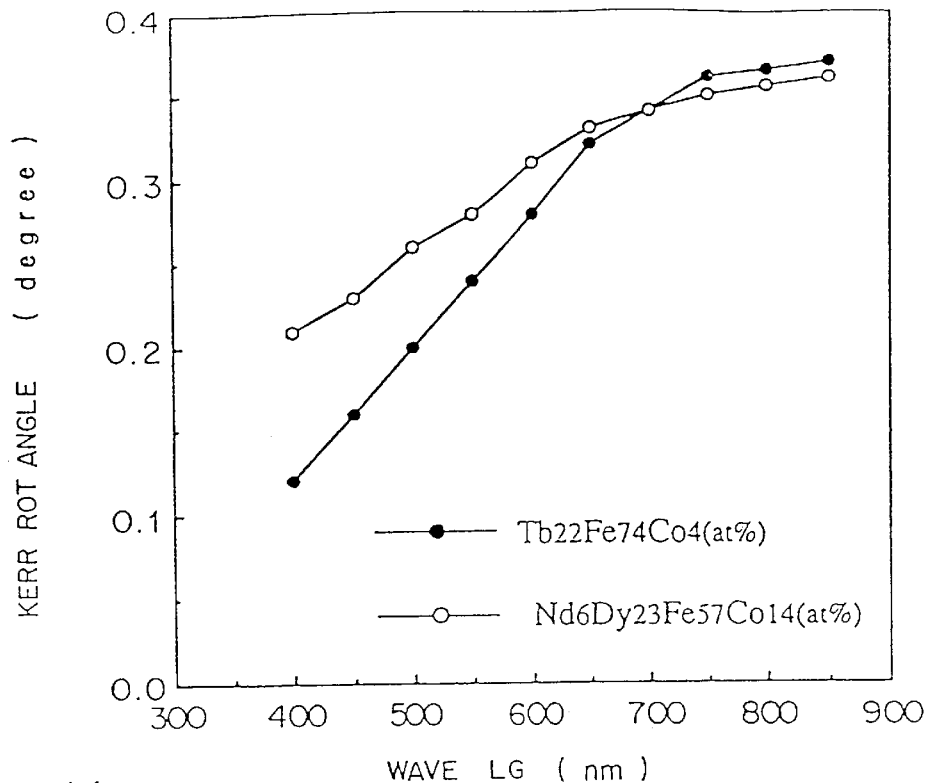
FIG. 11 is a graphical representation showing the Kerr rotational angles of NdDyTbFeCo and TbFeCo.
Figure 12:
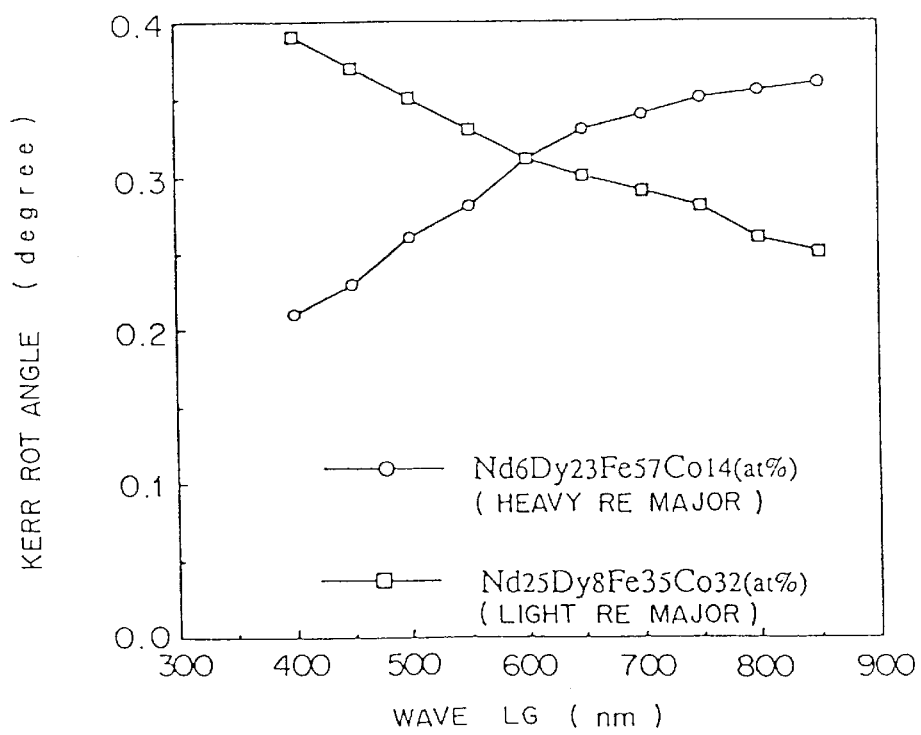
FIG. 12 is a graphical representation showing the Kerr rotational angles of Nd base alloy in both the heavy rare earth major range and the light rare earth major range.

FIG. 10 is a side cross-sectional view showing the comparative example used for this test. In this comparative example, the material and the film thickness of the respective layers are the same as those of the embodiment 5, except the recording film 53'. The composition of the recording film 53' is the same as that of the third magnetic layer 53 of the embodiment 5 shown in FIG. 9, and the film thickness thereof is 480 angstrom.

Table 23 lists the compositions of the magnetic layers 51 to 55 of a sample prepared for the embodiment 5 shown in FIG. 9 and the physical properties of the respective layers of single layer structure including the same composition. Hereinafter, the sample is referred to as an example 5-1.

TABLE 23

| RESP MAG LAYER COMP (at %) | θs (degree) | Hcs (kOe) | Tc (°C.) | |
|---|---|---|---|---|
| MAG LAYER 51 Nd6 Dy16 Tb3 Fe60 Co15 | 0.25 | 4.0 | 180 | TM |
| MAG LAYER 52 Nd23 Tb8 Fe31 Co38 | 0.35 | 0.6 | 280 | TM |
| MAG LAYER 53 Nd6 Dy16 Tb6 Fe65 Co10 | 0.23 | 11.8 | 140 | TM |
| MAG LAYER 54 Nd6 Gd21 Fe66 Co7 | | 0.4 | 250 | TM |
| MAG LAYER 55 Dy30 Fe41 Co29 | | 12.0 | 250 | RE |

TM: Transition metal rich
RE: Rare earth element rich

The example 5-1 and the comparative example were both measured. The Kerr rotational angle thereof are 0.65° and 0.45°, respectively.

Further, the recording and reproducing test was made to indicate that the example 5-1 is more advantageous than the comparative example, under the following specifications:

The laser beam is a SHG light beam of 532 nm generated by a semiconductor exited Nd-YAG laser and obtained through a KTiOPO4 element. The laser beam is modulated by an AOM element. The diameter of the laser spot is 0.8 μm. A 45 degree differential detection method is adopted, and a PIN photodiode is used as an optical detector. First, a signal of 3.0 MHz is recorded, and further a signal of 5.0 MHz is overwritten. The laser power is modulated into binary of lower power Pl and high power Ph during overwriting operation. The low power Pl and the high power Ph are determined as follows:

Pr<Pl<Ph where Pr denotes the laser power for reproducing the signal. As practical values, Pr=1.0 mW
Pl=2.7 mW
Ph=6.0 mW The linear speed is 5.7 m/sec. The initialization magnetizing field is 3.0 kOe. The recording magnetic field and the initialization magnetic field are the same in direction with respect to each other. As the test results, the pit error during the signal reproduction is $1.0 \times 10^{-5}$ in the example 5-1 and $7.1 \times 10^{-2}$ in the comparative example, which clearly indicates that the example 5-1 is superior to the comparative example. This is because the Kerr rotational angle of the recording film 53' of the comparative example is not sufficiently large in the short wavelength range.

Further, other samples in which Nd in the compositions of the magnetic layers 51 to 54 listed in Table 23 was replaced with Pr were prepared, and the similar test was made. This sample is referred to as an example 5-2. Table 24 lists the composition of the respective layers and the physical properties of the respective layers of single layer structure including the same composition.

TABLE 24

| RESP MAG LAYER COMP (at %) | θs (degree) | Hcs (kOe) | Tc (°C.) | |
|---|---|---|---|---|
| MAG LAYER 51 Pr5 Dy16 Tb3 Fe60 Co15 | 0.24 | 3.3 | 190 | TM |
| MAG LAYER 52 Pr24 Tb8 Fe31 Co37 | 0.34 | 0.5 | 270 | TM |
| MAG LAYER 53 Pr6 Dy16 Tb6 Fe65 Co10 | 0.22 | 13.0 | 140 | TM |
| MAG LAYER 54 Pr6 Gd21 Fe66 Co7 |  | 0.3 | 240 | TM |
| MAG LAYER 55 Dy30 Fe41 Co29 |  | 1.2 | 250 | RE |

TM: Transition metal rich
RE: Rare earth element rich

With respect to this example 5-2, the Kerr rotational angle θm in the wavelength of 500 nm is 0.63° when measured from the substrate side. As the result of the overwrite and reproduction test under the afore-mentioned specifications, the bit error rate is $1.1 \times 10^{-5}$. Therefore, this example 5-2 is more advantageous than the comparative example.

With respect to the second magnetic layer 52 of the embodiment 5 shown in FIG. 9, in general, it is preferable to satisfy the following relationship from the standpoint of recording and reproducing characteristics:

$10 \leq x \leq 35$ (at %)
$1 \leq y \leq 15$ (at %)

where x (at %) denotes the composition ratio of the light rare earth element, and y (at %) denotes the composition ratio of the heavy rare earth element.

Further, in the example 5-1, other samples in which the composition of the fourth magnetic layer 54 was replaced with the composition Nd23 Tb8 Fe31 Co38 (at %) the same as that of the second magnetic layer 52 were prepared, and the test the same as above was made. This example is referred to as an example 5-3, hereinafter. As the result of the overwrite and reproducing test with respect to the example 5-3, the bit error rate is $2.2 \times 10^{-4}$. This example 5-3 is also more advantageous than the comparative example.

This example 5-3 is advantageous in manufacturing cost, because the sputtering target can be used in common for forming the second magnetic layer 52 and the fourth magnetic layer 54 during the process of manufacturing the multilayer magnetic film. The reason why the second magnetic layer 52 and the fourth magnetic layer 54 can be formed of the same composition is that there exists the common composition range in which the coercivity and Curie temperature suitable for both the second magnetic layer 52 and the fourth magnetic layer 54 (control layer) can be obtained. Here, the common range in which the physical properties optimum both for the second and fourth magnetic layers 52 and 54 are 2.0 kOe or less in coercivity and 180° C. or more in Curie temperature Tc.

EMBODIMENT 6

(NdCo)

Figure 13:
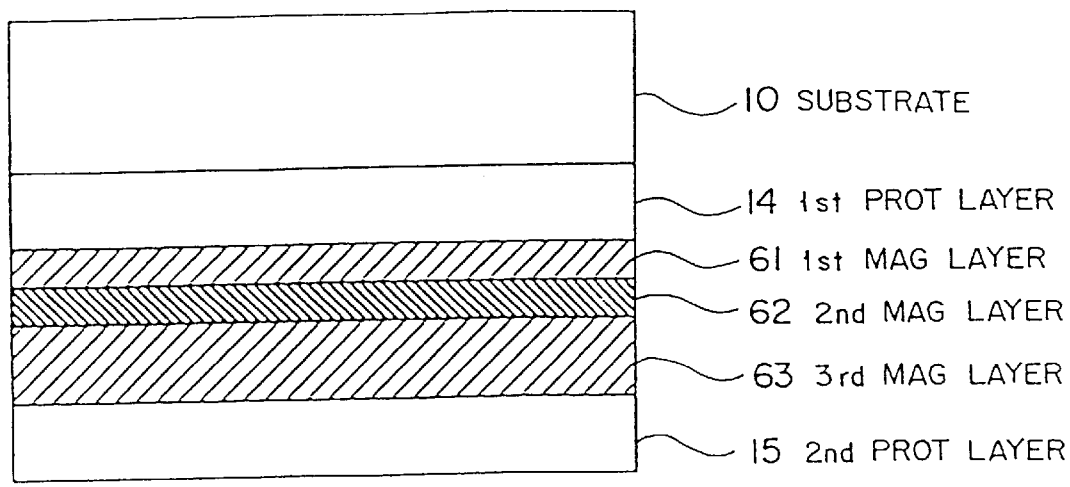
FIG. 13 is a side cross-sectional view showing an embodiment 6.

FIG. 13 is a side cross-sectional view showing this embodiment 6. A first protective layer 14 with a thickness of 700 angstrom, a first magnetic layer 61 with a thickness of 80 angstrom, a second magnetic layer 62 with a thickness of 80 angstrom, a third magnetic layer 63 with a thickness of 800 angstrom, and a second protective layer 15 with a thickness of 800 angstrom are laminated in sequence on a polycarbonate substrate 10 by magnetron sputtering.

In the sample (example 6-1) prepared for the evaluation test, the first magnetic layer 61 is Nd5.9 Dy21.9 Fe51.8 Co20.4 (at %); the second magnetic layer 62 is Nd21.0 Co79.0 (at %); and the third magnetic layer 63 is Nd5.9 Dy15.9 Fe61.8 Co10.4 (at %). Further, the protective layers 14 and 15 are AlSiN.

The comparative example used for the evaluation test of this embodiment 6 is the same as the embodiment 6 in the structure shown in FIG. 13 and in the thicknesses of the respective layers, except the composition of the first and third magnetic layers 61 to 63 as follows: the first magnetic layer 61 is Tb20.0 Fe48.9 Co31.1 (at %); the second magnetic layer 62 is Nd21.0 Co79.0; and the third magnetic layer 63 is Tb20.0 Fe4.8 Co31.1 (at %). Further, the protective layer is AlSiN.

Figure 14:
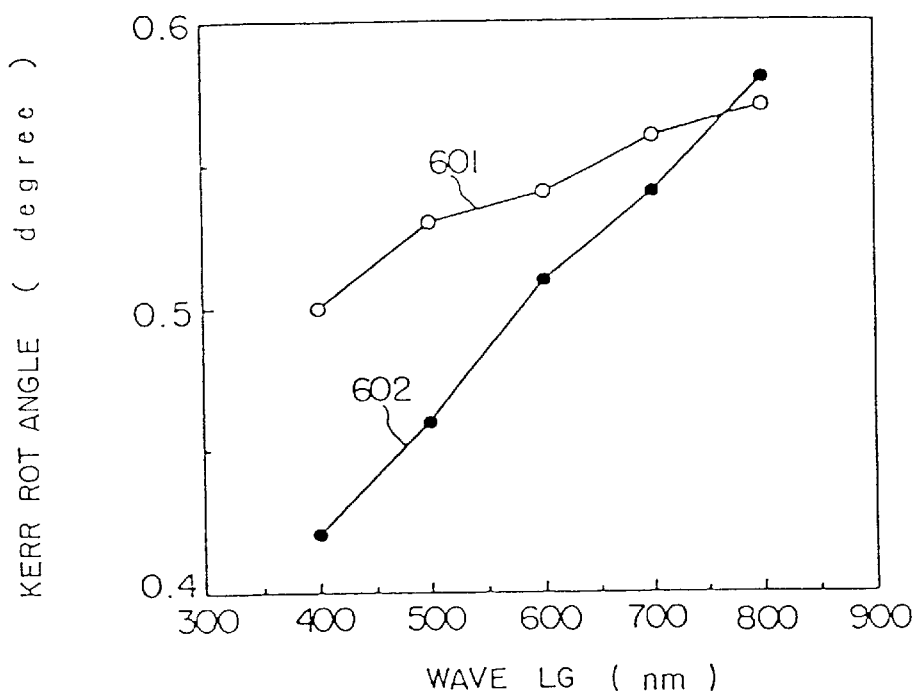
FIG. 14 is a graphical representation showing the Kerr rotational angles of the embodiment 6 and a comparative example.

FIG. 14 shows the Kerr rotational angles of the example 6-1 and the comparative example when measured from the substrate side, in which the numeral 601 denotes the example 6-1 and 602 denotes the comparative example. This graph indicates clearly that the Kerr rotational angle of the example 6-1 is larger than that of the comparative example in the short wavelength range 400 to 600 nm.

Figure 15:
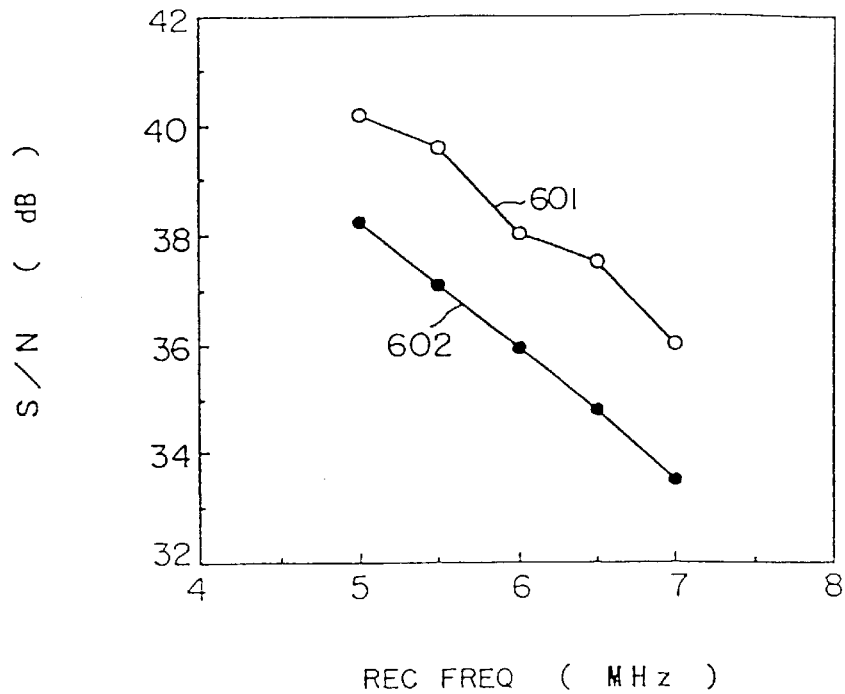
FIG. 15 is a graphical representation showing dynamic characteristics in the short wavelength range of both the embodiment 6 and the comparative example.

The test results which indicate that the example 6-1 is more advantageous than the comparative example in the dynamic characteristics will be described hereinbelow. The laser beam is a SHG light beam of 532 nm generated by a semiconductor exited Nd-YAG laser and obtained through a KTiOPO4 element. The diameter of the laser spot is 0.8 μm. A 45 degree differential detection method is adopted, and a PIN photodiode is used as an optical detector. Information signals from 5.0 to 7.0 MHz are written by magnetic field modulation at a linear speed of 5.7 m/sec. FIG. 15 shows the S/N ratio obtained when the signal are reproduced, in which the numeral 601 denotes the example 6-1 and 602 denotes the comparative example. FIG. 15 indicates that the S/N ratio of the example 6-1 is higher than that of the comparative example, so that the example 6-1 is suitable for the high density signal recording.

Further, in the above embodiment 6, the composition of the first magnetic layer 61 is not limited to only the a fore-mentioned composition NdDyFeCo. The same effect can be obtained if the composition is a light rare earth element-heavy rare earth element-transition metal alloy including a light rare earth element (e.g., Nd) and provided with the characteristics for forming a perpendicular magnetized film, for instance such as NdDyTbFeCo, NdTbFeCo, etc. Further, the composition of the third magnetic layer 63 is not limited to only the above-mentioned NdDyTbFeCo. The same effect can be obtained when NdDyTbFeCo, TbFeCo, TbFeCoCr, etc. is used as the composition of the third magnetic layer 63, as far as the desired recording sensitivity is satisfied.

EMBODIMENT 7

(NdFeCo)

The structure of this embodiment 7 is the same as that shown in FIG. 13. A first protective layer 14 with a thickness of 700 angstrom, a first magnetic layer 61 with a thickness of 100 angstrom, a second magnetic layer 62 with a thickness of 80 angstrom, a third magnetic layer 63 with a thickness of 800 angstrom, and a second protective layer 15 with a thickness of 800 angstrom are laminated in sequence on a polycarbonate substrate 10 by magnetron sputtering.

In the sample (example 7-1) prepared for the evaluation test, the first magnetic layer 61 is Nd5.9 Dy21.9 Fe51.8 Co20.4(at %); the second magnetic layer 62 is Nd19.0 Fe40.0 Co41.0 (at %); and the third magnetic layer 63 is Nd5.9 Dy21.9 Fe61.8 Co10.4 (at %). Further, the protective layers 14 and 15 are AlSiN.

Further, as the sample (example 7-2) prepared for the evaluation test, the first magnetic layer 61 is Nd5.9 Dy21.9 Fe51.8 Co20.4 (at %); the second magnetic layer 62 is Nd19.0 Fe40.0 Co41.0 (at %); and the third magnetic layer 63 is Tb21.0 Fe74.0 Co5.0 (at %). Further, the protective layers 14 and 15 are AlSiN.

Further, as the sample (comparative example 7-1 prepared for the evaluation test, the first magnetic layer 61 is Tb20.0 Fe48.9 Co31.1 (at %); the second magnetic layer 62 is Nd19.0 Fe40.0 Co41.0 (at %); and the third magnetic layer 63 is Tb20.0 Fe48.9 Co31.1 (at %). Further, the protective layers 14 and 15 are AlSiN.

Figure 16:
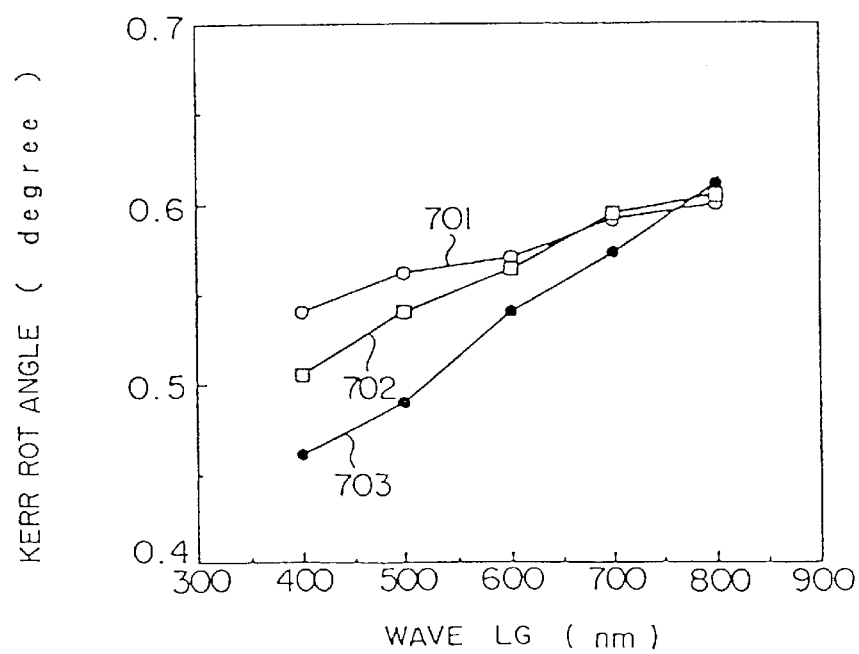
FIG. 16 is a graphical representation showing the Kerr rotational angles of the embodiment 7 and a comparative example.

FIG. 16 shows the Kerr rotational angles of the examples 7-1 and 7-2 and the comparative example 7-1 when measured from the substrate side, in which the numeral 701 denotes the example 7-1, 702 denotes the example 7-2 and 703 denotes the comparative example 7-1. This graph indicates clearly that the Kerr rotational angles of the examples 7-1 and 7-2 are larger than that of the comparative example 7-1 in the short wavelength range 400 to 600 nm.

Figure 17:
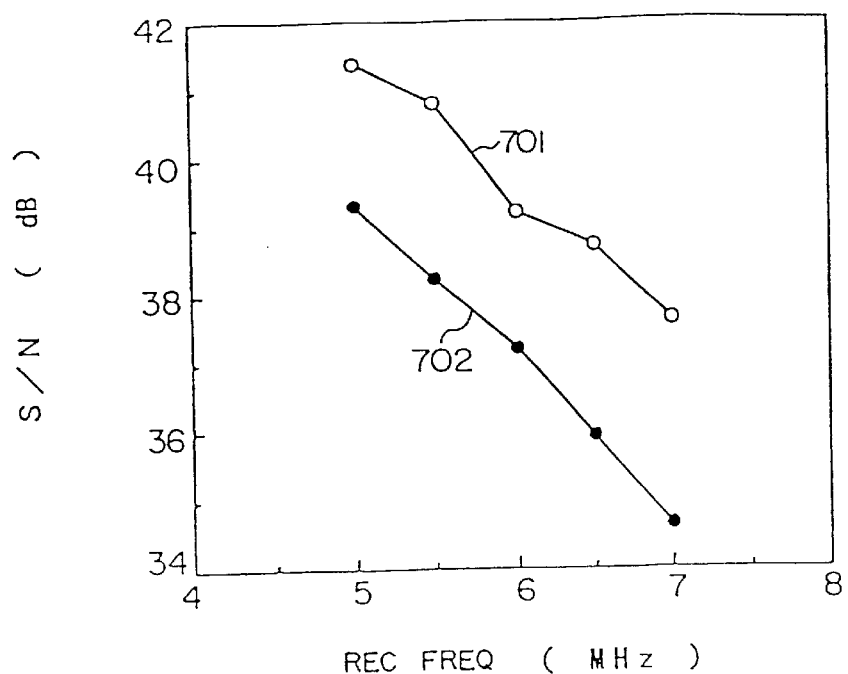
FIG. 17 is a graphical representation showing dynamic characteristics in the short wavelength range of both the embodiment 7 and the comparative example.

The test results which indicate that the example 7-1 is more advantageous than the comparative example 7-1 in the recording and reproducing characteristics will be described hereinbelow. The laser beam is a SHG light beam of 532 nm generated by a semiconductor exited Nd-YAG laser and obtained through a KTiOPO4 element. The diameter of the laser spot is 0.8 µm. A 45 degree differential detection method is adopted, and a PIN photodiode is used as an optical detector. Information signals from 5.0 to 7.0 MHz are written by magnetic field modulation at a linear speed of 5.7 m/sec. FIG. 17 shows the S/N ration obtained when the signal are reproduced, in which the numeral 701 denotes the example 7-1 and 703 denotes the comparative example. FIG. 17 indicates that the S/N ratio of the example 7-1 is higher than that of the comparative example 7-1, so that the example 7-1 is suitable for the high density signal recording.

Further, in the above embodiment 7, the composition of the first magnetic layer 61 is not limited to only the aforementioned composition NdDyFeCo. The same effect can be obtained if the composition is a light rare earth element-heavy rare earth element-transition metal alloy including a light rare earth element (e.g., Nd) and provided with the characteristics for forming a perpendicular magnetized film, for instance such as NdDyTbFeCo, NdTbFeCo, etc. Further, in this embodiment 7, the composition of the third magnetic layer 63 is not limited to only the above-mentioned NdDyTbFeCo. The same effect can be obtained when NdDyTbFeCo, TbFeCo, TbFeCoCr, etc. is used as the composition of the third magnetic layer 63, as far as the desired recording sensitivity is satisfied.

In this embodiment 7, it is desirable that the content of Co in the first magnetic layer 61 is larger than that of the second magnetic layer 62. This can be verified by the following test.

In the sample (comparative example 7-2) prepared for the verification test, the first magnetic layer 61 is Nd5.9 Dy21.9 Fe62.2 Co10.0 (at %); the second magnetic layer 62 is Nd19.0 Fe40.0 Co41.0 (at %); and the third magnetic layer 63 is Nd5.9 Dy21.9 Fe61.8 Co10.4 (at %). Further, the protective layers 14 and 15 are AlSiN.

Figure 18:
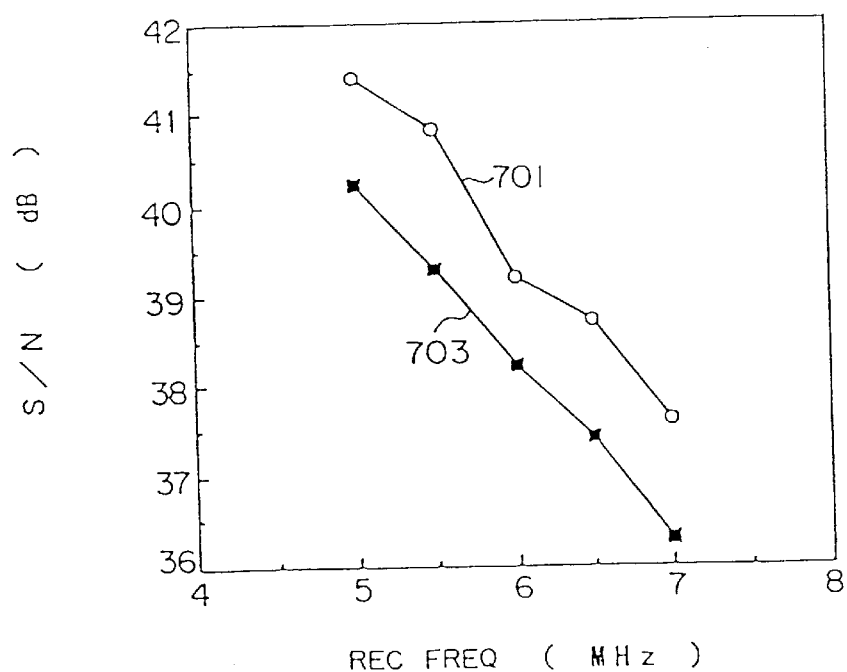
FIG. 18 is a graphical representation showing dynamic characteristics in the short wavelength range of both the embodiment 7 and the comparative example, which are obtained when Co content is the same in both the magnetic layers 61 and 63.

With respect to both the example 7-1 and the comparative example 7-2, the S/N ratio of the signal recorded and reproduced by a laser beam with a wavelength of 532 nm is measured in the same way as described before, and further the optimum value of the recording power sensitivity is measured. Here, the optimum value of the recording power sensitivity is defined as the recording power which can minimize the secondary higher harmonic wave of the reproduced signal under the condition that the recording frequency is fixed at 5.0 MHz (duty: 50%). The linear speed at the recording operation in this test is 5.7 m/sec. FIG. 18 shows the relationship between the recording frequency and the S/N ratio of the measured reproduced signal. In FIG. 18, the numeral 701 denotes the example 7-1, and 703 denotes the comparative example 7-2. This graph indicates clearly that the S/N ratio of the example 7-1 is larger than that of the comparative example 7-2. Further, with respect to the optimum value of the recording power sensitivity, there exists no difference in the optimum power between the example 7-1 and the comparative example 7-2 within the precision of 0.1 mW. Therefore, it is understood from the above-mentioned facts that the S/N ratio of the reproduced signal can be increased by determining the Co composition ratio of the first magnetic layer 61 more than that of the third magnetic layer 63, without changing the recording power sensitivity.

EMBODIMENT 8

(Ultrahigh Resolution)

Figure 19:
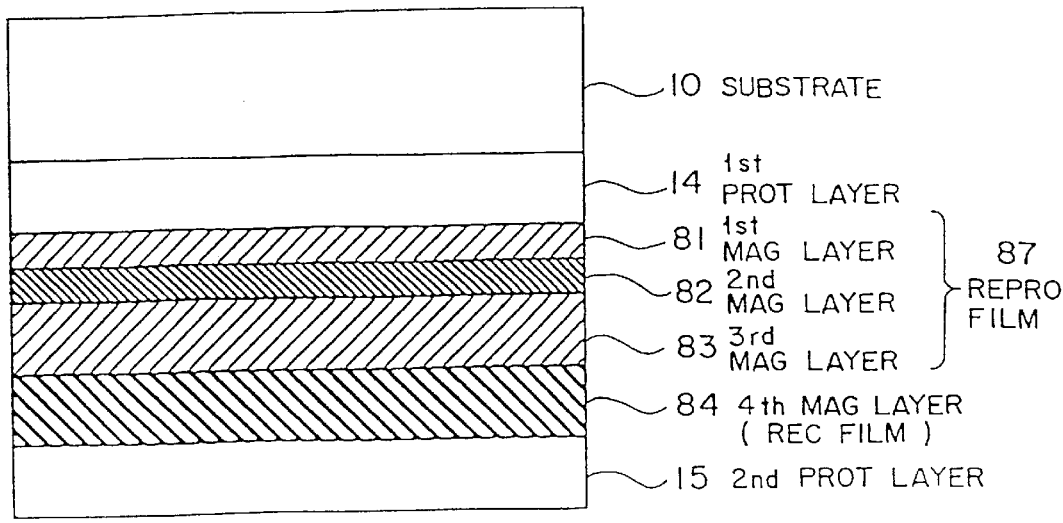
FIG. 19 is a side cross-sectional view showing an embodiment 8.

FIG. 19 is a side cross-sectional view showing the embodiment 8, which is a magnetic ultrahigh resolution medium. A first protective layer 14 with a thickness of 700 angstrom, a first magnetic layer 81 with a thickness of 80 angstrom, a second magnetic layer 82 with a thickness of 80 angstrom, a third magnetic layer 83 with a thickness of 900 angstrom, a fourth magnetic layer 84 with a thickness of 600 angstrom, and a second protective layer 15 with a thickness of 800 angstrom are laminated in sequence on a polycarbonate substrate 10 by magnetron sputtering. The first, second and third magnetic layers 81, 82 and 83 constitute a reproducing film 87. The fourth magnetic layer 84 functions as a recording film.

For the evaluation test, three following samples (referred to as examples 8-1 to 8-3) were prepared. In the example 8-1, the first and third magnetic layers 81 and 83 are formed of NdDyFeCo of TM rich, whose Curie temperature is 130° C. and whose coercivity is 2.3 kOe at room temperature. In the example 8-2, the first magnetic layer 81 is formed of NdDyFeCo of TM rich, whose Curie temperature is 130° C. and whose coercivity is 2.3 kOe at room temperature, and the third magnetic layer 83 is formed of TbFeCo of TM rich, whose Curie temperature is 145° C. and whose coercivity is 2.6 kOe at room temperature. In the example 8-3, the first and third magnetic layers 81 and 83 are formed of TbFeCo of TM rich, whose Curie temperature is 145° C. and whose coercivity is 2.6 kOe at room temperature. Further, in all the examples 8-1, 8-2 and 8-3, the second magnetic layer 82 is formed of $Nd21.0 Co79.0$ (at %), the fourth magnetic layer (the recording layer) 84 is formed of NdDyFeCo of RE rich, whose Curie temperature is 205° C. and whose coercivity is 11.5 kOe at room temperature, and the protective layers 14 and 15 are AlSiN.

Figure 20:
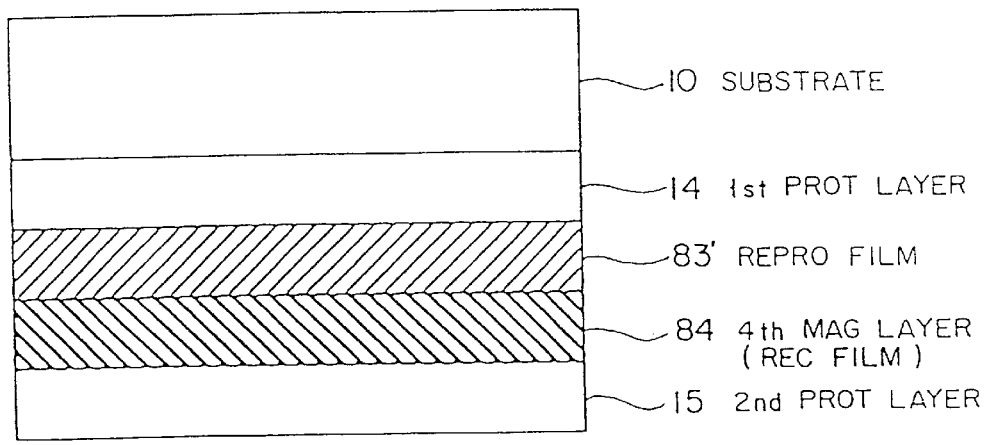
FIG. 20 is a side cross-sectional view showing the comparative example used for the evaluation test of the embodiment 8.

Further, FIG. 20 is a side cross-sectional view showing a comparative example 8-1 used for the evaluation test. A first protective layer 14 with a thickness of 700 angstrom, a reproducing film 83' of single layer structure with a thickness of 900 angstrom, a fourth magnetic layer (recording layer) 84 with a thickness of 600 angstrom, and a second protective layer 15 with a thickness of 800 angstrom are laminated in sequence on a polycarbonate substrate 10 by magnetron sputtering. The reproducing film 83 is formed of TbFeCo of TM rich, whose Curie temperature is 145° C. and whose coercivity is 2.6 kOe at room temperature, and the recording layer 84 is formed of TbFeCo of RE rich, whose Curie temperature is 205° C. and whose coercivity is 12.3 kOe at room temperature. Further, the protective layers 14 and 15 are AlSiN.

Figure 21:
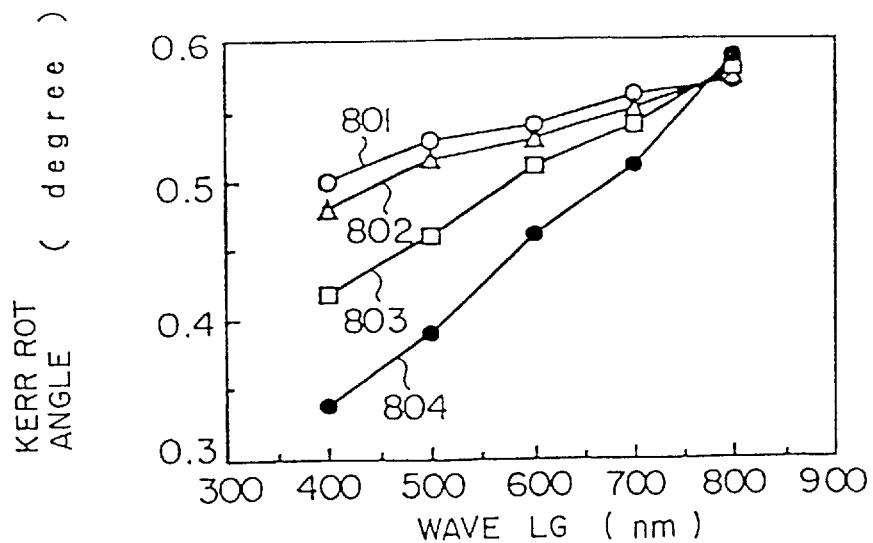
FIG. 21 is a graphical representation showing the Kerr rotational angles of the embodiment 8 and a comparative example.

FIG. 21 shows the Kerr rotational angles of the examples 8-1 to 8-2 and the comparative example 8-1 when measured from the substrate side, in which the numeral 801 denotes the example 8-1, 802 denotes the example 8-2 and 803 denotes the example 8-3, and 804 denotes the comparative example 8-1. FIG. 21 indicates clearly that the Kerr rotational angles of the examples 8-1 to 8-2 are larger than that of the comparative example 8-1 in the short wavelength range 400 to 600 nm.

The test results which verify that the examples 8-1 to 8-3 are more advantageous than the comparative example 8-1 in the dynamic characteristics will be described hereinbelow.

Figure 22:
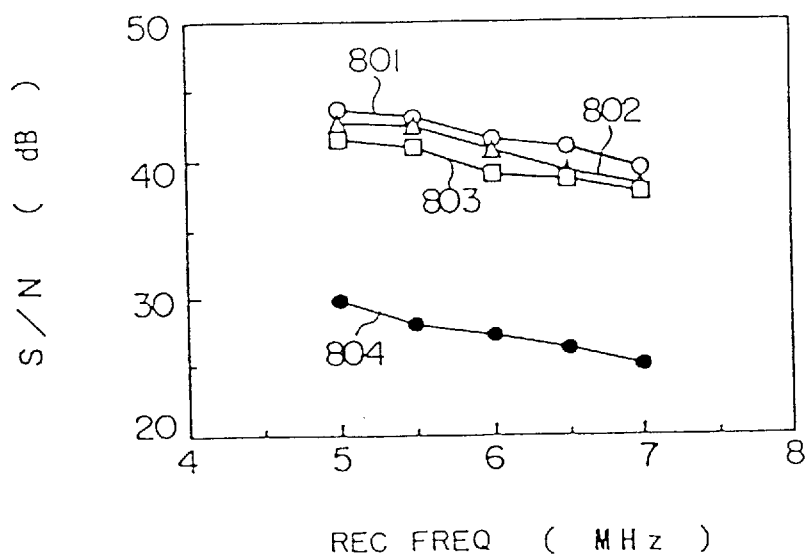
FIG. 22 is a graphical representation showing dynamic characteristics in the short wavelength range of both the embodiment 8 and the comparative example.

As the laser beam, a SHG light beam of 532 nm generated by a semiconductor exited Nd-YAG laser and obtained through a $KTiOPO4$ element is used. The diameter of the laser spot is 0.8 $\mu$m. A 45 degree differential detection method is adopted, and a PIN photodiode is used as an optical detector. Information signals from 5.0 to 7.0 MHz are recorded by magnetic field modulation at a linear speed of 5.7 m/sec. After the signal recording, the recorded domains are left only in the recording film by applying an initial magnetic field of 3.0 kOe. The applied initial magnetic field is opposite in direction to the signal recording magnetic field. The recorded signal is reproduced by transcribing the recorded domains in the recording layer to the reproducing layer on the basis of a reproducing laser power. FIG. 22 shows the S/N ration measured when the signal is reproduced, in which the numeral 801 denotes the example 8-1, 802 denotes the example 8-2, 803 denotes the example 8-3, and 804 denotes the comparative example 8-1. FIG. 22 indicates that the S/N ratios of the examples 8-1 to 8-3 are higher than that of the comparative example 8-1, so that the examples 8-1 to 8-3 are suitable for the high density signal recording.

EMBODIMENT 9

(Overwrite)

Figure 23:
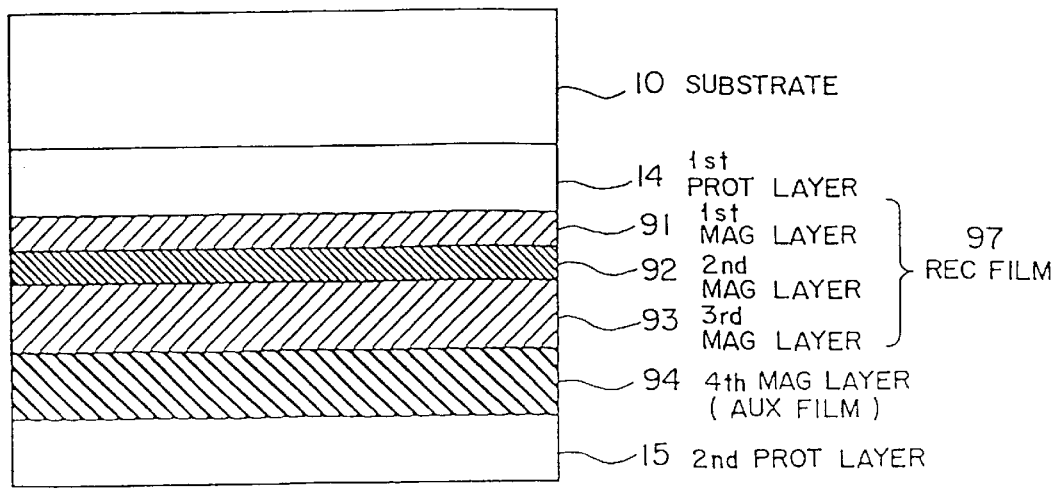
FIG. 23 is a side cross-sectional view showing an embodiment 9.

This embodiment 9 is an overwrite medium formed with an exchange-coupled recording film and an auxiliary film. FIG. 23 is a side cross-sectional view showing the embodiment 8. A first protective layer 14 with a thickness of 700 angstrom, a first magnetic layer 91 with a thickness of 80 angstrom, a second magnetic layer 92 with a thickness of 50 angstrom, a third magnetic layer 93 with a thickness of 800 angstrom, a fourth magnetic layer 94 with a thickness of 1000 angstrom, and a second protective layer 15 with a thickness of 800 angstrom are laminated in sequence on a polycarbonate substrate 10 by magnetron sputtering. The first, second and third magnetic layers 91, 92 and 93 constitute a recording film 97. The fourth magnetic layer 84 functions as an auxiliary film.

For the evaluation test, four following samples (referred to as examples 9-1 to 9-4) were prepared. In the example 9-1, the first and third magnetic layers 91 and 93 are formed of NdDyFeCo of TM rich, whose Curie temperature is 130° C. and whose coercivity is 11.1 kOe at room temperature. In the example 9-2, the first magnetic layer 91 is formed of NdDyFeCo of TM rich, whose Curie temperature is 130° C. and whose coercivity is 11.1 kOe at room temperature, and the third magnetic layer 93 is formed of TbFeCo of TM rich, whose Curie temperature is 135° C. and whose coercivity is 12.5 kOe at room temperature. In the example 9-3, the first and third magnetic layers 91 and 93 are formed of TbFeCo of TM rich, whose Curie temperature is 135° C. and whose coercivity is 12.5 kOe at room temperature. In the example 9-4, the first magnetic layer 91 is formed of NdDyFeCo of TM rich, whose Curie temperature is 190° C. and whose coercivity is 3.5 kOe at room temperature, and the third magnetic layer 93 is formed of NdDyFeCo of TM rich, whose Curie temperature is 130° C. and whose coercivity is 11.1 kOe at room temperature.

Further, in all the examples 9-1, 9-2, 9-3 and 9-4, the second magnetic layer 92 is formed of $Nd21.0 Co79.0$ (at %), the fourth magnetic layer (the auxiliary film) 94 is formed of DyGdFeCo of RE rich, whose Curie temperature is 255° C. and whose coercivity is 1.5 kOe at room temperature, and the protective layers 14 and 15 are AlSiN.

Figure 24:
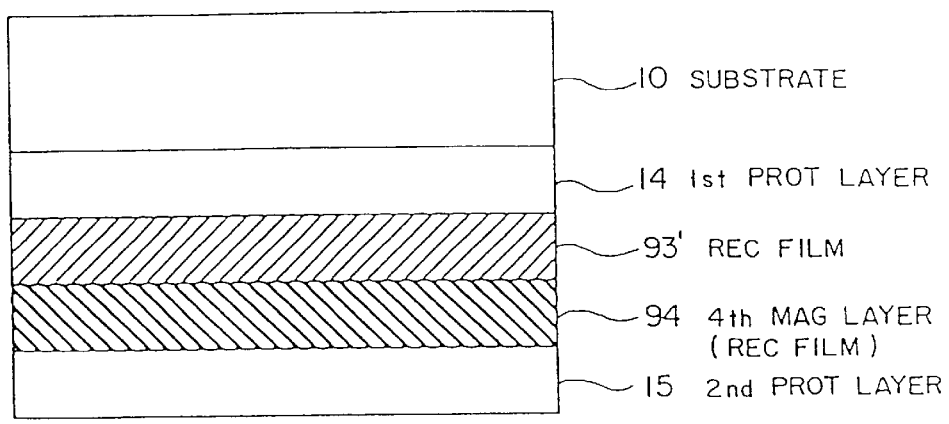
FIG. 24 is a side cross-sectional view showing the comparative example used for the evaluation test of the embodiment 9.

Further, a comparative example 9-1 was prepared. FIG. 24 is a side cross-sectional view showing the comparative example 9-1 used for an evaluation test. A first protective layer 14 with a thickness of 700 angstrom, a recording film 93' with a thickness of 900 angstrom, an auxiliary film 94 with a thickness of 1000 angstrom, and a second protective layer 15 with a thickness of 800 angstrom are laminated in sequence on a polycarbonate substrate 10 by magnetron sputtering. The recording film 93' is formed of TbFeCo of TM rich, whose Curie temperature is 135° C. and whose coercivity is 12.5 kOe at room temperature, and the auxiliary film 94 is formed of DyGdFeCo of RE rich, whose Curie temperature is 255° C. and whose coercivity is 1.5 kOe at room temperature. Further, the protective layers 14 and 15 are AlSiN.

Figure 25:
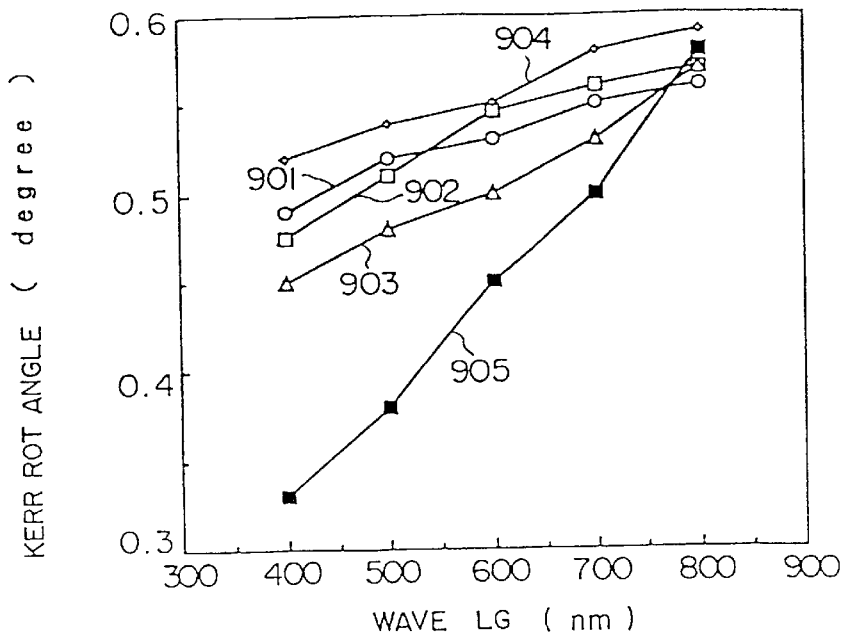
FIG. 25 is a graphical representation showing the Kerr rotational angle in the embodiment 9 and the comparative example.

FIG. 25 shows the Kerr rotational angles of the examples 9-1 to 9-4 and the comparative example 9-1 when measured from the substrate side, in which the numeral 901 denotes the example 9-1, 902 denotes the example 9-2 and 903 denotes the example 9-3, and 904 denotes the example 9-4, and 905 denotes the comparative example 9-1. FIG. 25 indicates clearly that the Kerr rotational angles of the examples 9-1 to 8-4 are larger than that of the comparative example 9-1 in the short wavelength range 400 to 600 nm.

The test results which verify that the examples 9-1 to 9-4 are more advantageous than the comparative example 9-1 in the dynamic characteristics will be described hereinbelow.

Figure 26:
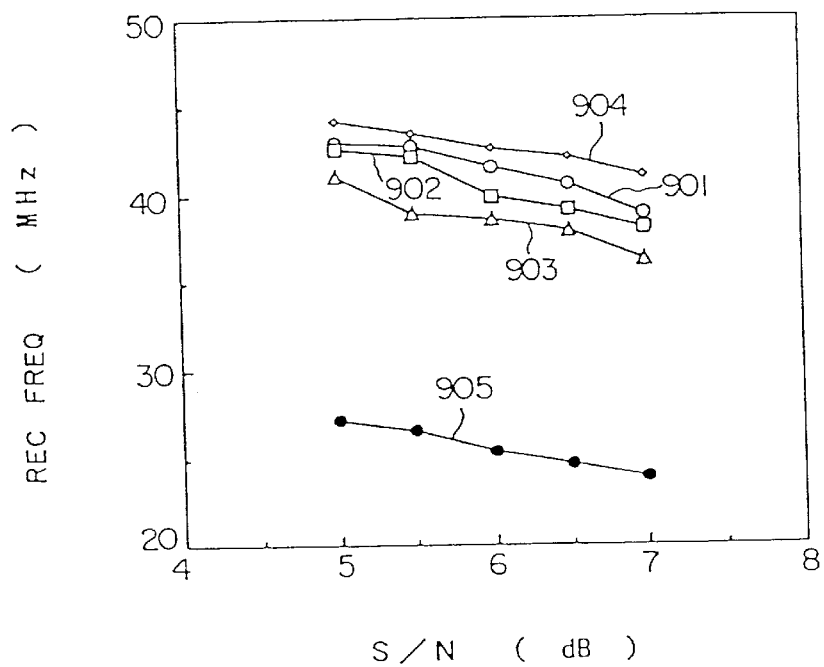
FIG. 26 is a graphical representation showing dynamic characteristics in the short wavelength range of both the embodiment 9 and the comparative example.

As the laser beam, a SHG light beam of 532 nm generated by a semiconductor exited Nd-YAG laser and obtained through a KTiOPO4 element is used. The diameter of the laser spot is 0.8 μm. A 45 degree differential detection method is adopted, and a PIN photodiode is used as an optical detector. Information signals are recorded and reproduced at a linear speed of 5.7 m/sec. After a signal of 3.0 MHz had been previously written, another signal of 5.0 to 7.0 MHz is overwritten by an AOM element by optical modulation. Before overwrite, cap-type recording domains are left only in the auxiliary film 94 by applying an initial magnetic field of 4.0 kOe. The applied initial magnetic field is opposite in direction to the signal recording magnetic field. FIG. 26 shows the S/N ratio measured after overwritten, in which the numeral 901 denotes the example 9-1, 902 denotes the example 9-2, 903 denotes the example 9-3, 904 denotes the example 9-4, and 905 denotes the comparative example 9-1. FIG. 26 indicates that the S/N ratios of the examples 9-1 to 9-4 are higher than that of the comparative example 9-1, so that the examples 9-1 to 9-4 are suitable for the high density signal recording.

Further, in the structure shown in FIG. 23, the same effects as above can be obtained, even if the compositions of the first and third magnetic layers 91 and 93 are different from the above-mentioned examples 9-1 to 9-4, as far as the first and third magnetic layers 91 and 93 are formed of a rare earth element-transition alloy of perpendicular magnetized film characteristics and further the third magnetic layer 93 and the auxiliary film 94 can satisfy the overwrite conditions of exchange coupled type.

EMBODIMENT 10

(Overwrite)

Figure 27:
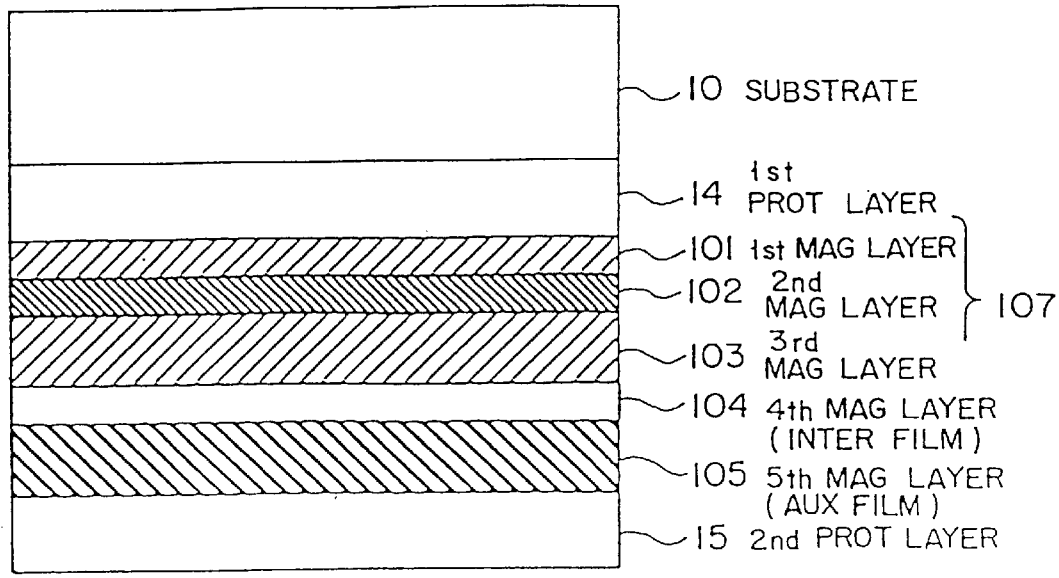
FIG. 27 is a side cross-sectional view showing an embodiment 10.

This embodiment 10 is also of overwrite medium. FIG. 27 is a side cross-sectional view showing the embodiment 10. A first protective layer 14 with a thickness of 700 angstrom, a first magnetic layer 101 with a thickness of 80 angstrom, a second magnetic layer 102 with a thickness of 50 angstrom, a third magnetic layer 103 with a thickness of 600 angstrom, a fourth magnetic layer 104 with a thickness of 100 angstrom, a fifth magnetic layer 105 with a thickness of 800 angstrom, and a second protective layer 15 with a thickness of 800 angstrom are laminated in sequence on a polycarbonate substrate 10 by magnetron sputtering. The first, second and third magnetic layers 101, 102 and 103 constitute a recording film 107. The fourth magnetic layer 104 functions as an intermediate film. The fifth magnetic layer 105 functions as an auxiliary film.

For the evaluation test, a sample (referred to as an example 10-1) was prepared. In the example 10-1, the first and third magnetic layers 101 and 103 are formed of NdDyFeCo of TM rich, whose Curie temperature is 130° C. and whose coercivity is 11.1 kOe at room temperature. The second magnetic layer 102 is formed of NdDyFeCo of TM rich, whose Curie temperature is 130° C. and whose coercivity is 11.1 kOe at room temperature. The fourth magnetic layer (the intermediate film) 104 is formed of GdFeCo of TM rich, whose Curie temperature is 220° C. and whose coercivity is 0.3 kOe at room temperature. The fifth magnetic layer (auxiliary layer) 105 is formed of DyGdFeCo of RE rich, whose Curie temperature is 255° C. and whose coercivity is 1.5 kOe at room temperature. Further, the protective layers are AlSiN.

Figure 28:
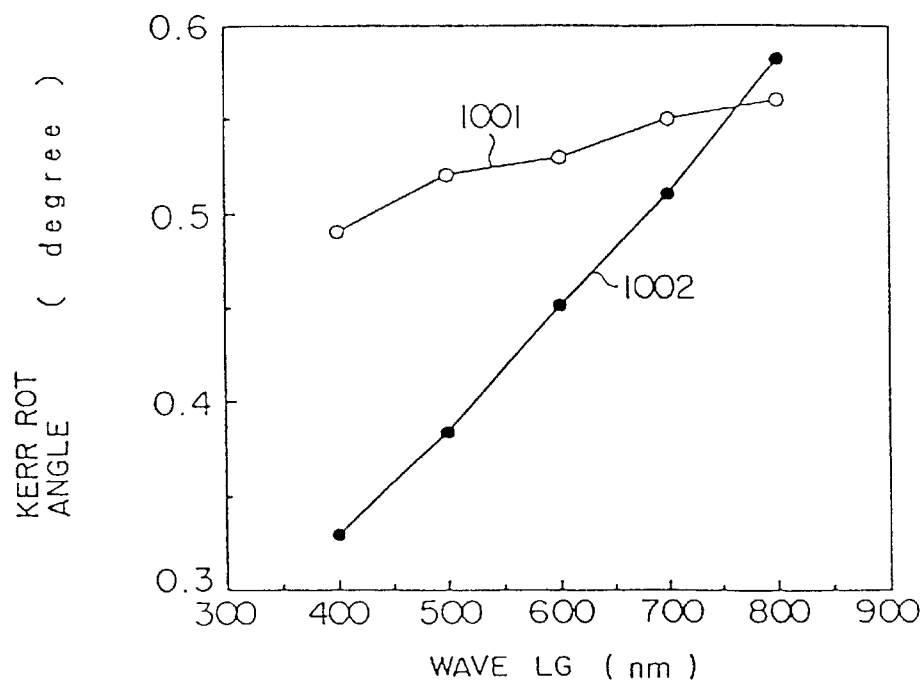
FIG. 28 is a graphical representation showing the Kerr rotational angles of the embodiment 10 and a comparative example.

FIG. 28 shows the Kerr rotational angles of the example 10-1 and the comparative example 9-1 when measured from the substrate side, in which the numeral 1001 denotes the example 10-1, and 1002 denotes the comparative example 9-1. FIG. 28 indicates clearly that the Kerr rotational angle of the example 10-1 is larger than that of the comparative example 9-1 in the short wavelength range 400 to 600 nm.

Figure 29:
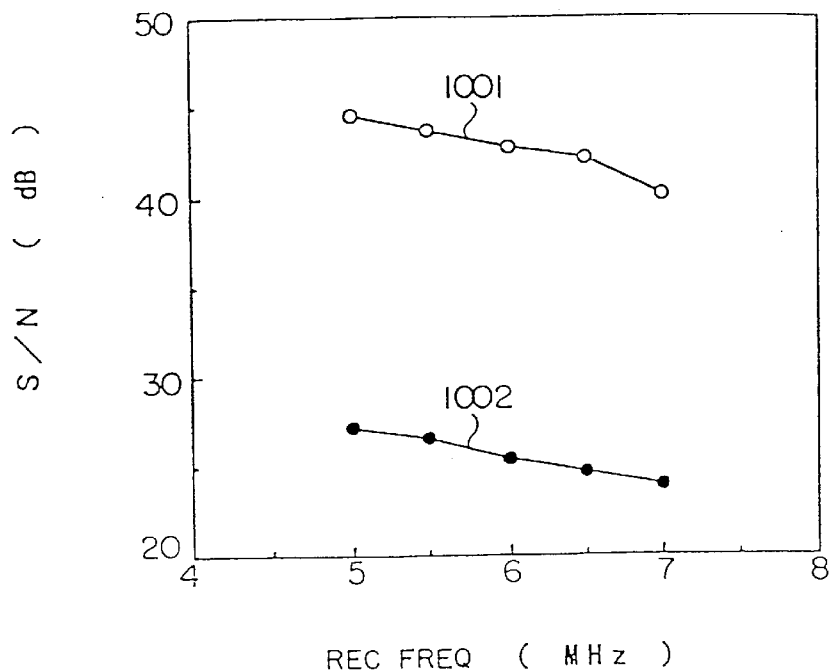
FIG. 29 is a graphical representation showing dynamic characteristics in the short wavelength range of both the embodiment 10 and the comparative example.

The test results which verify that the example 10-1 is more advantageous than the comparative example 9-1 in the dynamic characteristics will be described hereinbelow. The recording and reproducing test specifications are the same as those of the embodiment 9. FIG. 29 shows the S/N ratio measured when the signal is reproduced. FIG. 29 indicates that the S/N ratio of the example 10-1 is higher than that of the comparative example 9-1, so that the example 10-1 is suitable for the high density signal recording.

EMBODIMENT 11

(Overwrite)

This embodiment 11 is also of overwrite medium. The basic structure of this embodiment 11 is the same as that of the embodiment 10 shown in FIG. 27. A first protective layer 14 with a thickness of 70 angstrom, a first magnetic layer 101 with a thickness of 80 angstrom, a second magnetic layer 102 with a thickness of 50 angstrom, a third magnetic layer 103 with a thickness of t (selected from values between 400 and 1000 angstrom), a fourth magnetic layer 104 with a thickness of 100 angstrom, a fifth magnetic layer 105 with a thickness of 800 angstrom, and a second protective layer 15 with a thickness of 800 angstrom are laminated in sequence on a polycarbonate substrate 10 by magnetron sputtering. The first, second and third magnetic layers 101, 102 and 103 constitute a recording film 107. The fourth magnetic layer 104 functions as an intermediate film. The fifth magnetic layer 105 functions as an auxiliary film.

For the evaluation test, a sample (referred to as an example 11-1) was prepared. In the example 11-1, the first and third magnetic layers 101 and 103 are formed of NdDyFeCo of TM rich, whose Curie temperature is 145° C. and whose coercivity is 10.2 kOe at room temperature. The second magnetic layer 102 is formed of Nd21.0 Co79.0 (at %). The fourth magnetic (intermediate) film 104 is formed GdFeCo of TM rich, whose Curie temperature is 220° C. and whose coercivity is 0.3 kOe at room temperature. The auxiliary layer 105 is formed of DyGdFeCo of RE rich, whose Curie temperature is 255° C. and whose coercivity is 1.5 kOe at room temperature. Further, the protective layers 14 and 15 are AlSiN.

Further, a comparative example 11-1 was prepared. FIG. 23 is a side cross-sectional view showing the comparative example 11-1 used for the evaluation test. A first protective layer 14 with a thickness of 700 angstrom, a first magnetic layer 91 with a thickness of 80 angstrom, a second magnetic layer 92 with a thickness of 30 angstrom, a third magnetic layer 93 with a thickness of t (selected from values between 400 and 1000 angstrom), an auxiliary film 94 with a thickness of 800 angstrom, and a protective layer 15 with a thickness of 800 angstrom are laminated in sequence on a polycarbonate substrate 10 by magnetron sputtering. The first and third magnetic layers 91 and 93 are formed of NdDyFeCo of TM rich, whose Curie temperature is 145° C. and whose coercivity is 10.2 kOe at room temperature. The second magnetic layer 92 is formed of Nd21.0 Co79.0 (at %). The auxiliary film 94 is formed of DyGdFeCo of RE rich, whose Curie temperature is 255° C. and whose coercivity is 1.5 kOe at room temperature. Further, the protective layers 14 and 15 were AlSiN.

Figure 30:
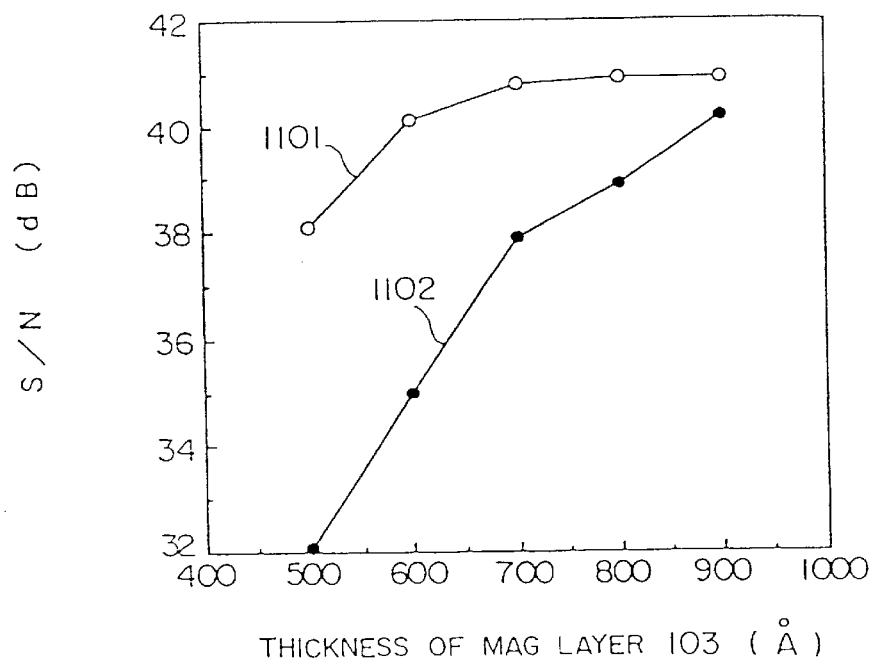
FIG. 30 is a graphical representation showing dynamic characteristics in the short wavelength range of both the embodiment 11 and the comparative example.

The test results which verify that the example 11-1 is more advantageous than the comparative example 11-1 in the dynamic characteristics will be described hereinbelow. The recording and reproducing test specifications are the same as those of the embodiment 9. The signal of 7 MHz is recorded at the linear speed of 5.7 m/sec and then reproduced after the initialization. FIG. 30 shows the S/N ratio measured when the signal is reproduced, in which the abscissa indicates the film thickness t, the numeral 1101 denotes the example 11-1, and 1102 denotes the comparative example 11-1. FIG. 30 indicates that the S/N ratio of the example 11-1 is higher than that of the comparative example 11-1, so that the example 11-1 is suitable for the high density signal recording.

Further, in this embodiment 11, the effect the same as above can be obtained even if the composition of the intermediate film 104 is different from the above, as far as the intermediate 104 is a magnetic layer including Gd and provided with small perpendicular magnetized anisotropic characteristics. Further, the same effect as above can be obtained if the intermediate layer 104 is formed of NdCo or NdFeCo.

EMBODIMENT 12

(Artificial Lattice)

Figure 31:
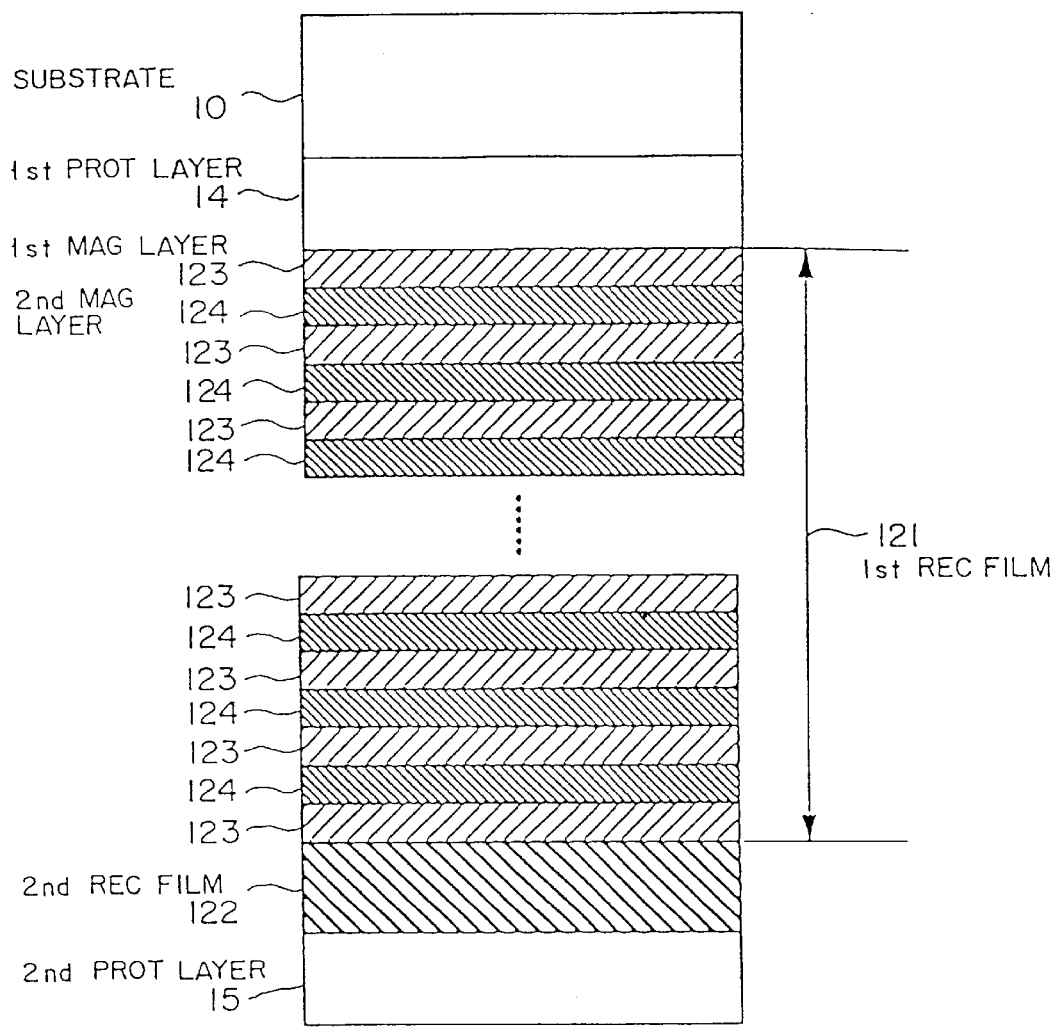
FIG. 31 is a side cross-sectional view showing an embodiment 12.
Figure 32:
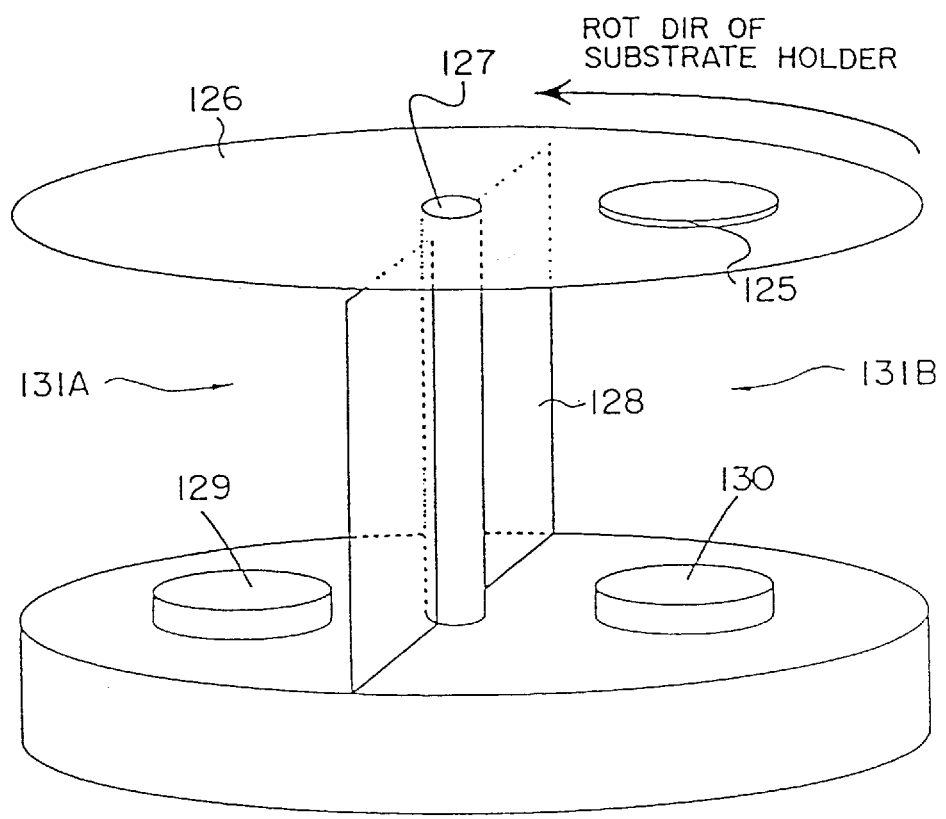
FIG. 32 is a perspective view showing the structure of an instrument for forming artificial lattice.

FIG. 31 is a side cross-sectional view showing the embodiment 12. A first protective layer 14 with a thickness of 700 angstrom, a first recording film 121 with a thickness of 440 angstrom, a second recording film 122 with a thickness of 800 angstrom, a protective layer 15 with a thickness of 800 angstrom are laminated in sequence on a polycarbonate substrate 10 by magnetron sputtering. Here, the first recording film 121 is formed by laminating first magnetic layers 123 each with a thickness of 20 angstrom and second magnetic layers 124 each with a thickness of 10 angstrom alternately into a multilayer structure (referred to as an artificial lattice). In this first recording film 121, a first magnetic layer 123 is formed at the interface with respect to the first protective layer 14 and also at the interface with respect to the second protective layer 15. The artificial lattice of the first recording film 121 can be formed by the instrument as shown in FIG. 32. In more detail, a sputter chamber is partitioned by a partition plate 128 into two zones 131A and 131B. Within the respective zones 131A and 131B, two sputtering targets 129 and 130 are placed for forming the respective magnetic layers 123 and 124. When the substrate holder 126 is rotated, the substrate 125 is passed alternately through the two chamber zones 131A and 131B. Therefore, the first magnetic layer 123 can be formed within one zone 131A and the second magnetic layer 124 can be formed within the other zone 131B. The thicknesses of the respective magnetic layers 123 and 124 can be controlled by the sputtering time for the respective zones 131A and 131B. For the evaluation test, three following samples (referred to as examples 12-1 to 12-3) were prepared. In the example 12-1, the first magnetic layers 123 is formed of Nd5.9 Dy21.9 Fe51.8 Co20.4 (at %), the second magnetic layer 124 is formed of Nd21.0 Co79.0 (at %), and the second recording film 122 is formed of Nd5.9 Dy15.9 Fe61.8 Co10.4 (at %). In the second example 12-2, the first magnetic layers 123 is formed of Nd5.9 Dy21.9 Fe51.8 Co20.4 (at %), the second magnetic layer 124 is formed of Nd21.0 Co79.0 (at %), and the second recording film 122 is formed of Tb20.0 Fe48.9 Co31.1 (at %). In the third example 12-3, the first magnetic layers 123 is formed of Tb20.0 Fe48.9 Co31.1 (at %), the second magnetic layer 124 is formed of Nd21.0 Co79.0 (at %), and the second recording film 122 is formed of Tb20.0 Fe48.9 Co31.1 (at %). Further, in the respective examples 12-1, 12-2 and 12-3, the protective layers 14 and 15 are both formed of AlSiN.

Further, a comparative example 12-1 was prepared. FIG. 20 is a side cross-sectional view showing the comparative example 12-1. A first protective layer 14 with a thickness of 700 angstrom, a first magnetic layer 61 with a thickness of 80 angstrom, a second magnetic layer 62 with a thickness of 80 angstrom, a third magnetic layer 63 with a thickness of 800 angstrom, and a second protective layer 15 with a thickness of 800 angstrom are laminated in sequence on a polycarbonate substrate 10 by magnetron sputtering. The first and second magnetic layers 61 and 62 constitute a first recording film, and the third magnetic layer 63 constitutes a second recording film. The first magnetic layer 61 is formed of Tb20.0 Fe48.9 Co31.1 (at %), the second magnetic layer 62 is formed of Nd21.0 Co79.0, and the third magnetic layer 63 is formed of Tb20.0 Fe48.9 Co31.1 (at %). Further, the protective layers 14 and 15 are formed of AlSiN.

Figure 33:
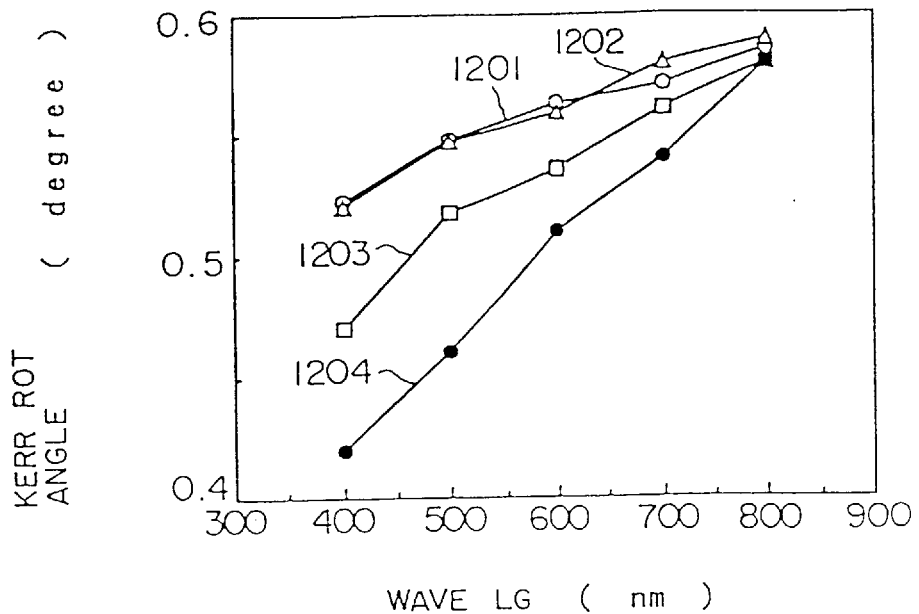
FIG. 33 is a graphical representation showing the Kerr rotational angles of the embodiment 12 and a comparative example.

FIG. 33 shows the Kerr rotational angles of the examples 12-1 to 12-3 and the comparative example 12-1 obtained when measured from the substrate side, in which the numeral 1201 denotes the example 12-1, 1202 denotes the example 12-2, and 1203 denotes the example 12-3, and 1204 denotes the comparative example 12-1. FIG. 33 indicates clearly that the Kerr rotational angles of the examples 12-1 to 12-3 are larger than that of the comparative example 12-1 in the short wavelength range 400 to 600 nm.

Figure 34:
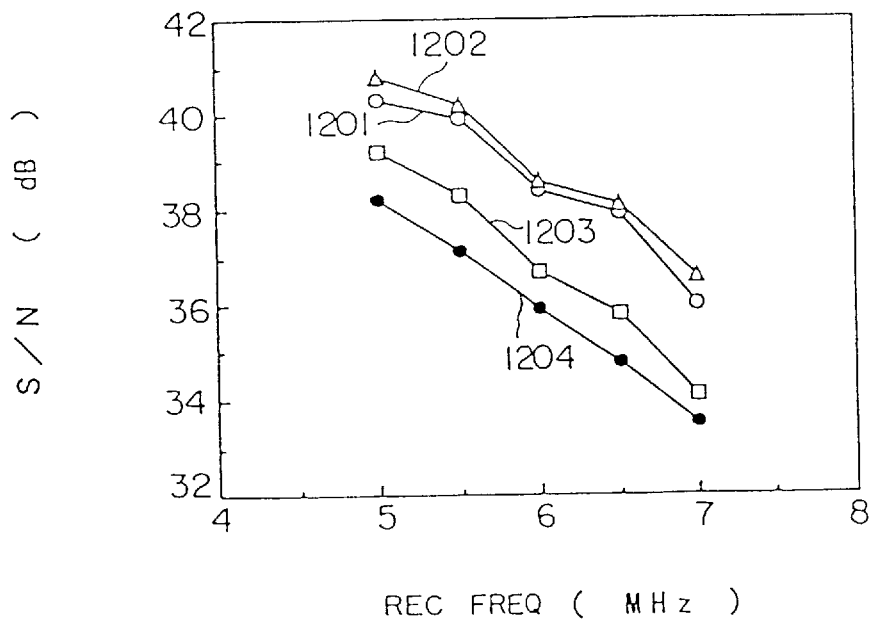
FIG. 34 is a graphical representation showing dynamic characteristics in the short wavelength range of both the embodiment 12 and the comparative example.

The test results which verify that the examples 12-1 to 12-3 are more advantageous than the comparative example in the dynamic characteristics will be described hereinbelow. As the laser beam, a SHG light beam of 532 nm generated by a semiconductor exited Nd-YAG laser and obtained through a KTiOPO4 element is used. A PIN photodiode is used as an optical detector. Information signals from 5.0 to 7.0 MHz are recorded by magnetic field modulation at a linear speed of 5.7 m/sec. FIG. 34 shows the S/N ratio measured when the signal is reproduced. FIG. 34 indicates that the S/N ratios of the examples 12-1 to 12-3 are higher than that of the comparative example, so that the examples 12-1 to 12-3 are suitable for the high density signal recording.

Further, the second recording film 122 is not limited to only the NdDyFeCo. The same effect can be obtained as far as the second recording film 122 is formed of a rare earth element-transition metal alloy such as NdDyTbFeCo, TbFeCo, TbFeCoCr, etc. which can satisfy a desired recording sensitivity. Further, the same effect can be obtained, even if the first magnetic layer 123 is different from the above-mentioned composition, as far as the first magnetic layer 123 is formed of a rare earth element-transition metal alloy provided with perpendicular magnetization characteristics. Further, in the artificial lattice of the first recording film 121, the same effect can be obtained even if the thicknesses of the first and second magnetic layers 123 and 124 are not uniform, respectively. Further, the second magnetic layer 124 can be formed of NdFeCo or NdTbFeCo (however, Tb must be less than 1.5 at %).

EMBODIMENT 13

(Artificial Lattice)

Figure 35:
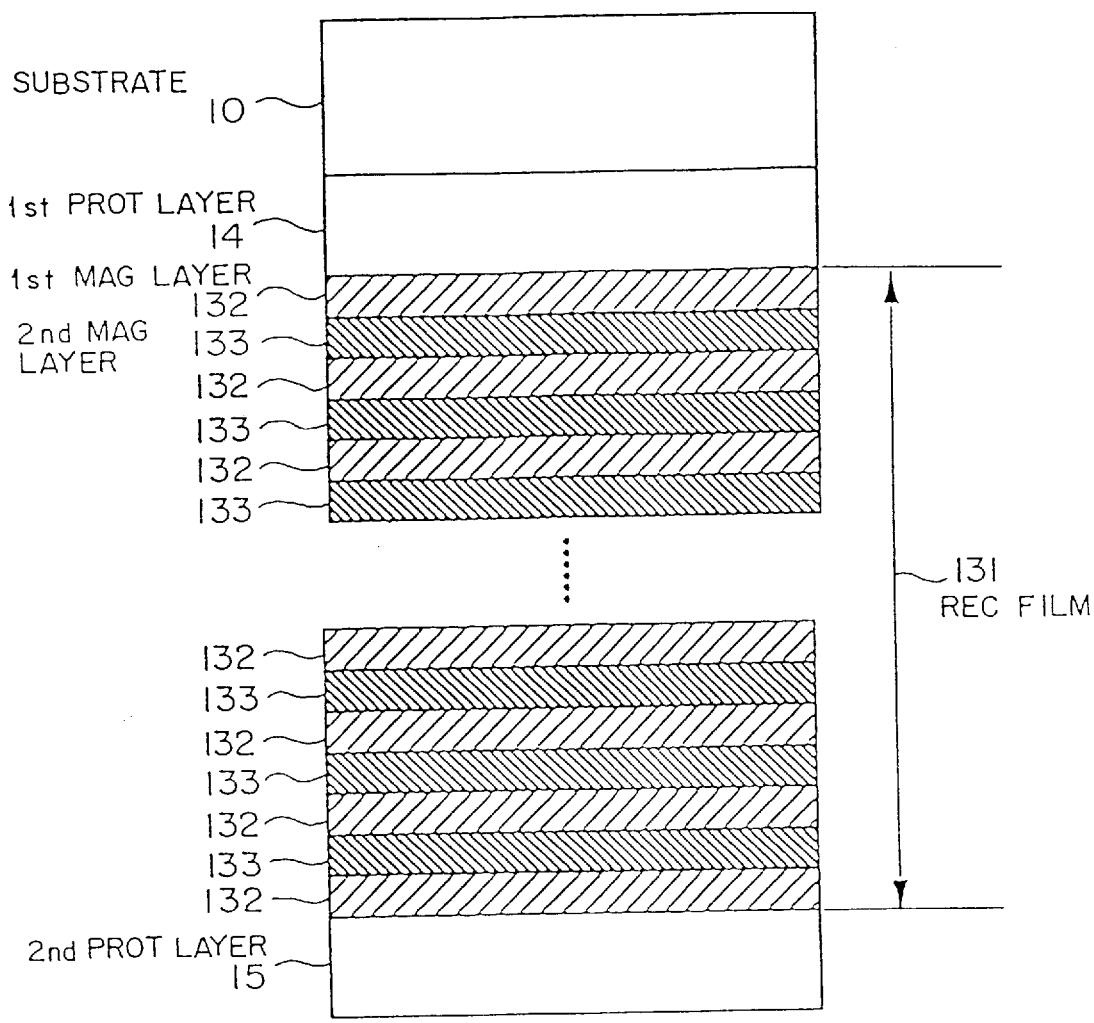
FIG. 35 is a side cross-sectional view showing an embodiment 13.

FIG. 35 is a side cross-sectional view showing the embodiment 13. A first protective layer 14 with a thickness of 700 angstrom, a first recording film 131 with a thickness of 1030 angstrom, and a protective layer 15 with a thickness of 800 angstrom are laminated in sequence on a polycarbonate substrate 10 by magnetron sputtering. Here, the first recording film 131 is formed by laminating first magnetic layers 132 each with a thickness of 30 angstrom and second magnetic layers 133 each with a thickness of 10 angstrom alternately into a multilayer structure (referred to as artificial lattice). In this first recording film 131, the first magnetic layer 132 is formed at the interface with respect to the first protective layer 14 and also at the interface with respect to the second protective layer 15. For the evaluation test, a following sample (referred to as example 13-3) was prepared. In the example 13-1, the first magnetic layers 132 is formed of Nd5.9 Dy21.9 Fe51.8 Co20.4 (at %), the second magnetic layer 133 is formed of Nd21.0 Co79.0 (at %), and the protective layers 14 and 15 are both formed of AlSiN. The artificial lattice of the recording film 131 is formed by use of the instrument as shown in FIG. 32.

Further, as the comparative example, the afore-mentioned comparative example 12-1 is used.

Figure 36:
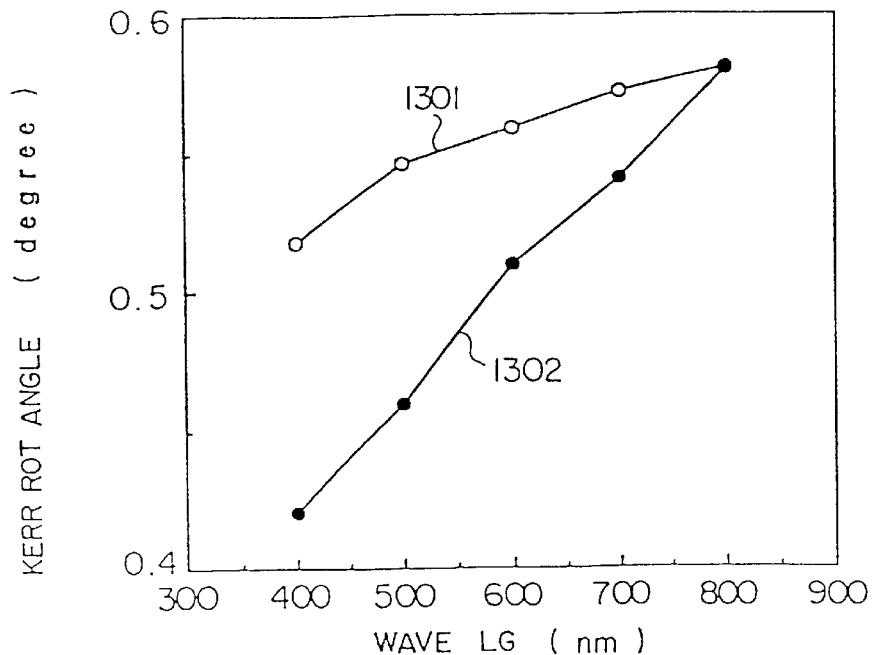
FIG. 36 is a graphical representation showing the Kerr rotational angle in the embodiment 13 and a comparative example.

FIG. 36 shows the Kerr rotational angles of the example 13-1 and the comparative example 12-1 obtained when measured from the substrate side, in which the numeral 1301 denotes the example 13-1, and 1302 denotes the comparative example 12-1. FIG. 36 indicates clearly that the Kerr rotational angle of the example 13-1 is larger than that of the comparative example 12-1 in the short wavelength range 400 to 600 nm.

Figure 37:
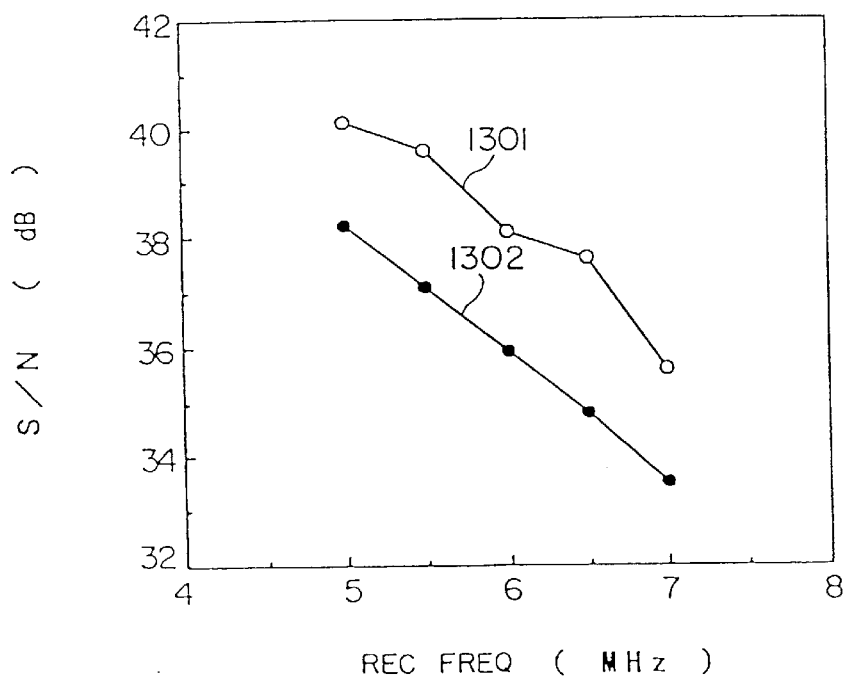
FIG. 37 is a graphical representation showing dynamic characteristics in the short wavelength range of both the embodiment 13 and the comparative example.

The test results which verify that the example 13-1 is more advantageous than the comparative example 12-1 in the dynamic characteristics will be described hereinbelow. The recording and reproducing test was made in accordance with the specifications basically the same as that used for the afore-mentioned embodiment 11. That is, information signals from 5.0 to 7.0 MHz were recorded by magnetic field modulation at a linear speed of 5.7 m/sec. FIG. 37 shows the S/N ratio measured when the signals are reproduced. FIG. 37 indicates that the S/N ratio of the example 13-1 is higher than that of the comparative example 12-1, so that the example 13-1 is suitable for the high density signal recording.

Further, the first magnetic layer 132 is not limited only to the above-mentioned NdDyFeCo. The same effect can be obtained, as far as the first magnetic layer 132 is formed of a rare earth element-transition metal alloy such as NdDyTbFeCo, TbFeCo, TbFeCoCr, etc. which can satisfy a desired recording sensitivity. Further, in the artificial lattice of the recording film 131, the same effect can be obtained even if the thicknesses of the first and second magnetic layers 132 and 133 are not uniform, respectively.

EMBODIMENT 14

(Reflection Structure+Artificial Lattice)

Figure 38:
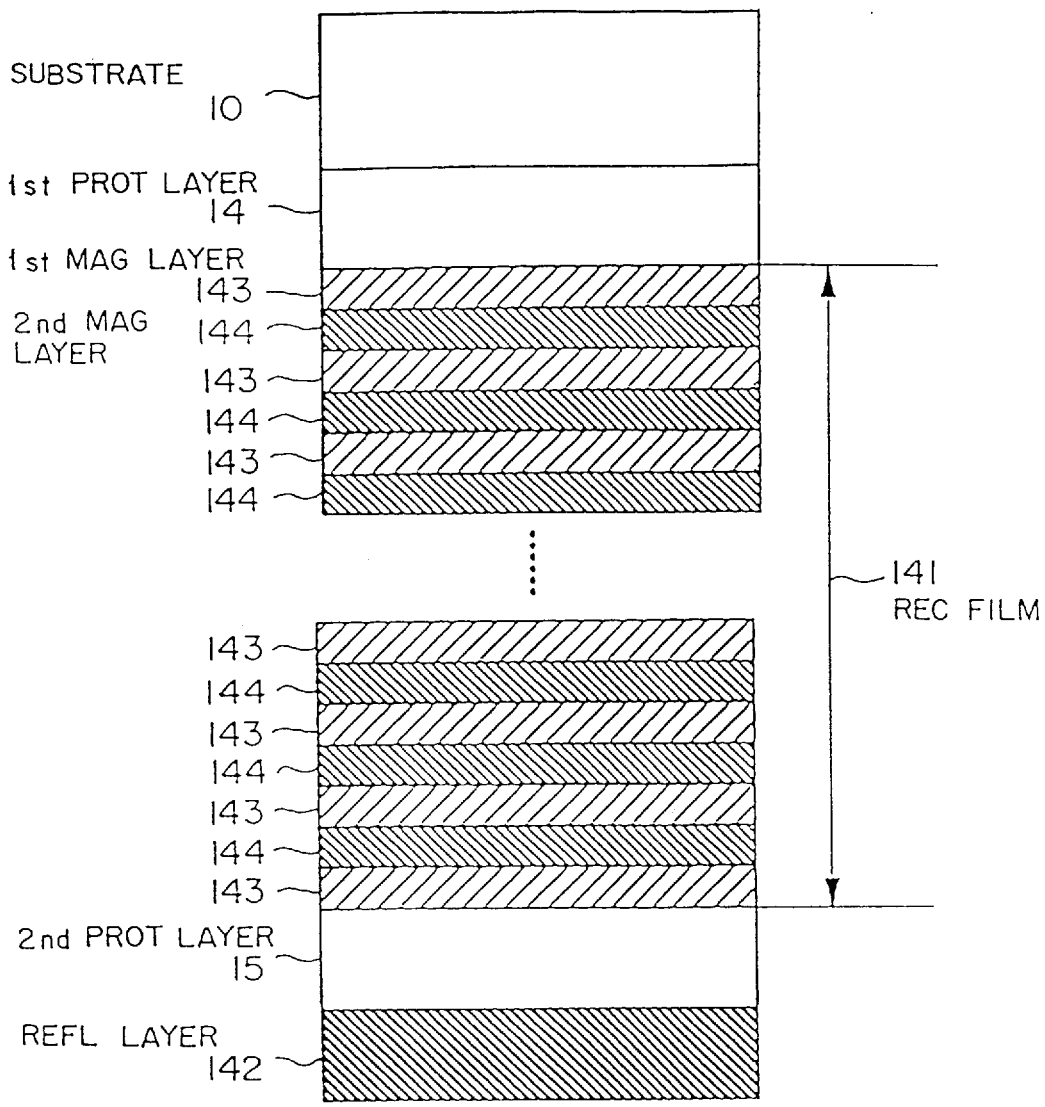
FIG. 38 is a side cross-sectional view showing an embodiment 14.

FIG. 38 is a side cross-sectional view showing the embodiment 14. A first protective layer 14 with a thickness of 700 angstrom, a recording film 141 with a thickness of 440 angstrom, a protective layer 15 with a thickness of 250 angstrom, and a reflection layer 142 with a thickness of 800 angstrom are laminated in sequence on a polycarbonate substrate 10 by magnetron sputtering. Here, the recording film 141 is formed by laminating first magnetic layers 143 each with a thickness of 30 angstrom and second magnetic layers 144 each with a thickness of 10 angstrom alternately into a multilayer structure so as to form the artificial lattice. In the recording film 141, a first magnetic layer 143 is formed at the interface with respect to the protective layers 14 and 15, respectively.

For the evaluation test, a following sample (referred to as example 14-1) was prepared. In the example 14-1, the first magnetic layers 143 is formed of Nd5.9 Dy21.9 Fe51.8 Co20.4 (at %), the second magnetic layer 144 is formed of Nd21.0 Co79.0 (at %), the protective layers 14 and 15 are formed of AlSiN, and the reflection layer 142 is formed of Al. The artificial lattice of the recording film 141 is formed by use of the instrument as shown in FIG. 32.

Further, as the comparative example, the afore-mentioned comparative example 12-1 is used.

Figure 39:
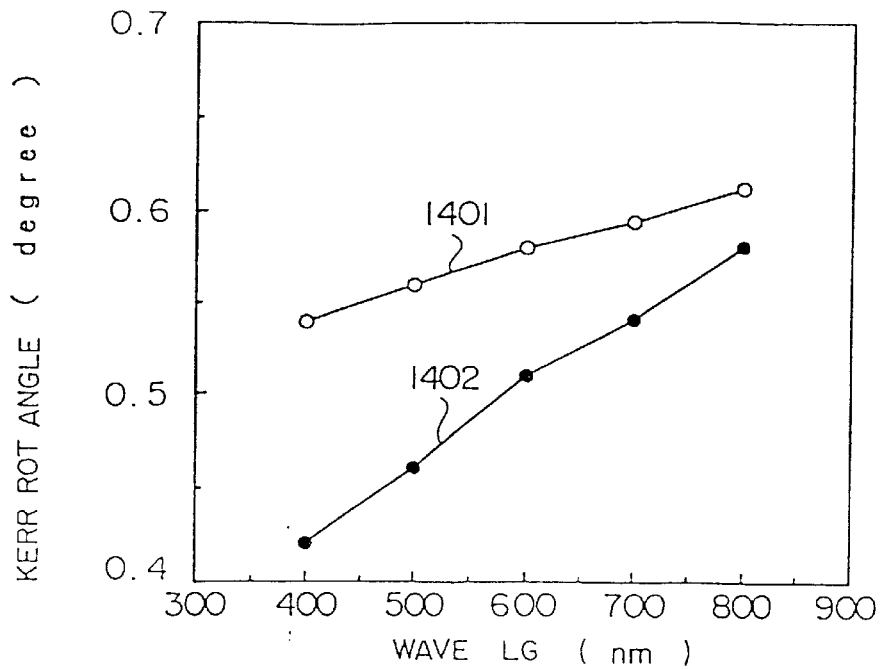
FIG. 39 is a graphical representation showing the Kerr rotational angles of the embodiment 14 and a comparative example.

FIG. 39 shows the Kerr rotational angles of the example 14-1 and the comparative example 12-1 obtained when measured from the substrate side, in which the numeral 1401 denotes the example 14-1, and 1402 denotes the comparative example 12-1. FIG. 39 indicates clearly that the Kerr rotational angle of the example 14-1 is larger than that of the comparative example 12-1 in the short wavelength range 400 to 600 nm.

Figure 40:
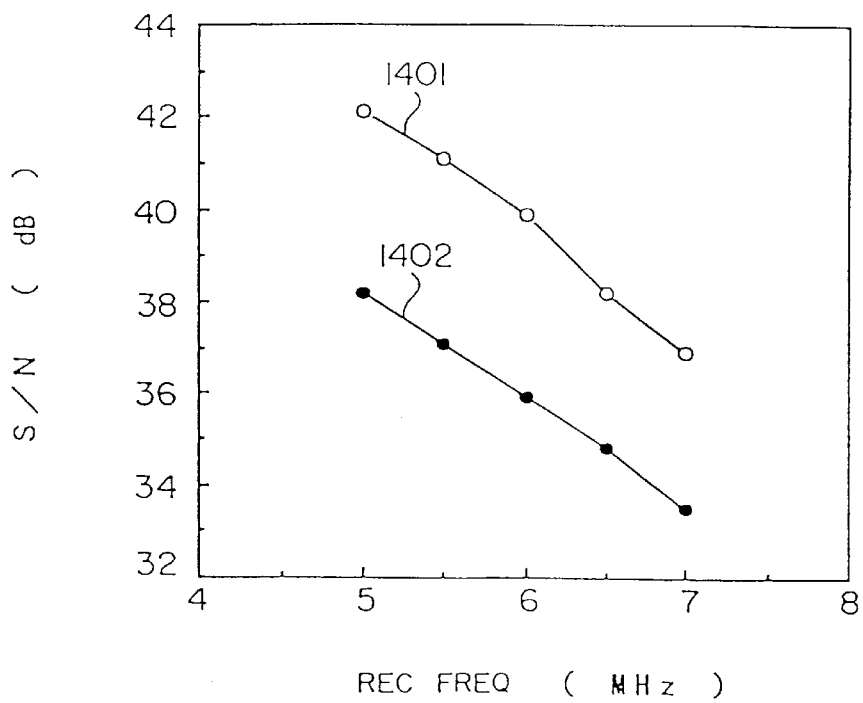
FIG. 40 is a graphical representation showing dynamic characteristics in the short wavelength range of both the embodiment 14 and the comparative example.

The test results which verify that the example 14-1 is more advantageous than the comparative example 12-1 in the dynamic characteristics will be described hereinbelow. The specifications for the recording and reproducing test are basically the same as those of the embodiment 9. Signals from 5.0 to 7.0 MHz are written by magnetic field modulation at a linear speed of 5.7 m/sec. FIG. 40 shows the S/N ratio measured when the signals are reproduced. FIG. 40 indicates that the S/N ratio of the example 14-1 is higher than that of the comparative example 12-1, so that the example 14-1 is suitable for the high density signal recording.

Further, the first magnetic layer 143 is not limited to only the NdDyFeCo. The same effect can be obtained as far as the first magnetic layer 143 is formed of a rare earth element-transition metal alloy such as NdDyTbFeCo, TbFeCo, TbFeCoCr, etc. which can satisfy a desired recording sensitivity. Further, in the artificial lattice of the recording film 141, the same effect can be obtained even if the thicknesses of the first and second magnetic layers 143 and 144 are not uniform, respectively. Further, the same effect can be obtained in the case where the reflection layer 16 is formed of AlTi, AlCr, AlTa, Ag, Cu, Au, Pt or Co. Further, the second magnetic layer 144 can be formed of NdFeCo or NdTbFeCo (however, Tb must be less than 1.5 at %).

EMBODIMENT 15

(4-Layer Sandwich+Reflection Structure)

Figure 41:
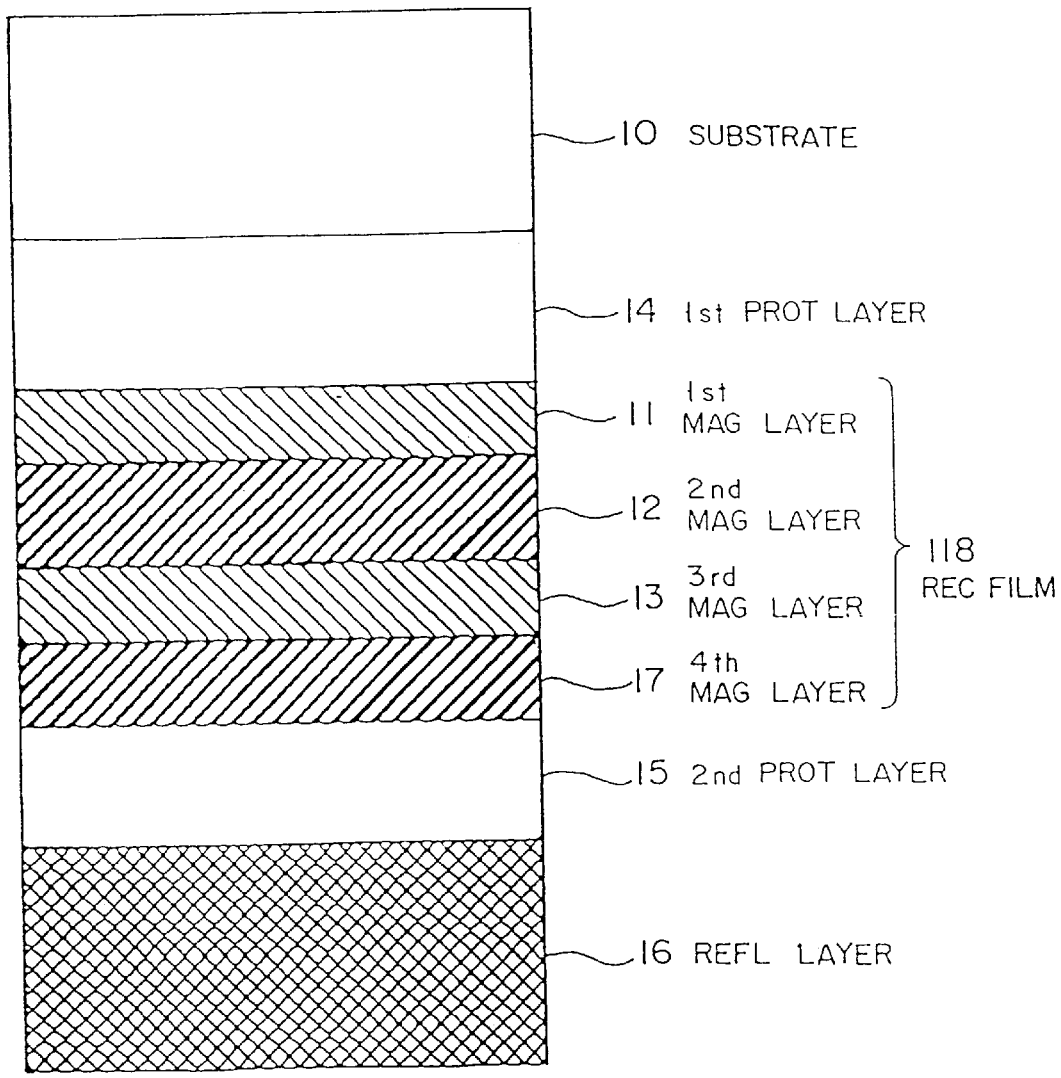
FIG. 41 is a side cross-sectional view showing an embodiment 15.

FIG. 41 is a side cross-sectional view showing the embodiment 15. A first protective layer 14 with a thickness of 600 angstrom, a first magnetic layer 11 with a thickness of 30 angstrom, a second magnetic layer 12 with a thickness of 30 angstrom, a third magnetic layer 13 with a thickness of 50 angstrom, and a fourth magnetic layer 17 with a thickness of 90 angstrom, a second protective layer 15 with a thickness of 200 angstrom, and a reflection layer 16 with a thickness of 600 angstrom are laminated in sequence on a polycarbonate substrate 10 by magnetron sputtering. The first to fourth magnetic layers 11, 12, 13 and 17 constitute a recording film 118.

For the evaluation test, a sample (referred to as example 15-1) was prepared. In the example 15-1, the protective layers 14 and 15 are formed of AlSiN, the reflection layer 16 is formed of Al, the first and third magnetic layers 11 and 13 are formed of Nd25 Tb7 Fe33 Co35 (at %), and the second and fourth magnetic layers 12 and 17 are formed of Nd6 Dy22 Fe52 Co20 (at %). In the first and third magnetic layers 11 and 13 of single layer structure, the Kerr rotational angle is 0.25° in wavelength 500 nm and the coercivity is 10.05 kOe. In the second and fourth magnetic layers 12 and 17 of single layer structure, the Kerr rotational angle is 0.34° in wavelength 500 nm and the coercivity is 0.8 kOe.

Further, a comparative example 15-1 was prepared. FIG. 2 is a side cross-sectional view showing a comparative example used for the evaluation test. A first protective layer 14 of 600 angstrom in thickness, a first magnetic layer 11 of 60 angstrom in thickness, a recording film 12' of single layer structure with a thickness of 200 angstrom, a second protective layer 15 of 200 angstrom in thickness, and a reflection layer 16 of 600 angstrom in thickness are laminated on a polycarbonate substrate 10 in sequence by magnetron sputtering. The material of the protective layers 14 and 15 is AlSiN, that of the reflection layer 16 is Al, and that of the recording film 12' is Nd6 Dy22 Fe52 Co20 (at %) in the same way as in the second magnetic layer 12 of the example 15-1.

The Kerr rotational angle θm of the example 15-1 is 1.05° in wavelength of 500 nm when measured from the substrate side, and that of the comparative example 15-1 is 0.60° under the same condition. Further, the coercivity Hcm of the example 15-1 is 4.8 kOe, and that of the comparative example 15-1 is 11.8 kOe. In other words, the example 15-1 has a larger Kerr rotational angle than that of the comparative example 15-1, and additionally a sufficient coercivity Hcm beyond the minimum coercivity of 2 kOe required in practice. Therefore, the example 15-1 can provide magneto-optical recording medium high in S/N ration in the short wavelength and stable in recording magnetic domains.

Further, another sample (referred to as example 15-2) was prepared. In this example 15-2, the composition of the fourth magnetic layer 17 is Tb22 Fe73 Co5 (at %), and the compositions of the other layers are the same as those of the example 15-1. The Kerr rotational angle of the fourth magnetic layer 17 (Tb22 Fe73 Co5 (at %)) of single layer structure is 0.18° in wavelength 500 nm and the coercivity thereof is 12.3 kOe.

The Kerr rotational angle θm of the example 15-2 is 0.78° in wavelength of 500 nm when measured from the substrate side, and the coercivity Hcm of the example 152 is 8.9 kOe. As described above, when the fourth magnetic layer 17 is formed of a composition such as TbFeCo high in coercivity, it is possible to increase the coercivity, while keeping the large Kerr rotational angle in the short wavelength range.

Under the consideration of the optimum value of the composition ranges examined in the embodiment 1, it is preferable that the first and third magnetic layers 11 and 13 satisfy the following relationship from the standpoint of recording and reproducing characteristics:

$10 \leq x \leq 35$ (at %)

$1 \leq y \leq 15$ (at %)

where x (at %) denotes the composition of light rare earth element, and y (at %) denotes the composition of heavy rare earth element.

The respective layer thickness ratios of the magnetic layers 11, 13 and 17 must be selected so that both the enhancement of the Kerr rotational angle and the coercivity of the whole recording film 118 become an appropriate value, respectively.

The film thickness of the recording film 118 is preferably 400 angstrom or less. This is because when the thickness of the recording film 118 is thin to this extent, light can transmit therethrough sufficiently, so that it is possible to make the most of the advantage of adoption of the reflection structure. The inventors prepared the following samples: A first protective layer 14 with a thickness of 600 angstrom, a first magnetic layer 11 with a thickness of 30 angstrom, a second magnetic layer 12 with a thickness of 30 angstrom, a third magnetic layer 13 with a thickness of 50 angstrom, a fourth magnetic layer 17 with a thickness x angstrom, a second protective layer 15 with a thickness of 250 angstrom, and a reflection layer 16 with a thickness of 1000 angstrom are laminated in sequence on a polycarbonate substrate with a thickness of 1.2 nm. The layer thickness x of the fourth magnetic layer 17 is 90, 190, 240, 270 and 320 angstrom, respectively. With respect to the above-mentioned samples, the respective Kerr rotational angles θm are measured from the substrate side. The compositions of the respective layers of the samples are the same as those of the example 15-1. The film thickness of the recording films 118 of these samples are 200, 300, 350, 380 and 430 angstrom, respectively. The Kerr rotational angles θm in wavelength 500 nm measured from the substrate side are 1.11, 1.03, 0.80, 0.77 and 0.62°, respectively. Further, the coercivities are 4.2, 4.7, 5.8, 6.2 and 6.6 kOe, respectively. The test results indicate that the Kerr rotational angle θm increases with decreasing film thickness of the recording film 118.

The same effect as described above can be obtained even if the compositions of the first and third magnetic layers 11 and 13 are not necessarily the same with respect to each other. Further, it is possible to obtain the same effect as described above, if the compositions of the second and fourth magnetic layers 12 and 14 are not necessarily the same with respect to each other.

Further, the Curie temperatures of the first and third magnetic layers 11 and 13 are 200° C. or higher.

Without being limited to only the above-mentioned embodiments, the present invention can be modified into various embodiments and compositions. For example, the compositions including Sm as a light rare earth element or the compositions including Gd as a heavy rare earth element can be adopted as the composition of the magnetic layers. In particular, in the case of the light rare earth major range composition, it is possible to adopt the composition including Sm (e.g., NdSmTbFeCo, PrSmTbFeCo, NdPrSmTbFeCo) or these compositions in which Tb is replaced with DyGd. Further, in both the light and heavy rare earth major compositions, it is possible to adopt the compositions including Gd (e.g., NdTbGdFeCo, NdDyGdFeCo, NdGdFeCo, PrTbGdFeCo, or PrGdFeCo, etc.). When Gd is added, although the coercivity is decreased, the Kerr rotational angle increases.

We claim:

1. A magneto-optical recording medium having laminated in the following order at least a protective layer, a first magnetic layer, a second magnetic layer, another protective layer, a reflection layer and a transparent substrate, wherein:

the first magnetic layer is a light rare earth element-heavy rare earth element-transition metal alloy;

the second magnetic layer is a rare earth element-transition metal alloy with characteristics for forming a perpendicular magnetized film; and the first and second magnetic layers satisfy the following conditions with respect to Kerr rotational angle in a wavelength range of light used for signal reproduction and coercivity both at room temperature:

$\theta > \theta 2$ $Hc1 < Hc2$ where θ denotes the Kerr rotational angle, Hc denotes the coercivity, and suffixal numerals 1 and 2 denote the first and second magnetic layers, respectively.

2. The magneto-optical recording medium of claim 1, wherein the light rare earth element of the first magnetic layer includes Nd and/or Pr.

3. The magneto-optical recording medium of claim 1, wherein the first magnetic layer satisfies the following conditions with respect to composition ratio;

$10 \leq x \leq 35$ (at %)

$1 \leq y \leq 15$ (at %)

where x denotes a composition ratio of the light rare earth element, and y denotes a composition ratio of the heavy rare earth element.

4. The magneto-optical recording medium of claim 1, wherein the rare earth element of the second magnetic layer includes Nd and/or Pr.

5. The magneto-optical recording medium of claim 1, wherein a total layer thickness of the first and second magnetic layers is 400 angstrom or less.

6. A magneto-optical recording medium comprising:

laminated in the following order at least a protective layer, a first recording film formed of a rare earth element-transition metal alloy, a second recording film formed of a rear earth element-transition metal alloy, another protective layer and a transparent substrate;

wherein the first and second recording films satisfy the following conditions with respect to coercivity at room temperature and Curie temperature for enabling magnetically induced super resolution signal reproduction:

$Hc1 < Hc2$ $Tc1 > Tc2$ where Hc denotes the coercivity, Tc denotes the Curie temperature, and suffixal numerals 1 and 2 denote the first and second recording films, respectively;

the first recording film is a lamination of a first magnetic layer of a light rare earth element-heavy rare earth element-transition metal alloy, and a second magnetic layer of a rare earth element-transition metal alloy closer to the substrate; and the first and second magnetic layers satisfy the following conditions with respect to Kerr rotational angle and coercivity both at room temperature:

$\theta a > \theta b$ $Hca < Hcb$ where θ denotes the Kerr rotational angle, Hc denotes the coercivity, and suffixal letters a and b denote the first and second magnetic layers, respectively.

7. The magneto-optical recording medium of claim 6, wherein the light rare earth element of the first magnetic layer includes Nd and/or Pr.

8. The magneto-optical recording medium of claim 6, wherein the first magnetic layer satisfies the following conditions with respect to composition ratio:

$10 \leq x \leq 35$ (at %)

$1 \leq y \leq 15$ (at %)

where x denotes a composition ratio of the light rare earth element, and y denotes a composition ratio of the heavy rare earth element.

9. The magneto-optical recording medium of claim 6, wherein the rare earth element of the second magnetic layer includes Nd and/or Pr.

\* \* \* \* \*